United States Patent
Kurasawa et al.

(10) Patent No.: US 10,627,970 B2
(45) Date of Patent: Apr. 21, 2020

(54) DISPLAY DEVICE

(71) Applicant: Japan Display Inc., Minato-ku (JP)

(72) Inventors: Hayato Kurasawa, Minato-ku (JP);
Hiroshi Mizuhashi, Minato-ku (JP);
Tadayoshi Katsuta, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/029,709

(22) Filed: Jul. 9, 2018

(65) Prior Publication Data

US 2019/0012017 A1   Jan. 10, 2019

(30) Foreign Application Priority Data

Jul. 10, 2017 (JP) ................................. 2017-134818

(51) Int. Cl.
| | |
|---|---|
| *G06F 3/045* | (2006.01) |
| *G06F 3/041* | (2006.01) |
| *G06F 3/044* | (2006.01) |
| *G06F 3/046* | (2006.01) |
| *G09G 3/36* | (2006.01) |
| *G09G 3/34* | (2006.01) |

(52) U.S. Cl.
CPC .............. *G06F 3/044* (2013.01); *G06F 3/046* (2013.01); *G06F 3/0412* (2013.01); *G09G 3/344* (2013.01); *G09G 3/3696* (2013.01); *G06F 2203/04106* (2013.01); *G06F 2203/04112* (2013.01); *G09G 2300/0426* (2013.01); *G09G 2310/0202* (2013.01); *G09G 2310/068* (2013.01); *G09G 2310/08* (2013.01)

(58) Field of Classification Search
CPC ...................................................... G06F 3/044
See application file for complete search history.

(56) References Cited

U.S. PATENT DOCUMENTS

| | | | | |
|---|---|---|---|---|
| 2014/0078104 A1* | 3/2014 | Lee | ................ | G06F 3/044 345/174 |
| 2015/0062062 A1* | 3/2015 | Han | ................ | G06F 3/0412 345/174 |
| 2017/0082887 A1* | 3/2017 | Kubota | ................ | H01L 27/3232 |

FOREIGN PATENT DOCUMENTS

JP           10-49301           2/1998

* cited by examiner

*Primary Examiner* — Nan-Ying Yang
(74) *Attorney, Agent, or Firm* — Oblon, McClelland, Maier & Neustadt, L.L.P.

(57) ABSTRACT

A display device includes first electrodes, second electrodes, lines, and a controller, and includes a substrate, pixel electrodes, a display functional layer, and a common electrode stacked in this order. An insulating layer is between the common electrode and the first and second electrodes. The controller controls the pixel electrodes, the common electrode, the lines, and the first and second electrodes. During a display period, the pixel electrodes are supplied with a pixel signal through the lines, and the common electrode is supplied with a common signal. During a first sensing period, the lines are supplied with a first drive signal to generate a magnetic field. During a second sensing period, the lines are supplied with the first drive signal to generate the magnetic field, and an electromotive force corresponding to a distance between the lines and the first electrodes is generated in the first electrodes by the magnetic field.

16 Claims, 36 Drawing Sheets

DISPLAY DEVICE

CROSS-REFERENCE TO RELATED APPLICATIONS

This application claims priority from Japanese Application No. 2017-134818, filed on Jul. 10, 2017, the contents of which are incorporated by reference herein in its entirety.

BACKGROUND

1. Technical Field

The present disclosure relates to a display device.

2. Description of the Related Art

In recent years, touch detection devices commonly called touchscreen panels that are capable of detecting an external proximate object have been attracted attention. Such a touchscreen panel is mounted on or integrated with a display device, such as a liquid crystal display device, which is used as a display device with a touch detection function. A capacitance method and an electromagnetic induction method are known as detection methods for such a display device. In the electromagnetic induction method, coils for generating magnetic fields and coils for detecting the magnetic fields are provided in the display device. An external object to be detected, such as a pen, is provided with a coil and a capacitive element forming a resonant circuit. The display device detects the pen through electromagnetic induction between the coils in the display device and the coil in the pen. Japanese Patent Application Laid-open Publication No. 10-49301 (JP-A-10-49301) describes a technology related to a coordinate input device using the electromagnetic induction method.

Moreover, force detection devices have come to be used that can also detect a force in addition to the touch as a detection method for the display device.

The capacitance method greatly differs from the electromagnetic induction method in the configuration of a detection target and detection electrodes. Therefore, if the detection electrodes and various types of wiring provided in the display device and the driving configuration thereof are directly employed in the electromagnetic induction method, the electromagnetic induction touch detection may be difficult to exert satisfactory performance. The force detection using the electromagnetic induction method is not described in JP-A-10-49301.

SUMMARY

According to an aspect, a display device includes: a substrate; a plurality of lines; a plurality of pixel electrodes; a display functional layer; a common electrode opposed to the pixel electrodes; a plurality of first electrodes; a plurality of second electrodes; and a controller. The substrate, the pixel electrodes, the display functional layer, and the common electrode are stacked in this order. The first electrodes are opposed to the second electrodes with a space therebetween, and an insulating layer is provided between the common electrode and the first and second electrodes. The controller is configured to perform processing during a plurality of periods including a display period to display an image, a first sensing period, and a second sensing period in a time-division manner, and control the pixel electrodes, the common electrode, the lines, the first electrodes, and the second electrodes according to the periods. During the display period, in response to a control signal from the controller, the pixel electrodes are supplied with a pixel signal through the lines, and the common electrode is supplied with a common signal. During the first sensing period, the lines are supplied with a first drive signal to generate a magnetic field. During the second sensing period, the lines are supplied with the first drive signal to generate the magnetic field, and an electromotive force corresponding to a distance between the lines and the first electrodes is generated in the first electrodes by the magnetic field.

According to another aspect, a display device includes: a substrate; a plurality of lines; a plurality of pixel electrodes; a display functional layer; a plurality of common electrodes opposed to the pixel electrodes; a plurality of first electrodes; and a controller. The substrate, the lines, the pixel electrodes, the display functional layer, and the first electrodes are stacked in this order. The common electrodes are provided between the substrate and the display functional layer. The controller is configured to perform processing during a plurality of periods including a display period to display an image, a first sensing period, and a second sensing period in a time-division manner, and control the pixel electrodes, the common electrodes, the lines, and the first electrodes according to the periods. During the display period, in response to a control signal from the controller, the pixel electrodes are supplied with a pixel signal through the lines, and the common electrodes are supplied with a common signal. During the first sensing period, the common electrodes are supplied with a first drive signal to generate a magnetic field, and an electromotive force is generated in the lines by the magnetic field. During the second sensing period, the common electrodes are supplied with the first drive signal to generate the magnetic field, and an electromotive force corresponding to a distance between the common electrodes and the first electrodes is generated in the first electrodes by the magnetic field.

DETAILED DESCRIPTION

Figure 1:
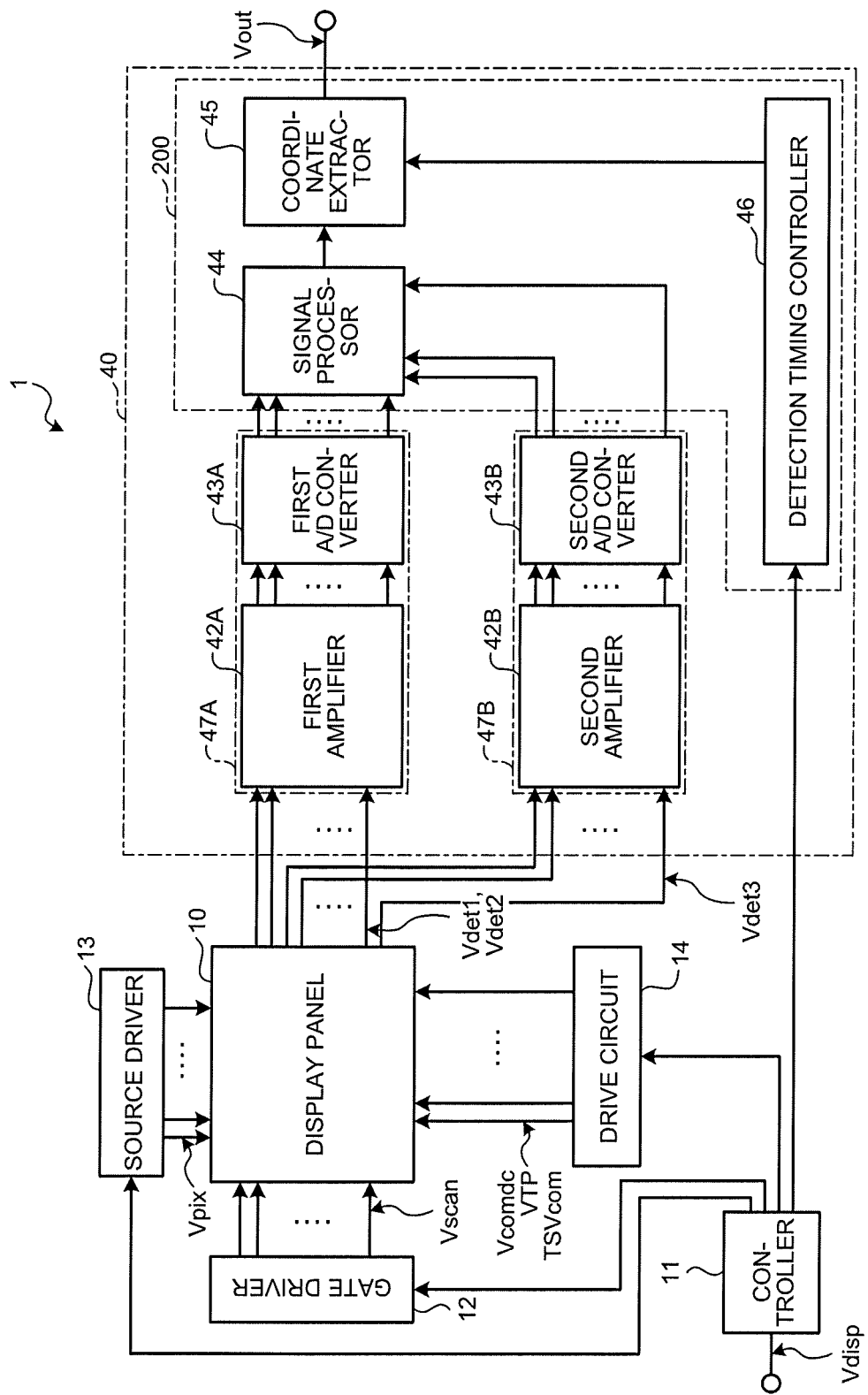
FIG. 1 is a block diagram illustrating a configuration example of a display device according to a first embodiment of the present disclosure.

The following describes embodiments for carrying out the present disclosure in detail with reference to the drawings. The present disclosure is not limited to the description of the embodiments given below. Components described below include those easily conceivable by those skilled in the art or those substantially identical thereto. Moreover, the components described below can be appropriately combined. The disclosure is merely an example, and the present disclosure naturally encompasses appropriate modifications easily conceivable by those skilled in the art while maintaining the gist of the present disclosure. To further clarify the description, widths, thicknesses, shapes, and other properties of various parts are schematically illustrated in the drawings, as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a block diagram illustrating a configuration example of a display device according to a first embodiment of the present disclosure. A display device 1 of this embodiment incorporates a touch detection function and a force detection function. The touch detection function is a function to detect contact or proximity of a detection target body with or to a display surface. The force detection function is a function to detect a force with which the detection target body presses the display surface. As illustrated in FIG. 1, the display device 1 includes a display panel 10, a controller 11, a gate driver 12, a source driver 13, a drive circuit 14, and a detector 40.

The display panel 10 includes a plurality of pixels including display elements and has a display surface facing the pixels. The display panel 10 receives a video signal and displays an image formed by the pixels on the display surface.

The controller 11 is a circuit that controls mainly display operations by supplying control signals to the gate driver 12, the source driver 13, and the drive circuit 14 based on an externally supplied video signal Vdisp.

The gate driver 12 has a function to sequentially select one horizontal line as a target of display driving of the display panel 10 based on a control signal supplied from the controller 11.

The source driver 13 is a circuit that supplies a pixel signal Vpix to each sub-pixel SPix of the display panel 10 based on the control signal supplied from the controller 11. The present disclosure is, however, not limited to this configuration. The controller 11 may generate the pixel signal Vpix and supply the pixel signal Vpix to the source driver 13.

The drive circuit 14 supplies a display drive signal Vcomdc to a common electrode COML (refer to FIG. 9), a first drive signal VTP for detection to signal lines SGL (refer to FIG. 9), and a second drive signal TSVcom to second electrodes 33 (refer to FIG. 9), based on the control signal supplied from the controller 11. The drive circuit 14 may supply the first drive signal VTP to the second electrodes 33.

The controller 11 controls a detection operation to detect the detection target body, such as a finger or a touch pen of a user (hereinafter, simply called the detection target body in some cases), on or above the display panel 10. The display panel 10 has a function to detect a position of a finger in contact with or in proximity to the display surface of the display panel 10 based on the basic principle of touch detection using a mutual-capacitive touch detection method. The display panel 10 also has a function to detect a position of a touch pen in contact with or in proximity to the display surface based on the basic principle of touch detection using an electromagnetic induction method. The display panel 10 further has a function to detect a force with which the detection target body presses the display surface, using the electromagnetic induction method.

When having detected the contact or the proximity of a touch pen using the electromagnetic induction method, the display panel 10 outputs a first detection signal Vdet1 to the detector 40. When having detected a force using the electromagnetic induction method, the display panel 10 outputs a second detection signal Vdet2 to the detector 40. In addition, when having detected the contact or the proximity of a finger using the mutual-capacitance method, the display panel 10 outputs a third detection signal Vdet3 to the detector 40.

During the electromagnetic induction touch detection, the detector 40 detects whether the display surface of the display panel 10 is touched by the touch pen based on the control signal supplied from the controller 11 and the first detection signal Vdet1 output from the display panel 10. During the mutual-capacitive touch detection, the detector 40 detects whether the display surface is touched by the finger based on the control signal supplied from the controller 11 and the third detection signal Vdet3 output from the display panel 10. If the display surface is touched, the detector 40 obtains, for example, coordinates where the touch input is performed. In addition, during the electromagnetic induction force detection, the detector 40 detects a force with which the detection target body presses the display surface, based on the control signal supplied from the controller 11 and the second detection signal Vdet2 output from the display panel 10.

As illustrated in FIG. 1, the detector 40 includes a first analog front-end circuit 47A (hereinafter, referred to as the first AFE 47A), a second analog front-end circuit 47B (hereinafter, referred to as the second AFE 47B), a signal processor 44, a coordinate extractor 45, and a detection timing controller 46.

The first AFE 47A includes a first amplifier 42A and a first analog-to-digital (A/D) converter 43A. The second AFE 47B includes a second amplifier 42B and a second A/D converter 43B. The first amplifier 42A amplifies the first detection signal Vdet1 or the second detection signal Vdet2 supplied from the display panel 10. The first A/D converter 43A samples each analog signal output from the first amplifier 42A, and converts the analog signal into a digital signal at a time synchronized with the first drive signal VTP. The first AFE 47A is an analog signal processing circuit that converts the first detection signal Vdet1 or the second detection signal Vdet2 into the digital signal, and outputs it to the signal processor 44. In the same manner, the second amplifier 42B amplifies the third detection signal Vdet3 supplied from the display panel 10. The second A/D converter 43B samples each analog signal output from the second amplifier 42B, and converts the analog signal into a digital signal at a time synchronized with the second drive signal TSVcom. The second AFE 47B is an analog signal processing circuit that converts the third detection signal Vdet3 into the digital signal, and outputs it to the signal processor 44.

The signal processor 44 is a logic circuit that detects whether the display panel 10 is touched, based on the output signals from the first AFE 47A and the second AFE 47B. The signal processor 44 performs processing of extracting a signal of difference (absolute value $|\Delta V|$) in the detection signals caused by the detection target body. The signal processor 44 compares the absolute value $|\Delta V|$ with a predetermined threshold voltage. If the absolute value $|\Delta V|$ is lower than the threshold voltage, the signal processor 44 determines that the detection target body is in a non-contact state. If, instead, the absolute value $|\Delta V|$ is equal to or higher than the threshold voltage, the signal processor 44 determines that the detection target body is in a contact state or a proximate state. In this manner, the detector 40 can perform the touch detection.

In this specification, the term "contact state" includes a state where the detection target body is in contact with the display surface and a state where the detection target body is so proximate to the display surface as to be treatable as in contact therewith, and the term "non-contact state" includes a state where the detection target body is not in contact with the display surface and a state where the detection target body is not so proximate to the display surface as to be treatable as in contact therewith.

The coordinate extractor 45 is a logic circuit that obtains touchscreen panel coordinates of the touch when the touch is detected by the signal processor 44. The coordinate extractor 45 outputs the touchscreen panel coordinates as an output signal Vout. The coordinate extractor 45 may output the output signal Vout to the controller 11. The controller 11 can perform a predetermined operation of display or detection based on the output signal Vout.

The signal processor 44 and the coordinate extractor 45 calculate the level of the force applied to the display surface based on the absolute value $|\Delta V|$. The function to calculate the force may be incorporated in the controller 11 or an external controller 200.

The detection timing controller 46 controls, based on the control signal supplied from the controller 11, the first and second AFEs 47A and 47B, the signal processor 44, and the coordinate extractor 45 so as to operate them in synchronization with one another.

The first and second AFEs 47A and 47B, the signal processor 44, the coordinate extractor 45, and the detection timing controller 46 of the detector 40 are mounted on the display device 1. The present disclosure is, however, not limited to this configuration. All or some of the functions of the detector 40 may be incorporated in an external processor or the like. For example, the signal processor 44 and the coordinate extractor 45 may be incorporated in the external controller 200 separate from the display device 1.

Figure 2:
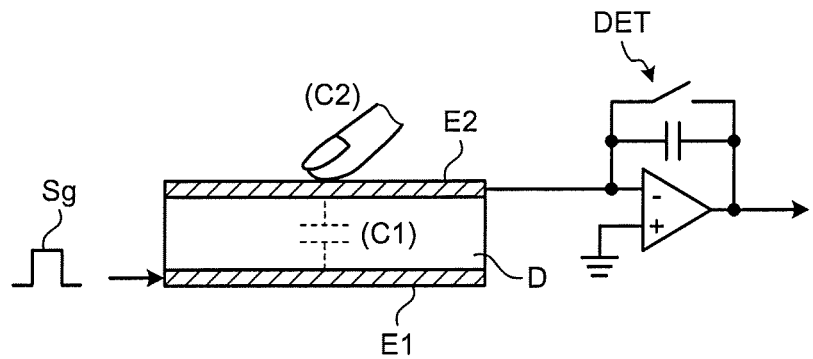
FIG. 2 is an explanatory diagram for explaining the basic principle of mutual-capacitive touch detection.

The display panel 10 performs the touch control based on the basic principle of the capacitive touch detection and the touch control based on the basic principle of the electromagnetic induction touch detection. In addition, the display panel 10 performs the force detection control based on the basic principle of the force detection using the electromagnetic induction method. The following describes the basic principle of the touch detection using the mutual-capacitive touch detection method performed by the display panel 10 of this embodiment, with reference to FIG. 2. FIG. 2 is an explanatory diagram for explaining the basic principle of mutual-capacitive touch detection. FIG. 2 illustrates also a detection circuit. Although the following describes a case where the finger serving as the detection target body is in contact with or in proximity to the display surface, the detection target body is not limited to the finger, and may be, for example, a stylus pen.

For example, as illustrated in FIG. 2, a capacitive element C1 includes a pair of electrodes, that is, a drive electrode E1 and a detection electrode E2 that are disposed opposite to each other with a dielectric material D interposed therebetween. The capacitive element C1 generates lines of electric force between opposite surfaces of the drive electrode E1 and the detection electrode E2, and in addition, generates fringe components of the lines of electric force extending from ends of the drive electrode E1 toward the upper surface of the detection electrode E2. One end of the capacitive element C1 is coupled to an alternating-current signal source, and the other end thereof is coupled to a voltage detector DET. The voltage detector DET is included, for example, in the detector 40 illustrated in FIG. 1.

A square wave Sg having a predetermined frequency (ranging, for example, roughly from several kilohertz to several hundred kilohertz) is applied from the alternating-current signal source to the drive electrode E1 (at one end of the capacitive element C1). In the non-contact state, a current corresponding to the capacitance value of the capacitive element C1 flows in the voltage detector DET. The voltage detector DET converts variation in current corresponding to the square wave Sg into variation in voltage.

In the contact state, electrostatic capacitance C2 generated by the finger is in contact with the detection electrode E2 or is so proximate thereto as to be treatable as in contact therewith, as illustrated in FIG. 2. This condition causes the finger to interrupt the fringe components of the lines of electric force present between the drive electrode E1 and the detection electrode E2. This interruption causes the capacitive element C1 to act as a capacitive element having a smaller capacitance value than that in the non-contact state.

The amplitude of the voltage signal output from the voltage detector DET is smaller in the contact state than that in the non-contact state. The absolute value |ΔV| of the difference in the voltage signal varies depending on whether the detection target body is present. The detector 40 compares the absolute value |ΔV| with the predetermined threshold voltage to determine whether the detection target body is in the non-contact state, or in either the contact state or the proximate state.

Figure 3:
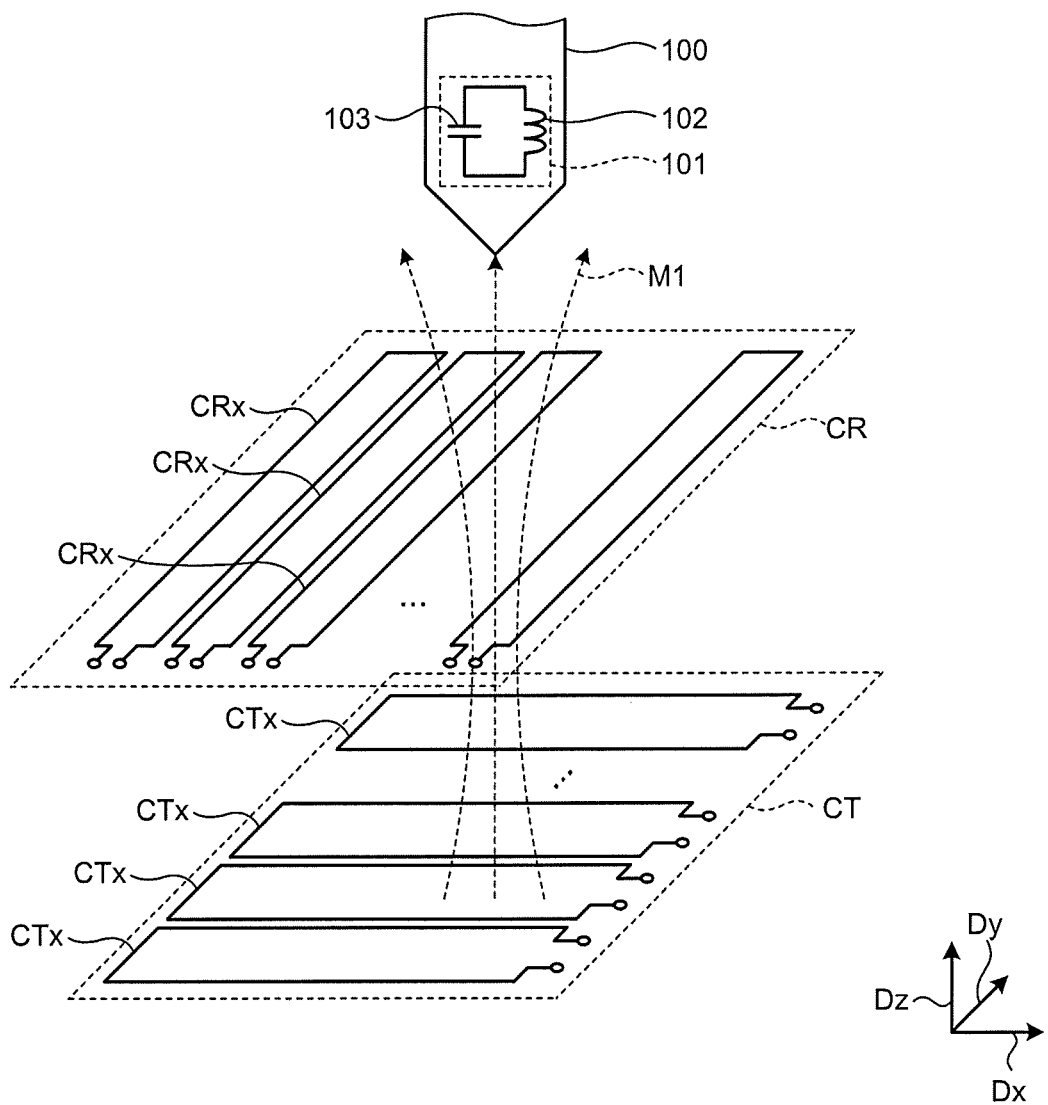
FIG. 3 is an explanatory diagram of a magnetic field generation period for explaining the basic principle of electromagnetic induction touch detection.
Figure 4:
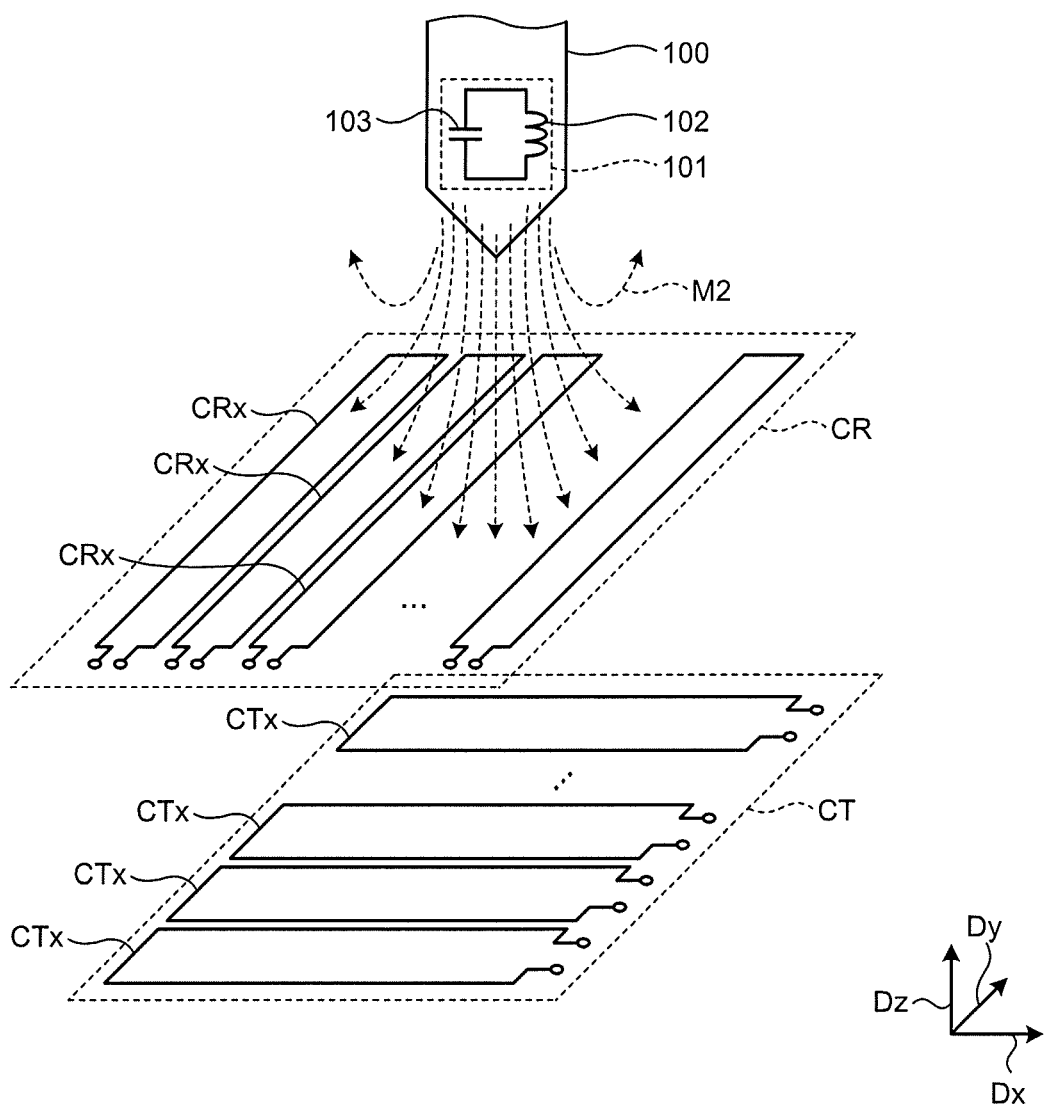
FIG. 4 is an explanatory diagram of a magnetic field detection period that illustrates the basic principle of the electromagnetic induction touch detection.

The following describes the basic principle of the touch detection using the electromagnetic induction method performed by the display panel 10 of this embodiment, with reference to FIGS. 3 and 4. FIG. 3 is an explanatory diagram of a magnetic field generation period for explaining the basic principle of the electromagnetic induction touch detection. FIG. 4 is an explanatory diagram of a magnetic field detection period that illustrates the basic principle of the electromagnetic induction touch detection.

As illustrated in FIGS. 3 and 4, in the electromagnetic induction touch detection, the contact or the proximity of a touch pen 100 is detected. A resonant circuit 101 is provided in the touch pen 100. The resonant circuit 101 is configured by coupling a coil 102 to a capacitive element 103 in parallel.

In the electromagnetic induction method, transmitting coils CT and receiving coils CR are provided so as to overlap with each other. Each transmitting coil CTx is formed to be longer in a first direction Dx. Each receiving coil CRx is formed to be longer in a second direction Dy. The receiving coils CRx are provided so as to intersect with the transmitting coils CTx in a plan view. The transmitting coil CTx is coupled to the alternating-current signal source (drive signal source). The receiving coil CRx is coupled to the voltage detector DET (refer to FIG. 2).

As illustrated in FIG. 3, during the magnetic field generation period, a square wave having a predetermined frequency (ranging, for example, roughly from several kilohertz to several hundred kilohertz) is applied from the alternating-current signal source to the transmitting coils CTx. As a result, a current flows in the transmitting coils CTx, and the transmitting coils CTx generate a magnetic field M1 corresponding to the change in current. When the touch pen 100 is in contact with or in proximity to the display surface, an electromotive force is generated in the coil 102 by mutual induction between the transmitting coils CTx and the coil 102, whereby the capacitive element 103 is charged.

Then, during the magnetic field detection period illustrated in FIG. 4, the coil 102 of the touch pen 100 generates a magnetic field M2 that varies with the resonant frequency of the resonant circuit 101. The magnetic field M2 passes through the receiving coils CRx, and as a result, an electromotive force is generated in the receiving coils CRx by mutual induction between the receiving coils CRx and the coil 102. A current corresponding to the electromotive force of the receiving coils CRx flows in the voltage detector DET. In this manner, the electromotive force is generated in the resonant circuit 101 of the touch pen 100 according to the magnetic field M1 generated in the transmitting coils CTx; the magnetic field M2 is generated in the coil 102 according to the electromotive force; and the electromotive force is generated in the receiving coils CRx according to the magnetic field M2. In view of the above description, the electromotive force of the receiving coils CRx can be said to be generated according to the magnetic field generated in the transmitting coils CTx. Although the description of the touch pen 100 and the magnetic field M2 will be omitted in following the embodiments, the magnetic field M1 generated in the transmitting coils CTx causes the generation of the electromotive force in the receiving coils CRx through the above-described process.

The voltage detector DET converts variation in current corresponding to the electromotive force of the receiving coil CRx into variation in voltage. As described above, the detector 40 compares the absolute value |ΔV| with the predetermined threshold voltage to determine whether the touch pen 100 is in the non-contact state, or in either the contact state or the proximate state. The detector 40 can detect the touch pen 100 based on the basic principle of the electromagnetic induction touch detection by scanning each of the transmitting coils CTx and the receiving coils CRx.

Figure 5:
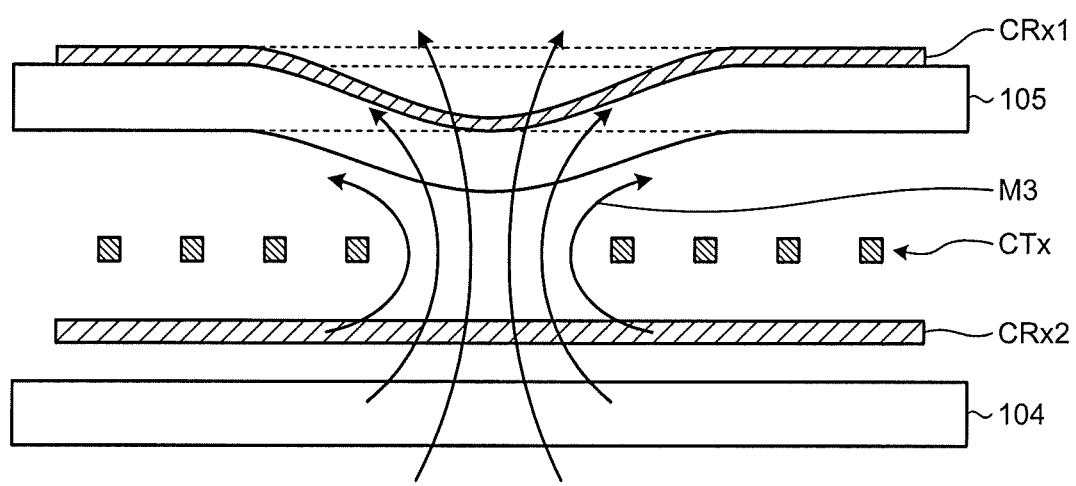
FIG. 5 is an explanatory diagram for explaining the basic principle of electromagnetic induction force detection.

The basic principle of the force detection using the electromagnetic induction method performed by the display panel 10 of this embodiment is described below with reference to FIG. 5. FIG. 5 is an explanatory diagram for explaining the basic principle of the electromagnetic induction force detection. As illustrated in FIG. 5, a first substrate 104 and a second substrate 105 are provided so as to overlap each other for the electromagnetic induction force detection. The transmitting coil CTx and a second receiving coil CRx2 are provided on the first substrate 104, and a first receiving coil CRx1 is provided on the second substrate 105. The transmitting coil CTx, the first receiving coil CRx1, and the second receiving coil CRx2 are provided so as to overlap with one another.

As illustrated in FIG. 5, a magnetic field M3 generated from the transmitting coil CTx intersects with and passes through the first receiving coil CRx1 and the second receiving coil CRx2. As a result, an electromotive force is generated in the first receiving coil CRx1 by mutual induction between the transmitting coil CTx and the first receiving coil CRx1. In addition, an electromotive force is generated in the second receiving coil CRx2 by mutual induction between the transmitting coil CTx and the second receiving coil CRx2.

The force applied from the detection target body brings the second substrate 105 and the first receiving coil CRx1 closer to the first substrate 104. As a result, the distance between the transmitting coil CTx and the first receiving coil CRx1 changes. The state of the magnetic field M3 passing through the first receiving coil CRx1 changes and the electromotive force generated in the first receiving coil CRx1 changes between when no force is applied and when a force is applied. As a result, the distance between the transmitting coil CTx and the first receiving coil CRx1 can be detected. The detector 40 can calculate the level of the force applied from the detection target body based on the change in the distance.

The distance between the transmitting coil CTx and the second receiving coil CRx2 does not change when the force is applied from the detection target body. The electromotive force generated in the second receiving coil CRx2 does not change between when no force is applied and when a force is applied. The force detection can be improved in accuracy by using a detection signal of the second receiving coil CRx2 as a reference signal.

Figure 6:
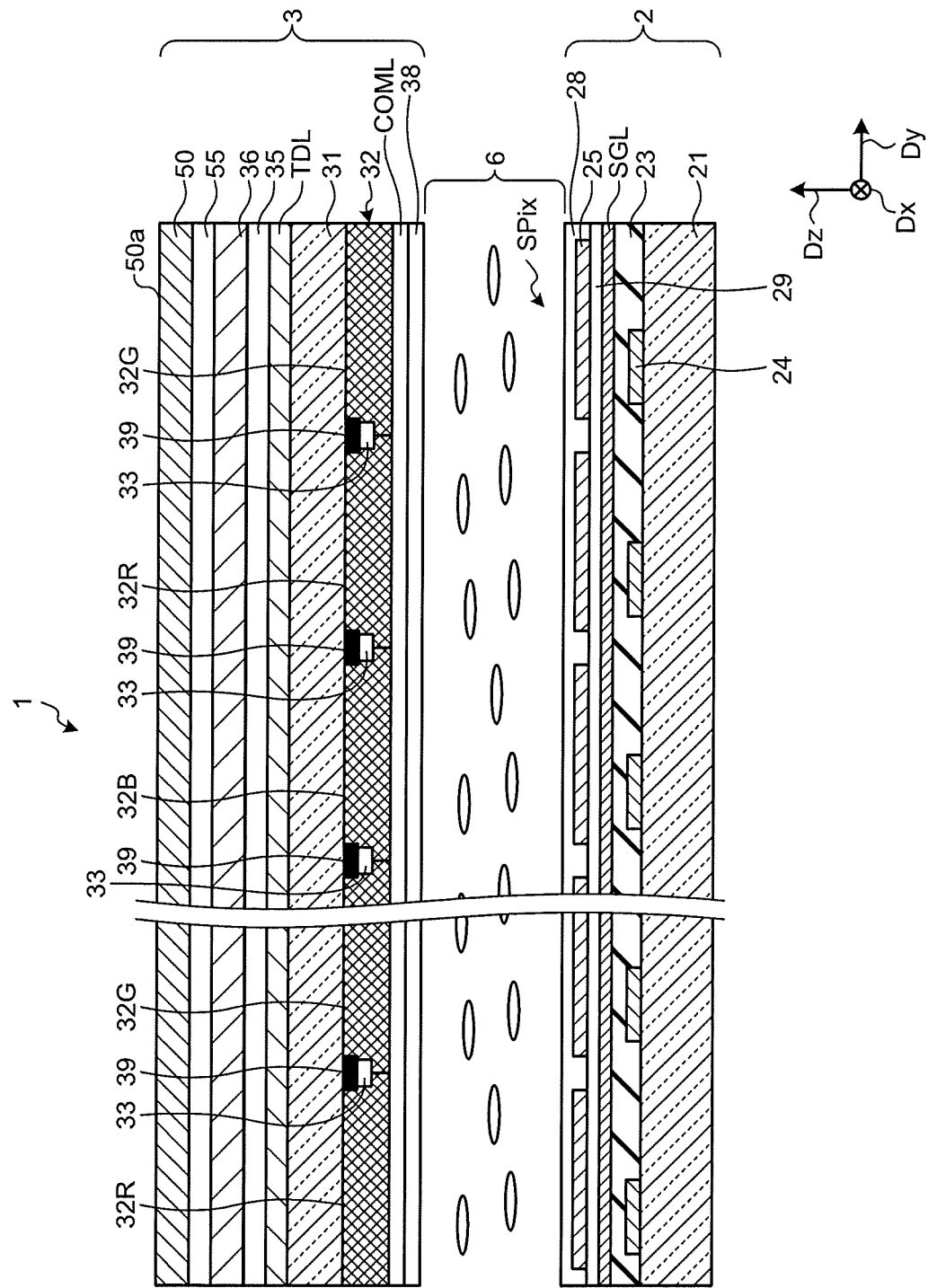
FIG. 6 is a schematic diagram illustrating a sectional structure of the display device according to the first embodiment.

The following describes a configuration example of the display device 1 of this embodiment. FIG. 6 is a schematic diagram illustrating a sectional structure of the display device according to the first embodiment. As illustrated in FIG. 6, the display device 1 includes a pixel substrate 2, a counter substrate 3, a liquid crystal layer 6 serving as a display functional layer, and a cover member 50. The counter substrate 3 is disposed so as to be opposed to a surface of the pixel substrate 2 in the vertical direction. The liquid crystal layer 6 is provided between the pixel substrate 2 and the counter substrate 3.

The cover member 50 is provided on a surface of the counter substrate 3. A first surface 50a of the cover member 50 is the display surface on which an image is displayed, and is a detection surface to which the detection target body comes in contact or proximity. In this embodiment, the touch detection includes a case of detecting the detection target body directly in contact with the first surface 50a. The touch detection also includes a case where the first surface 50a is provided thereon with a protective film (not illustrated), and the detection target body in contact with the protective film is detected. The same applies to the force detection.

The cover member 50 is bonded to a polarizing plate 36 with an adhesive layer 55 interposed therebetween. The cover member 50 may be a glass substrate or may be a film-like base material using a light-transmitting resin material or other materials. Light (external light) incident from outside on the first surface 50a side is reflected by pixel electrodes 25 in the pixel substrate 2 and is transmitted from the first surface 50a. The display device 1 of this embodiment is a reflective liquid crystal display device that displays the image using this reflected light.

In this specification, the first direction Dx refers to a direction parallel to the first surface 50a, and the second direction Dy refers to a direction intersecting with the first direction Dx in a plane parallel to the first surface 50a. A third direction Dz refers to a direction orthogonal to the first surface 50a. In this specification, in a direction orthogonal to a first substrate 21, the term "upper side" refers to a direction from the first substrate 21 toward a second substrate 31, and the term "lower side" refers to a direction from the second substrate 31 toward the first substrate 21. The term "plan view" refers to a case of viewing from a direction orthogonal to a surface of the first substrate 21.

The pixel substrate 2 includes the first substrate 21, third electrodes 24, the pixel electrodes 25, the signal lines SGL, an insulating layer 23, a planarizing film 29, and an orientation film 28. The third electrodes 24, the signal lines SGL, and the pixel electrodes 25 are provided in this order to the first substrate 21. For example, a glass substrate is used as the first substrate 21. The first substrate 21 is provided with circuit elements and various types of wiring, such as gate lines GCL, which are not illustrated, in addition to the signal lines SGL. The circuit elements include switching elements, such as thin-film transistors (TFTs), and capacitive elements.

The pixel electrodes 25 are provided on the planarizing film 29. The orientation film 28 is disposed on the outermost surface of the pixel substrate 2, and is provided between the pixel electrodes 25 and the liquid crystal layer 6. The pixel electrodes 25 are made of, for example, a metal, such as aluminum (Al) or silver (Ag). The pixel electrodes 25 may also have a configuration stacked with such a metal material and a light-transmitting conductive material, such as indium tin oxide (ITO). The pixel electrodes 25 are made of a material having good reflectance, and are provided as reflective electrodes that diffusively reflect the light incident from outside.

The third electrodes 24 are provided between the first substrate 21 and the pixel electrodes 25 in the direction orthogonal to the surface of the first substrate 21. The third electrodes 24 are provided so as to overlap the pixel electrodes 25 with the insulating layer 23 and the planarizing film 29 in between. This configuration generates a retention capacitance 53 (refer to FIG. 7) between the third electrodes 24 and the pixel electrodes 25. In this embodiment, the third electrodes 24 also serve as the receiving coils CRx (refer to FIGS. 3 and 4) and the second receiving coils CRx2 (refer to FIG. 5) of the display panel 10.

The counter substrate 3 includes the second substrate 31, a color filter 32 provided on one surface of the second substrate 31, a light-shielding layer 39, the second electrodes 33, the common electrode COML, an orientation film 38, first electrodes TDL provided on the other surface of the second substrate 31, an insulating layer 35, and the polarizing plate 36. In this embodiment, the second substrate 31 is, for example, a glass substrate or a resin substrate. Each of the second electrodes 33 serves as the drive electrode E1 (refer to FIG. 2) of the display panel 10. Each of the first electrodes TDL serves as the detection electrode E2 (refer to FIG. 2) of the display panel 10. The first electrodes TDL serve as the first receiving coils CRx1 (refer to FIG. 5) of the display panel 10.

The color filter 32 is opposed to the liquid crystal layer 6 in the direction orthogonal to the first substrate 21. The color filter 32 may be disposed on the first substrate 21. The color filter 32 includes, for example, three filters having a color region 32R (red), a color region 32G (green), and a color region 32B (blue). The color filter 32 may include a white (W) filter, or may include filters having five or more different colors. The light-shielding layer 39 is provided at boundary portions between the color regions 32R, 32G, and 32B. The light-shielding layer 39 is a colored resin layer or metal layer commonly called a black matrix. The second electrodes 33 are provided so as to overlap with the light-shielding layer 39, and are disposed between the second substrate 31 and the color filter 32.

The common electrode COML is provided on a side of the second substrate 31 opposite to another side thereof facing the first electrodes TDL. The common electrode COML is provided between the color filter 32 and the liquid crystal layer 6 in the direction orthogonal to the first substrate 21. The common electrode COML is made of a light-transmitting conductive material, such as ITO.

The liquid crystal layer 6 includes, for example, nematic liquid crystals. Liquid crystal molecules of the liquid crystal layer 6 are stationary in an initial orientation state while no electric field is generated between the common electrode COML and the pixel electrodes 25. During a display period Pd (refer to FIG. 10), the level of a voltage between the common electrode COML and each of the pixel electrodes 25 is changed, and an electric field is generated between the common electrode COML and the pixel electrode 25. As a result, the orientation of the liquid crystal molecules changes from the initial orientation. The electric field can differ between the pixel electrodes 25. Accordingly, light passing through the liquid crystal layer 6 is modulated on a per sub-pixel SPix basis.

With the configuration described above, the first substrate 21, the third electrodes 24, the pixel electrodes 25, the liquid crystal layer 6 serving as the display functional layer, the common electrode COML, and the first electrodes TDL are provided so as to overlap in this order. The second substrate 31 serving as an insulating substrate is provided between the second electrodes 33 with the common electrode COML and the first electrodes TDL. The incident light incident from the first surface 50a side of the display device 1 passes through the counter substrate 3 and the liquid crystal layer 6, and reaches the pixel electrodes 25. The incident light is reflected by the pixel electrodes 25. The light reflected by the pixel electrodes 25 passes through the liquid crystal layer 6 to be modulated on a per sub-pixel SPix basis, and is transmitted from the first surface 50a.

Since the display device 1 is a reflective display device that performs display by reflecting the external light, a light source, such as a frontlight or a backlight, is not provided. The display device 1 is, however, not limited to this configuration, and may have a light source, such as the frontlight or the backlight. In this case, the frontlight is provided on the first surface 50a side, or the backlight is provided on the back surface of the pixel substrate 2, that is, on a side of the first substrate 21 opposite to another side thereof facing the liquid crystal layer 6. When the backlight is used, light from the backlight passes between the pixel electrodes 25 to reach the first surface 50a. The light from the backlight serves as auxiliary light.

Figure 7:
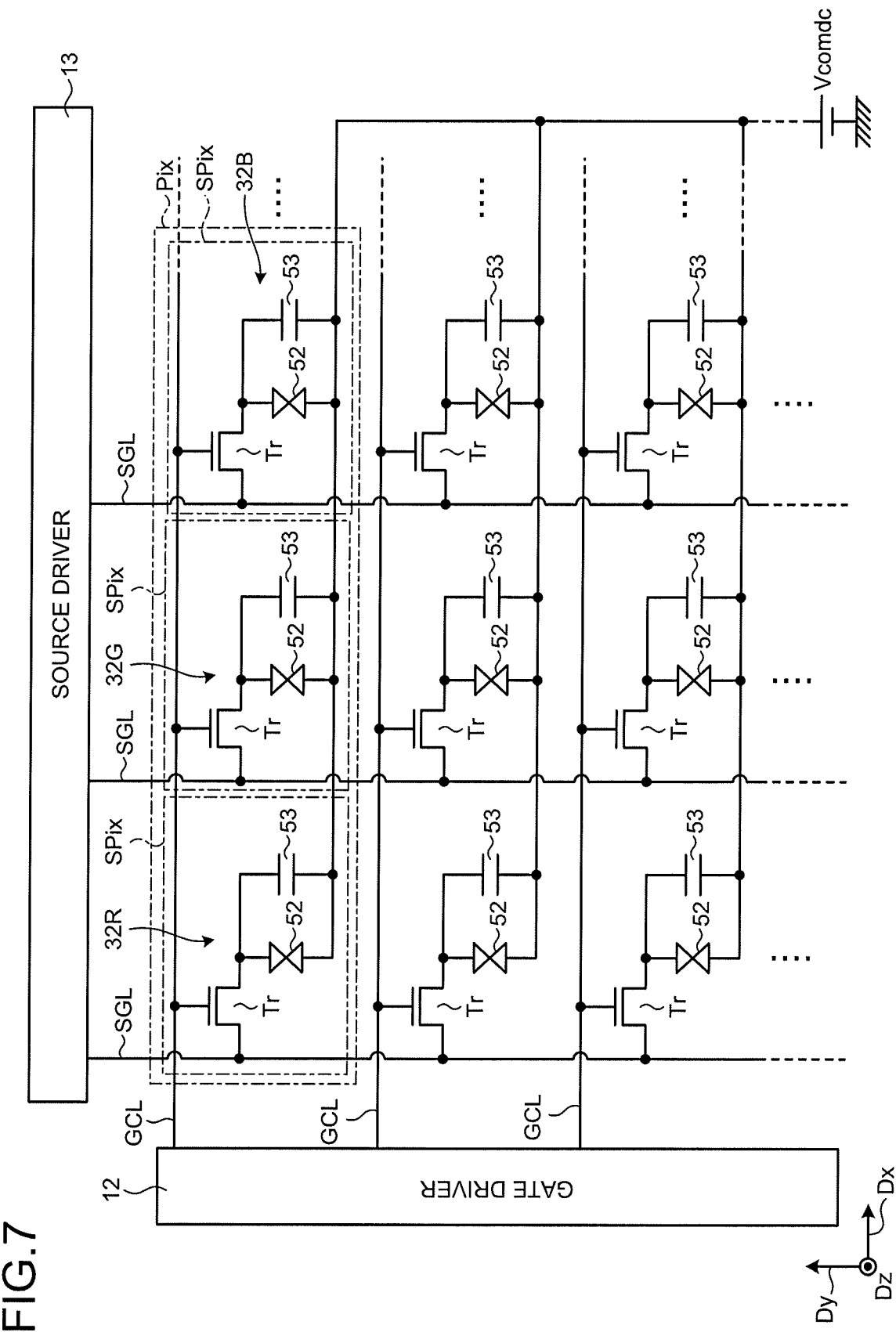
FIG. 7 is a circuit diagram illustrating a pixel array of the display device according to the first embodiment.

The following describes the display operation of the display device 1. FIG. 7 is a circuit diagram illustrating a pixel array of the display device according to the first embodiment. The first substrate 21 illustrated in FIG. 6 is provided with switching elements Tr of the respective sub-pixels SPix and wiring, such as the signal lines SGL for supplying the pixel signals Vpix to the corresponding pixel electrodes 25 and the gate lines GCL for supplying the drive signals for driving the switching elements Tr. The gate lines GCL and the signal lines SGL are provided so as to intersect with each other. The gate lines GCL and the signal lines SGL partition a display region Ad (refer to FIG. 8) into a matrix having a row-column configuration. Each of the partitioned regions is referred to as the sub-pixel SPix.

As illustrated in FIG. 7, the display device 1 includes the sub-pixels SPix arranged in a matrix having a row-column configuration. Each of the sub-pixels SPix includes the switching element Tr, a liquid crystal element 52, and the retention capacitor 53. The sub-pixel SPix is provided with the pixel electrode 25 (refer to FIG. 6), and the pixel electrode 25 is coupled to the switching element Tr. The switching element Tr is fabricated from a thin-film transistor (TFT), and in the present example, fabricated from an n-channel metal oxide semiconductor (MOS) TFT. The liquid crystal element 52 includes liquid crystal capacitance generated between the pixel electrode 25 and the common electrode COML. Capacitance generated between the pixel electrodes 25 and the third electrodes 24 can be used as the retention capacitance 53. The sub-pixel SPix is not limited to this configuration, but may be provided with a capacitive element.

The gate lines GCL are coupled to the gate driver 12. The gate driver 12 sequentially selects the gate lines GCL. The gate driver 12 applies a scan signal Vscan (refer to FIG. 1) to the gate of each of the switching elements Tr through the selected one of the gate lines GCL. This operation sequentially selects one row (one horizontal line) of the sub-pixels SPix as a target of display driving. The signal lines SGL are coupled to the source driver 13. The source driver 13 supplies the pixel signal Vpix to each of the sub-pixels SPix included in the selected one horizontal line through the signal lines SGL. These sub-pixels SPix perform display of each horizontal line according to the supplied pixel signals Vpix.

When this display operation is performed, the drive circuit 14 (refer to FIG. 1) applies the display drive signal Vcomdc to the common electrode COML and the third electrodes 24. As a result, the common electrode COML and the third electrodes 24 serve as common electrode for the pixel electrodes 25 during the display operation.

The color regions 32R, 32G, and 32B of the three colors correspond to the sub-pixels SPix illustrated in FIG. 7 described above. The combination of the color regions 32R, 32G, 32B is regarded as a set. The sub-pixels SPix corresponding to the color regions 32R, 32G, and 32B of the three colors constitute a pixel Pix as a set.

Figure 8:
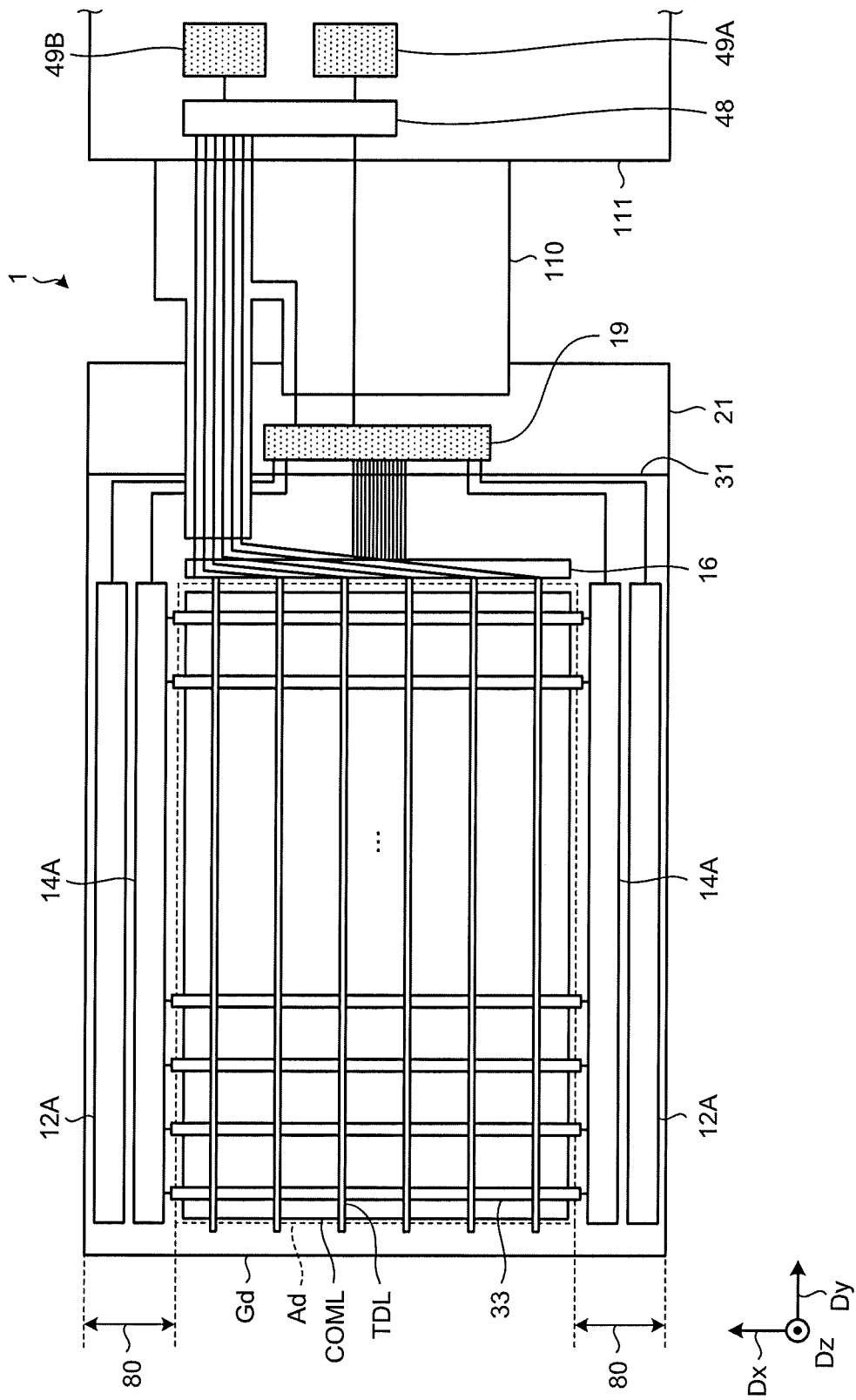
FIG. 8 is a plan view schematically illustrating the display device according to the first embodiment.

The following describes the configuration of the first electrodes TDL, the second electrodes 33, and the common electrode COML and the touch detection operation. FIG. 8 is a plan view schematically illustrating the display device according to the first embodiment. As illustrated in FIG. 8, the display device 1 is provided with the display region Ad and a peripheral region Gd. In this specification, the display region Ad is a region for displaying the image, and is a region overlapping with the pixels Pix (sub-pixels SPix). In this embodiment, a direction along a long side of the display region Ad is assumed to be the second direction Dy, and a direction intersecting with the second direction Dy is assumed to be the first direction Dx.

As illustrated in FIG. 8, the first electrodes TDL, the second electrodes 33, and the common electrode COML are provided in the display region Ad. The common electrode COML is continuously provided over the entire area of the display region Ad. The first electrodes TDL extend along the second direction Dy, and are arranged in the first direction Dx. The second electrodes 33 extend along the first direction Dx, and are arranged in the second direction Dy. That is, the first electrodes TDL and the second electrodes 33 are provided so as to intersect with each other in the plan view. Both the first electrodes TDL and the second electrodes 33 are formed into strips. Electrostatic capacitance is generated at intersecting portions between the first electrodes TDL and the second electrodes 33, and at the peripheries of the intersecting portions.

The first electrodes TDL are made by forming thin metal wires having a width of several micrometers to several tens micrometers into zigzag lines, wavy lines, or a mesh. A metal material having good conductivity is used for the second electrodes 33. In the same manner as the common electrode COML, the first electrodes TDL may be made of a light-transmitting conductive material, such as ITO.

As illustrated in FIG. 8, a flexible substrate 110 and a control board 111 are coupled to the first substrate 21 and the second substrate 31 in the peripheral region Gd. The control board 111 is provided with a first touch integrated circuit (IC) 49A and a second touch IC 49B that control the detection operations of the display panel 10. The first touch IC 49A mainly controls the electromagnetic induction-based touch detection and force detection. The second touch IC 49B mainly controls the capacitive touch detection.

The first electrodes TDL are electrically coupled to the first touch IC 49A and the second touch IC 49B through a multiplexer 48. The multiplexer 48 is a switching circuit that switches the coupling state between the first electrodes TDL and the first and second touch ICs 49A and 49B. In addition, the first substrate 21 in the peripheral region Gd is provided with a driver IC 19 for controlling the display operation of the display panel 10. The common electrode COML is electrically coupled to the driver IC 19. The various circuits, such as the source driver 13 and the drive circuit 14, illustrated in FIG. 1 are provided in the driver IC 19. A multiplexer 16 is provided between the driver IC 19 and the display region Ad. The first AFE 47A illustrated in FIG. 1 is provided in the first touch IC 49A, and the second AFE 47B illustrated in FIG. 1 is provided in the second touch IC 49B. The present disclosure is, however, not limited to this configuration. Only one touch IC may be provided.

Each of the long sides of the peripheral region Gd of the first substrate 21 is provided with various circuits, such as a gate scan circuit 12A and a second electrode scan circuit 14A. The gate scan circuit 12A is included in the gate driver 12 (refer to FIG. 1), and sequentially selects the gate lines GCL. The second electrode scan circuit 14A is a circuit that sequentially or simultaneously selects the second electrodes 33. The second electrode scan circuit 14A is electrically coupled to the second electrodes 33, and supplies various drive signals from the driver IC 19 to the second electrodes 33. A region of the peripheral region Gd provided with the gate scan circuit 12A and the second electrode scan circuit 14A serves as a peripheral circuit region 80.

With this configuration, when the mutual-capacitive touch detection is performed, the driver IC 19 supplies the second drive signal TSVcom to the second electrodes 33 in a time-division manner. In this case, the second electrode scan circuit 14A may simultaneously select more than one of the second electrodes 33 as a drive electrode block Bk, and sequentially supply the second drive signal TSVcom to the drive electrode block Bk on a block-by-block basis (refer to FIG. 17). The third detection signal Vdet3 corresponding to a change in electrostatic capacitance between the second electrodes 33 and the first electrodes TDL is output from the first electrodes TDL to the second touch IC 49B. Thus, the touch of the detection target body is detected. That is, each of the second electrodes 33 corresponds to the drive electrode E1, and each of the first electrodes TDL corresponds to the detection electrode E2, in the basic principle of the mutual-capacitive touch detection described above.

Figure 9:
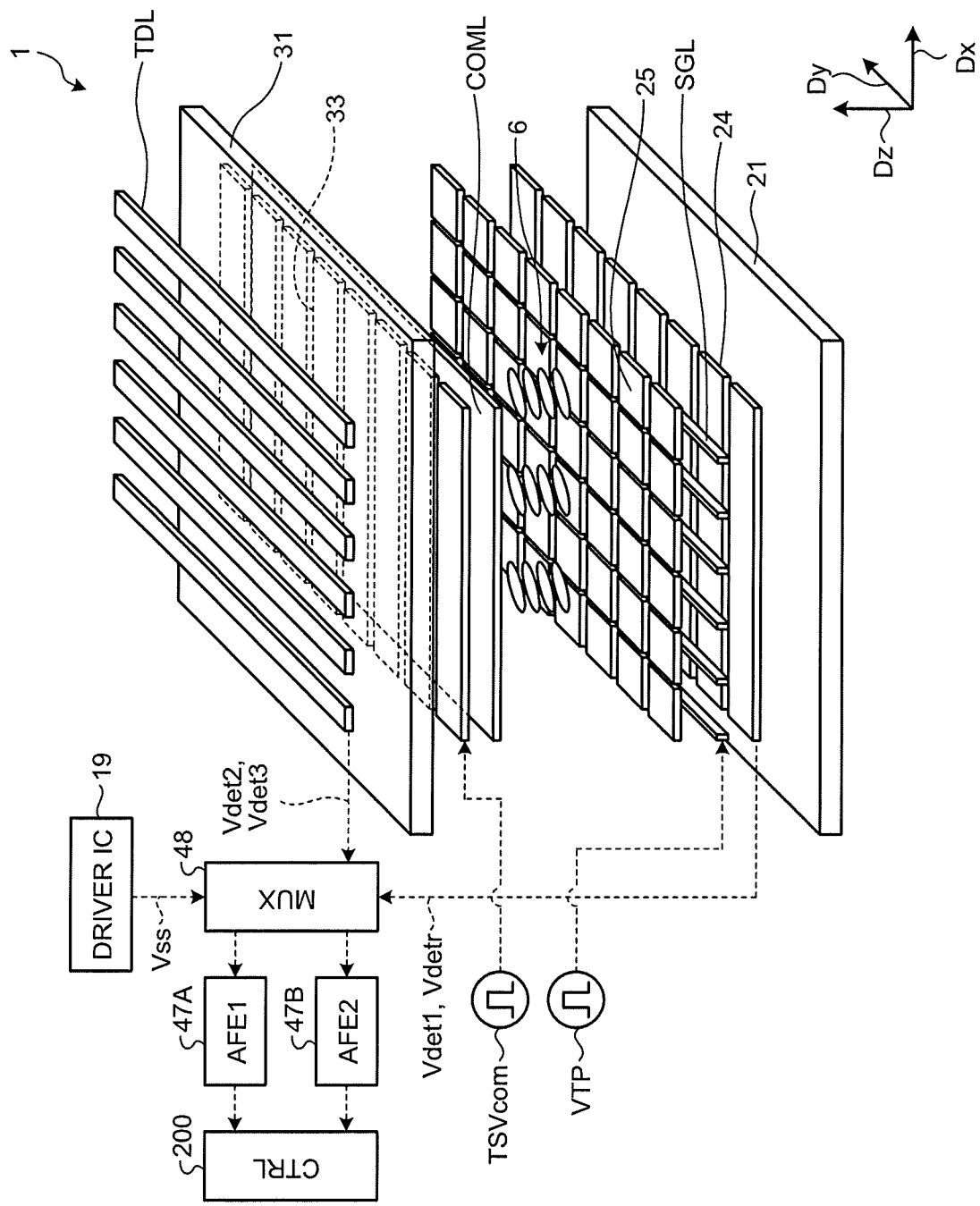
FIG. 9 is an exploded perspective view of the display device according to the first embodiment.

FIG. 9 is an exploded perspective view of the display device according to the first embodiment. As illustrated in FIG. 9, the third electrodes 24 are disposed between the first substrate 21 and the pixel electrodes 25. The third electrodes 24 extend along the first direction Dx, and are arranged in the second direction Dy. The signal lines SGL are disposed between the first substrate 21 and the liquid crystal layer 6. The signal lines SGL extend along the second direction Dy, and are arranged in the first direction Dx. The third electrodes 24 are provided so as to intersect with the signal lines SGL in the plan view. The first electrodes TDL and the second electrodes 33 are disposed facing one surface side of the common electrode COML, and the signal lines SGL and the third electrodes 24 are disposed facing the other surface side of the common electrode COML. The second electrodes 33 are provided so as to intersect with the signal lines SGL in the plan view, and extend along the third electrodes 24. The first electrodes TDL are provided so as to intersect with the second electrodes 33 and the third electrodes 24 in the plan view, and extend along the same direction as that of the signal lines SGL.

The first AFE 47A is electrically coupled to the third electrodes 24 through the multiplexer 48. The second AFE 47B is electrically coupled to the first electrodes TDL through the multiplexer 48. The driver IC 19 supplies a switching signal Vss to the multiplexer 48. The multiplexer 48 is a circuit that changes the coupling states of the third electrodes 24 and the first electrodes TDL to the first AFE 47A and the second AFE 47B based on the switching signal Vss.

The multiplexer 48 couples the third electrodes 24 to the first AFE 47A during the electromagnetic induction touch detection, and couples the first electrodes TDL and the third electrodes 24 to the first AFE 47A when the electromagnetic induction force detection is performed. The multiplexer 48 couples the first electrodes TDL to the second AFE 47B when the mutual-capacitance method is used. The multiplexer 48 may be provided on the control board 111 as illustrated in FIG. 8, or may be provided on the second substrate 31. The output signals from the first and second AFEs 47A and 47B are supplied to the external controller 200. The controller 200 is, for example, a host IC mounted on the control board 111.

When the electromagnetic induction touch detection is performed, the driver IC 19 supplies the first drive signal VTP to the signal lines SGL. The signal lines SGL serve as the transmitting coils CTx when the electromagnetic induction touch detection is performed. As a result, the electromagnetic induction is generated among the signal lines SGL, the touch pen 100, and the third electrodes 24. The electromotive force is generated in the third electrodes 24 by the mutual induction with the touch pen 100. The first detection signal Vdet1 corresponding to the electromotive force is supplied from the third electrodes 24 to the first AFE 47A through the multiplexer 48. As a result, the electromagnetic induction touch detection is performed.

When the electromagnetic induction force detection is performed, the driver IC 19 supplies the first drive signal VTP to the signal lines SGL. The signal lines SGL also serve as the transmitting coils CTx when the electromagnetic induction force detection is performed. As a result, the electromagnetic induction is generated between the signal lines SGL and the first electrodes TDL, and between the signal lines SGL and the third electrodes 24. The electromotive force is generated in the first electrodes TDL and the third electrodes 24 by the mutual induction of the first electrodes TDL and the third electrodes 24 with the signal lines SGL. The electromotive force changes with the distance between the signal lines SGL and the first electrodes TDL. The second detection signal Vdet2 corresponding to the electromotive force is supplied from the first electrodes TDL to the first AFE 47A through the multiplexer 48. A reference signal Vdetr is supplied from the third electrodes 24 to the first AFE 47A through the multiplexer 48. As a result, the electromagnetic induction force detection is performed.

When the mutual-capacitive touch detection is performed, the driver IC 19 supplies the second drive signal TSVcom to the second electrodes 33. The third detection signal Vdet3 corresponding to the change in electrostatic capacitance between the second electrodes 33 and the first electrodes TDL is supplied from the first electrodes TDL to the second AFE 47B through the multiplexer 48. As a result, the mutual-capacitive touch detection is performed.

In this embodiment, the signal lines SGL and the third electrodes 24 used for the electromagnetic induction touch detection are disposed on a first side of the common electrode COML, and the second electrodes 33 and the first electrodes TDL used for the mutual-capacitive touch detection are disposed on a second side of the common electrode COML opposite to the first side thereof. The second electrodes 33 and the first electrodes TDL are disposed on the second side of the common electrode COML, and the liquid crystal layer 6, the pixel electrodes 25, the signal lines SGL, and the third electrodes 24 are disposed on the first side of the common electrode COML. This configuration can restrain the electric field generated from the second electrodes 33 from affecting the liquid crystal layer 6 when the second drive signal TSVcom is supplied to the second electrodes 33. As a result, the mutual-capacitive touch detection can be performed synchronously or asynchronously with the display period.

Figure 10:
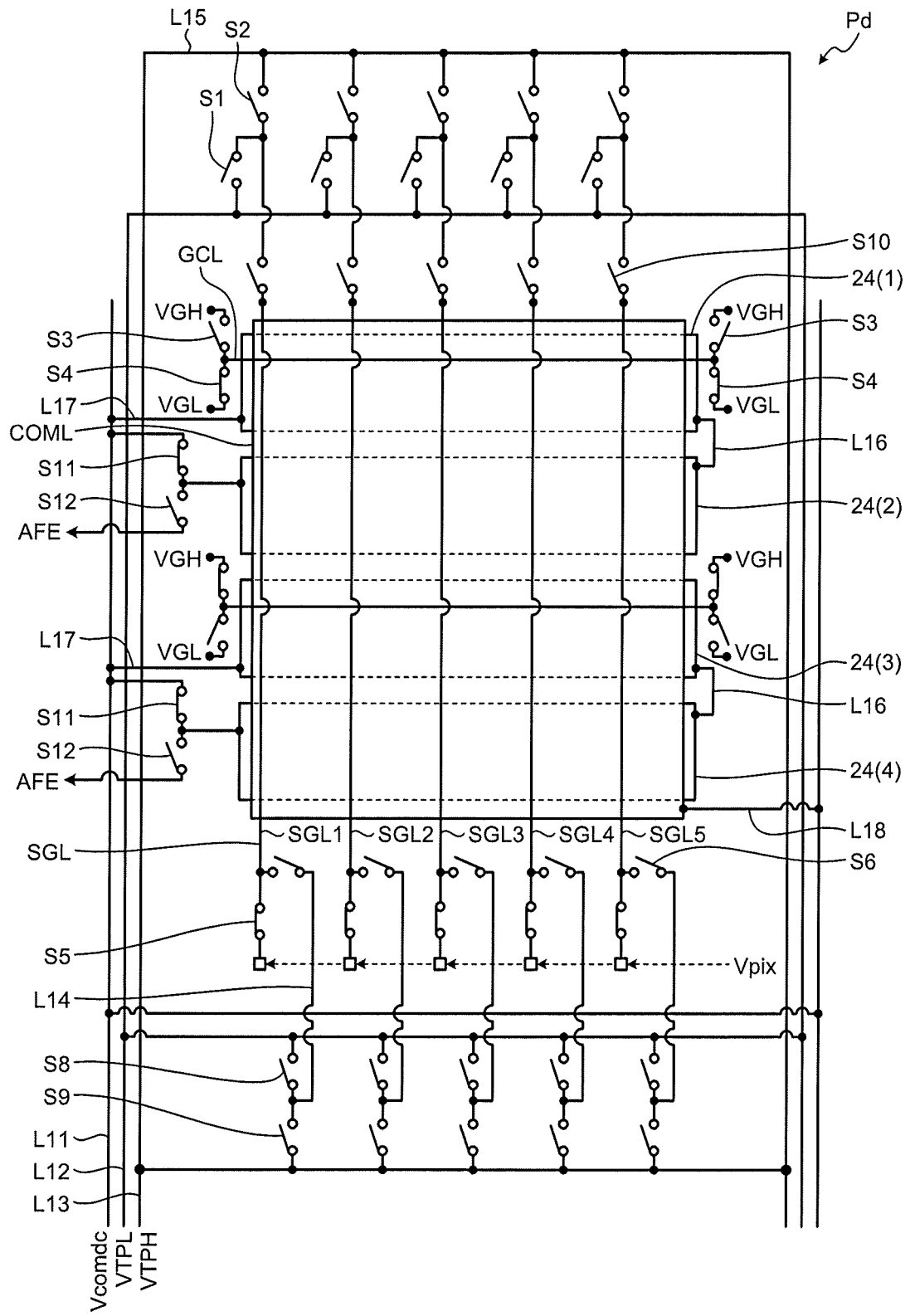
FIG. 10 is a circuit diagram illustrating a coupling configuration of signal lines, third electrodes, and a common electrode during a display period.
Figure 11:
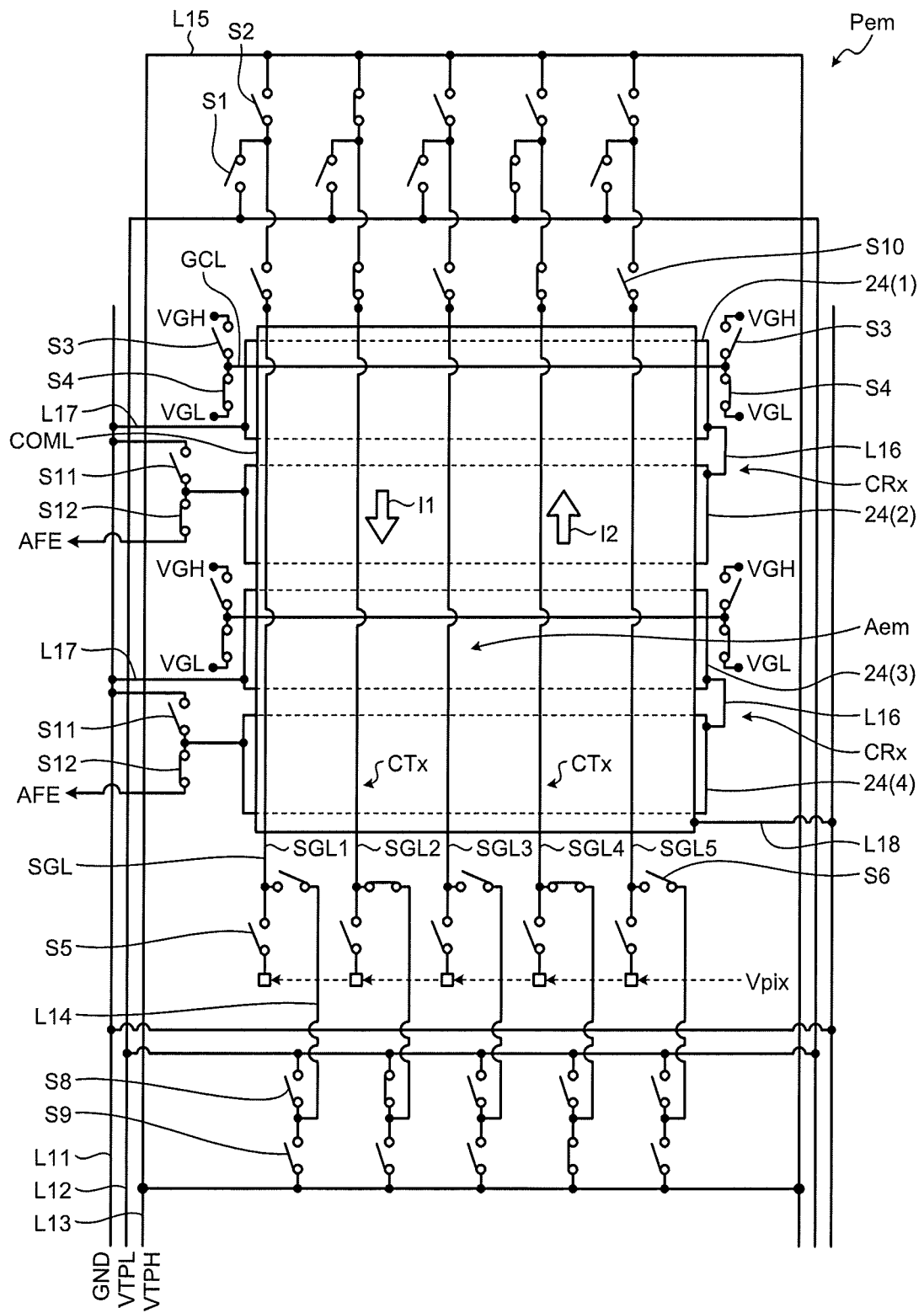
FIG. 11 is a circuit diagram illustrating a coupling configuration of the signal lines, the third electrodes, and the common electrode during a first sensing period.
Figure 12:
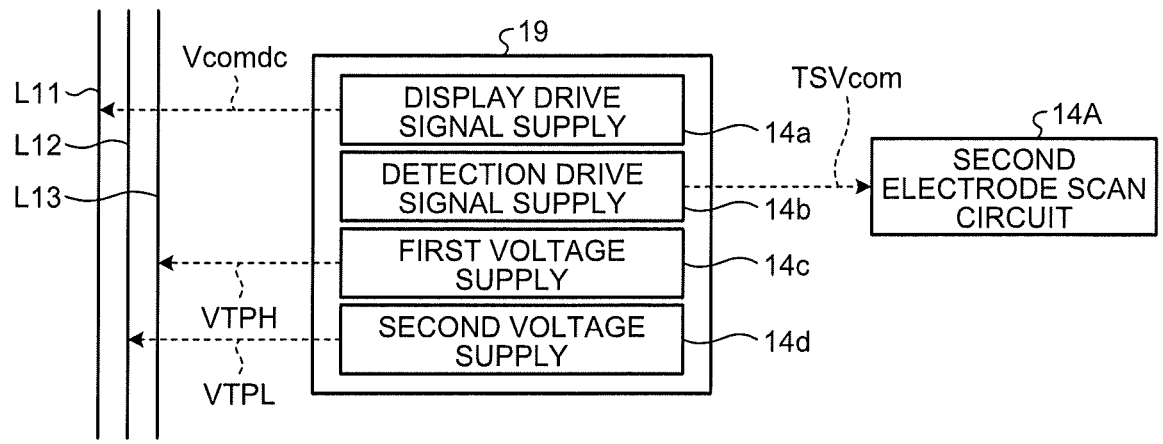
FIG. 12 is a block diagram illustrating a configuration example of supplies for supplying various signals.

The signal lines SGL have the function to supply the pixel signals Vpix during the display and the function of the transmitting coils CTx when the electromagnetic induction method is used. The third electrodes 24 have the function as the common electrodes during the display, and the function of the receiving coils CRx and the function of the second receiving coils CRx2 when the electromagnetic induction method is used. Therefore, the coupling state needs to be changed according to the operations of the respective functions. The following describes coupling configurations of the signal lines SGL and the third electrodes 24. FIG. 10 is a circuit diagram illustrating a coupling configuration of the signal lines, the third electrodes, and the common electrodes during the display period. FIG. 11 is a circuit diagram illustrating a coupling configuration of the signal lines, the third electrodes, and the common electrode during a first sensing period. FIG. 12 is a block diagram illustrating a configuration example of supplies for supplying various signals.

As illustrated in FIGS. 10 and 11, a plurality of signal lines SGL1, SGL2, SGL3, SGL4, and SGL5 are arranged. In the following description, the signal lines SGL1, SGL2, SGL3, SGL4, and SGL5 will each be referred to as a signal line SGL when they need not be distinguished from one another. A plurality of third electrodes 24(1), 24(2), 24(3), and 24(4) are arranged so as to intersect with the signal lines SGL. In the following description, the third electrodes 24(1), 24(2), 24(3), and 24(4) will each be referred to as a third electrode 24 when they need not be distinguished from one another. The common electrode COML is provided so as to overlap with the signal lines SGL and the third electrodes 24.

As illustrated in FIGS. 10 and 11, the display drive signal Vcomdc is supplied to the common electrode COML through wiring L11. A second voltage VTPL is supplied to the signal lines SGL through wiring L12. A first voltage VTPH is supplied to the signal lines SGL through wiring L13. Wiring L14 couples the signal lines SGL to the wiring L12 and L13. Wiring L15 couples the ends on the same sides of the signal lines SGL to one another.

As illustrated in FIG. 12, the driver IC 19 supplies the various signals to the signal lines SGL, the third electrodes 24, the common electrode COML, and the second electrodes 33 (refer to FIG. 9) through the wiring L11, L12, and L13 and the second electrode scan circuit 14A. The drive circuit 14 (refer to FIG. 1) includes a display drive signal supply 14a, a detection drive signal supply 14b, a first voltage supply 14c, and a second voltage supply 14d. These supplies 14a to 14d are incorporated in the driver IC 19.

The display drive signal supply 14a supplies the display drive signal Vcomdc to the common electrode COML and the third electrodes 24 through the wiring L11. The detection drive signal supply 14b supplies the second drive signal TSVcom for detection to the second electrodes 33 through the second electrode scan circuit 14A. The first voltage supply 14c supplies the first voltage VTPH of a direct current having a first potential to the signal lines SGL through the wiring L13. The second voltage supply 14d supplies the second voltage VTPL to the signal lines SGL through the wiring L12. The second voltage VTPL is a direct-current voltage signal having a second potential lower than the first potential. The display drive signal Vcomdc is a voltage signal having a potential lower than the second potential.

As illustrated in FIGS. 10 and 11, a switch S1 is provided between the wiring L12 and one end of the signal line SGL. A switch S2 is provided between the wiring L15 and one end of the signal line SGL. In the following description, one end of each of the signal lines SGL is referred to as the upper end, and the other end thereof is referred to as the lower end, with reference to FIGS. 10 and 11. A high-level voltage VGH of the scan signal Vscan (refer to FIG. 1) is supplied to the gate lines GCL through switches S3. A low-level voltage VGL of the scan signal Vscan is supplied to the gate lines GCL through switches S4. The pixel signals Vpix are supplied to the signal lines SGL through switches S5.

Switches S6 are provided between the signal lines SGL and the wiring L14. Switches S8 are provided between the wiring L12 and the wiring L14 coupled to the signal lines SGL. Switches S9 are provided between the wiring L13 and the wiring L14 coupled to the signal lines SGL. Switches S10 are provided on the upper ends of the signal lines SGL, and provided between the signal lines SGL and the wiring L12 and L13.

Of a pair of the third electrodes 24(1) and 24(2), one end of the third electrodes 24(1) is coupled to the wiring L11 through wiring L17. In the following description, one end of the third electrode 24 is referred to as the left end, and the other end thereof is referred to as the right end, with reference to FIGS. 10 and 11. The right ends on the same side of the third electrodes 24(1) and 24(2) are coupled to each other through wiring L16. As a result, the pair of the third electrodes 24(1) and 24(2) are coupled together so as to form a loop. The left end of the third electrode 24(2) is coupled to the wiring L11 through a switch S11, or coupled to the first AFE 47A through a switch S12. A pair of the third electrodes 24(3) and 24(4) are coupled together so as to form a loop in the same manner.

As illustrated in FIGS. 10 and 11, the common electrode COML is coupled to the wiring L11 through wiring L18. During the display period Pd, the common electrode COML is coupled to the display drive signal supply 14a (refer to FIG. 12) through the wiring L18 and L11. As a result, the display drive signal Vcomdc is supplied to the common electrode COML through the wiring L11.

During the display period Pd, the switches S11 are turned on and the switches S12 are turned off in response to the control signal from the controller 11. As a result, the left end of each of the third electrodes 24 is coupled to the wiring L11 through the wiring L17 or the switch S11. As a result, the display drive signal Vcomdc is supplied to each of the third electrodes 24 through the wiring L11. In this manner, the display drive signal Vcomdc is supplied to the common electrode COML, and also to the third electrodes 24 opposed to the common electrode COML.

The switches S3 and the switches S4 coupled to the gate lines GCL operate in a manner inverted from each other. The switches S3 are sequentially turned on to supply the high-level voltage VGH of the scan signal Vscan to a selected one of the gate lines GCL. The other of the gate lines GCL not selected are supplied with the low-level voltage VGL. The switches S5 are turned on to supply the pixel signals Vpix to the signal lines SGL.

During the display period Pd, the switches S6 and S10 are turned off to uncouple the signal lines SGL from the wiring L11, L12, and L13. As a result, the first voltage VTPH and the second voltage VTPL are not supplied to the signal lines SGL.

As described above, during the display period Pd, the pixel signals Vpix are supplied to the pixel electrodes 25 through the signal lines SGL, and the display drive signal Vcomdc as a common signal is supplied to the common electrode COML and the third electrodes 24.

As illustrated in FIG. 11, during a first sensing period Pem in which the electromagnetic induction touch detection is performed, the switches S5 are turned off and two of the switches S6 and two of the switches S10 are turned on in response to the control signal from the controller 11. As a result, two of the signal lines SGL are coupled to the supplies illustrated in FIG. 12 through the wiring L12, L13, and L15.

The following specifically describes a case illustrated in FIG. 11 where the signal lines SGL2 and SGL4 form the transmitting coil CTx (refer to FIG. 3). A region between the signal lines SGL2 and SGL4 serves as a detection region Aem. Specifically, the switches S10 coupled to the upper ends of the signal lines SGL2 and SGL4 are turned on. The switches S6 coupled to the lower ends of the signal lines SGL2 and SGL4 are also turned on.

On the upper end side of the signal line SGL2, the switch S1 is turned off, and the switch S2 is turned on. As a result, the upper end of the signal line SGL2 is electrically coupled to the wiring L15 and L13. On the lower end side of the signal line SGL2, the switch S8 is turned on, and the switch S9 is turned off. As a result, the lower end of the signal line SGL2 is electrically coupled to the wiring L12.

On the upper end side of the signal line SGL4, the switch S1 is turned on, and the switch S2 is turned off. As a result, the upper end of the signal line SGL4 is electrically coupled to the wiring L12. On the lower end side of the signal line SGL4, the switch S8 is turned off, and the switch S9 is turned on. As a result, the lower end of the signal line SGL4 is electrically coupled to the wiring L13.

As a result, during the first sensing period Pem, in response to the control signal from the controller 11, the first voltage supply 14c (refer to FIG. 12) is coupled to the upper end of at least one of the signal lines SGL (signal line SGL2), and the second voltage supply 14d (refer to FIG. 12) is coupled to the lower end thereof. In addition, the second voltage supply 14d is coupled to the upper end of the signal line SGL (signal line SGL4) different from the at least one of the signal lines SGL (signal line SGL2), and the first voltage supply 14c is coupled to the lower end thereof.

The first voltage supply 14c supplies the first voltage VTPH to the upper end of the signal line SGL2 through the wiring L13 and L15. The second voltage supply 14d supplies the second voltage VTPL to the lower end of the signal line SGL2 through the wiring L12. As a result, a potential difference is generated between the upper end and the lower end of the signal line SGL2 to cause a current I1 to flow in a direction from the upper end toward the lower end thereof.

The first voltage supply 14c supplies the first voltage VTPH to the lower end of the signal line SGL4 through the wiring L13 and L14. The second voltage supply 14d supplies the second voltage VTPL to the upper end of the signal line SGL4 through the wiring L12. As a result, a potential difference is generated between the upper end and the lower end of the signal line SGL4 to cause a current I2 to flow in a direction from the lower end toward the upper end thereof.

In this embodiment, the first voltage VTPH and the second voltage VTPL supplied to both ends of the signal lines SGL are changed over to each other at a predetermined frequency by switching the operations of the switches S1, S2, S8, and S9. As a result, the signal lines SGL are supplied with the first drive signal VTP serving as an alternating-current voltage signal.

The currents I1 and I2 flowing in the signal lines SGL generate the magnetic field to cause the electromagnetic induction. As illustrated in FIG. 11, the currents I1 and I2 flow in directions opposite to each other. As a result, the magnetic field generated by the current I1 overlaps with the magnetic field generated by the current I2 in the detection region Aem. This overlap can increase the strength of the magnetic field passing through the detection region Aem. The magnetic fields generated by the current I1 and the current I2 correspond to the magnetic field M1 generated during the magnetic field generation period of the electromagnetic induction method illustrated in FIG. 3. The signal lines SGL2 and SGL4 correspond to the transmitting coil CTx.

The controller 11 sequentially selects the signal lines SGL. As a result, the touch detection is performed over the entire display region Ad using the electromagnetic induction method. In FIG. 11, the transmitting coil CTx is formed by two of the signal lines SGL. However, the transmitting coil CTx is not limited to this example, and may be formed by two or more of the signal lines SGL disposed on one side of the detection region Aem and two or more of the signal lines SGL disposed on the other side of the detection region Aem. The numbers of the signal lines SGL on both sides of the detection region Aem need not be equal to each other. A configuration can be employed in which the number of the signal lines SGL on one side differs from that of the signal lines SGL on the other side. In the above-described cases, the ends on the same side of the signal lines SGL are electrically coupled to one another through the switches S10 and S2 and the wiring L15 that are provided on the upper side. During periods (display period Pd and third sensing period Pes) different from the first sensing period Pem, each pair of the signal lines SGL is brought into an uncoupled state by operation of the switches.

During the first sensing period Pem, the wiring L11 is grounded, and a ground voltage GND is supplied to the left end of the third electrode 24(1) and the left end of the third electrode 24(3). The switches S11 coupled to the respective left ends of the third electrodes 24(2) and 24(4) are turned off, and the switches S12 coupled thereto are turned on. As a result, the left end of the third electrode 24(2) and the left end of the third electrode 24(4) are coupled to the first AFE 47A through the corresponding switches S12. As a result, a pair of the third electrodes 24(1) and 24(2) is provided as the receiving coil CRx (FIG. 3). A pair of the third electrodes 24(3) and 24(4) is also provided as the receiving coil CRx. An electromotive force based on the electromagnetic induction is generated in each pair of the third electrodes 24. A signal corresponding to this electromotive force is supplied as the first detection signal Vdet1 to the first AFE 47A.

The switches S1, S2, and S10 coupled to the upper end sides of the signal lines SGL1, SGL3, and SGL5 are turned off, and the switches S5, S6, S8, and S9 coupled to the lower end sides thereof are turned off. As a result, the signal lines SGL1, SGL3, and SGL5 are not supplied with the ground voltage GND, the first voltage VTPH, and the second voltage VTPL, and are placed in a floating state.

During the first sensing period Pem, all the switches S3 are turned off, and all the switches S4 are turned on. As a result, the gate lines GCL are supplied with the low-level voltage VGL as a direct-current voltage signal. All the switches S5 are turned off, and thus, none of the signal lines SGL are supplied with the pixel signal Vpix.

During a second sensing period Pf (refer to FIG. 21) in which the electromagnetic induction force detection is performed, the signal lines SGL and the third electrodes 24 are coupled in the same manner as in FIG. 11. With this configuration, the signal lines SGL correspond to the transmitting coils CTx, and the third electrodes 24 correspond to the second receiving coils CRx2. The magnetic field generated from the signal lines SGL corresponds to the magnetic field M3 illustrated in FIG. 5. The distances between the third electrodes 24 and the signal lines SGL do not substantially change when the force is applied by the detection target body to the first surface 50a of the cover member 50 (refer to FIG. 6). Therefore, the electromotive force generated in the third electrodes 24 does not change between when no force is applied and when the force is applied. Accordingly, the signal corresponding to the electromotive force of the third electrodes 24 can be used as the reference signal Vdetr.

Figure 13:
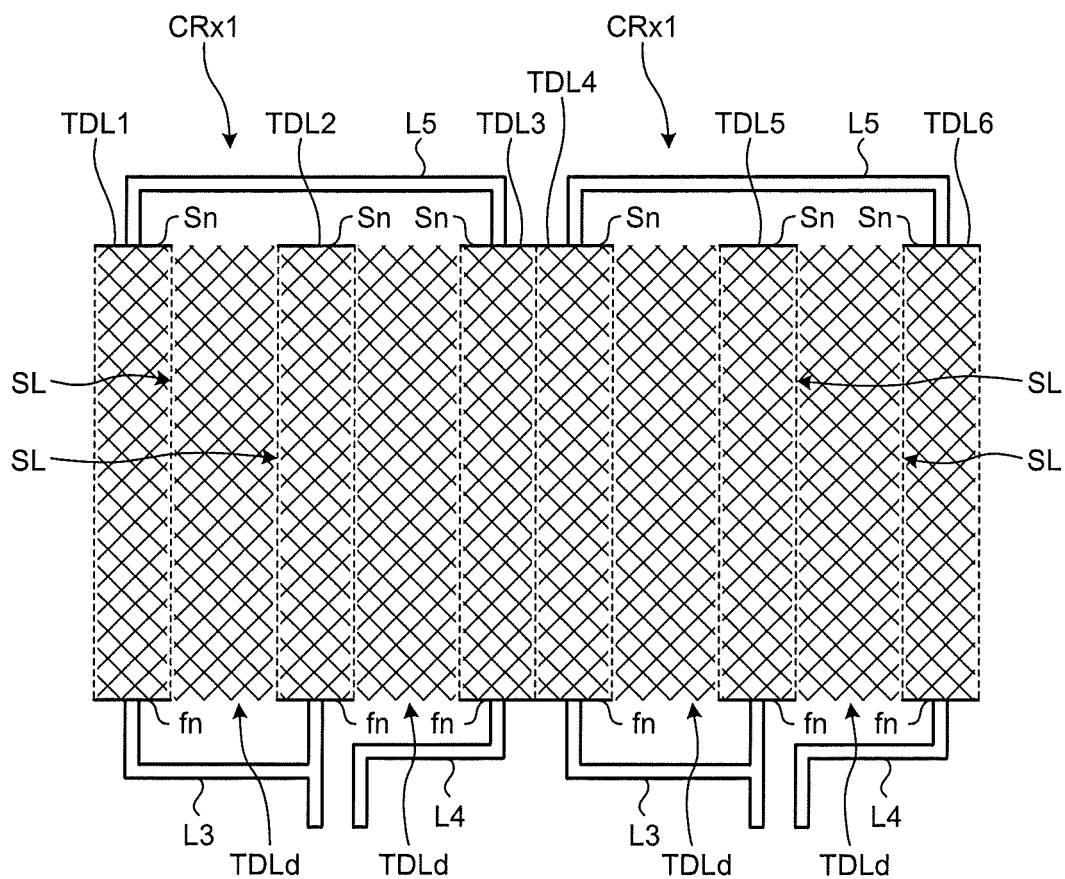
FIG. 13 is a plan view schematically illustrating first electrodes.

In the force detection, the first electrodes TDL serve as the first receiving coils CRx1. FIG. 13 is a plan view schematically illustrating the first electrodes. FIG. 13 illustrates six first electrodes TDL1, TDL2, TDL3, TDL4, TDL5, and TDL6 of the first electrodes TDL. In the following description, the six first electrodes TDL1, TDL2, TDL3, TDL4, TDL5, and TDL6 will each be referred to as a first electrode TDL when they need not be distinguished from one another.

Dummy electrodes TDLd are provided between the adjacent first electrodes TDL. The dummy electrodes TDLd are made of mesh-shaped thin metal wires similar to those of the first electrodes TDL. The dummy electrodes TDLd are isolated by slits SL from the first electrodes TDL, and are coupled to none of wiring L3, L4, and L5. That is, the dummy electrodes TDLd are in the floating state. The configuration described above reduces the difference in light transmittance between a portion provided with the first electrodes TDL and a portion provided with the dummy electrodes TDLd.

A lower end fn of the first electrode TDL1 is coupled to the lower end fn of the first electrode TDL2 through the wiring L3. The wiring L4 is coupled to the lower end fn of the first electrode TDL3. An upper end Sn of the first electrode TDL1 is coupled to the upper end Sn of the first electrode TDL3 through the wiring L5. Either one of the wiring L3 and the wiring L4 is coupled to the first AFE 47A and the second AFE 47B through the multiplexer 48 (refer to FIG. 9). The other one of the wiring L3 and the wiring L4 is coupled to the ground (not illustrated). The same configuration applies to the first electrodes TDL4, TDL5, and TDL6.

In this manner, the first electrode TDL1, the wiring L5, and the first electrode TDL3 are coupled together so as to form a loop surrounding the dummy electrodes TDLd and the first electrode TDL2. As a result, the first electrode TDL1, wiring L5, and the first electrode TDL3 constitute the first receiving coil CRx1 in the electromagnetic induction force detection. Specifically, when the magnetic field M3 from the transmitting coil CTx formed by the signal lines SGL passes through a region surrounded by the first electrode TDL1, the wiring L5, and the first electrode TDL3, an electromotive force corresponding to a change in the magnetic field M3 is generated in the first electrode TDL1, the wiring L5, and the first electrode TDL3. When the force is applied by the detection target body to the first surface 50a of the cover member 50 (refer to FIG. 6), the first electrodes TDL are deformed in a direction coming closer to the second substrate 31. The electromotive force generated in the first receiving coil CRx1 changes with a change in the distance between the first electrodes TDL and the signal lines SGL. As a result, the distance between the transmitting coil CTx and the first receiving coil CRx1 can be detected. A signal corresponding to this electromotive force is supplied as the second detection signal Vdet2 to the first AFE 47A.

As illustrated in FIG. 9, the signal lines SGL and the first electrodes TDL are provided along the same direction in the plan view. Since this configuration increases an area of overlap between the transmitting coil CTx and the first receiving coil CRx1, the force detection can be improved in detection sensitivity.

During the mutual-capacitive touch detection, the signal lines SGL and the third electrodes 24 illustrated in FIG. 11 are not driven. The second electrodes 33 illustrated in FIG. 9 are brought into conduction with the first substrate 21, and are driven as the drive electrodes E1 of the mutual capacitance method. As illustrated in FIG. 13, in the capacitance method, the first electrodes TDL1, TDL2, and TDL3 are electrically coupled to one another, and serve as one detection electrode block. The first electrodes TDL1, TDL2, and TDL3 supply a signal corresponding to a change in capacitance between themselves and the second electrodes 33 as the third detection signal Vdet3 to the second AFE 47B.

As described above, during the electromagnetic induction force detection, each of the first electrodes TDL serves as the first receiving coil CRx1, and each of the third electrodes 24 serves as the second receiving coil CRx2. During the mutual-capacitive touch detection, each of the first electrodes TDL serves as the detection electrode E2. Therefore, the coupling state of each of the electrodes to the first AFE 47A and the second AFE 47B needs to be switched.

Figure 14:
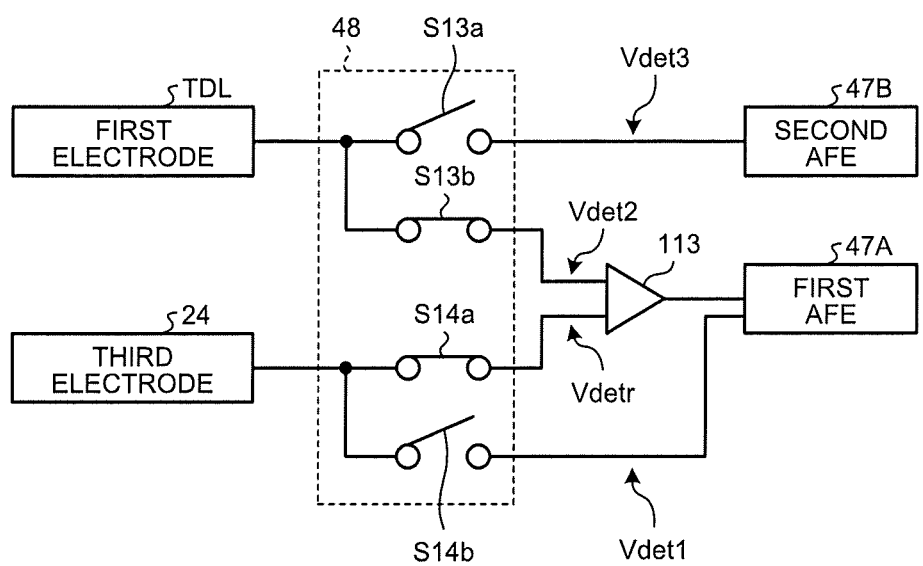
FIG. 14 is a circuit diagram schematically illustrating a configuration example of a multiplexer.

FIG. 14 is a circuit diagram schematically illustrating a configuration example of the multiplexer. The multiplexer 48 includes, for example, switches S13$a$, S13$b$, S14$a$, and S14$b$. The switch S13$a$ switches the coupling state between the first electrodes TDL and the second AFE 47B. The switch S13$b$ switches the coupling state of the first electrodes TDL to the first AFE 47A. The switches S14$a$ and S14$b$ switch the coupling state of the third electrodes 24 to the first AFE 47A.

During the electromagnetic induction touch detection, the switches S13$a$ and S13$b$ are turned off. As a result, the first electrodes TDL are uncoupled from the first AFE 47A and the second AFE 47B. The switch S14$a$ is turned off, and the switch S14$b$ is turned on. As a result, the third electrodes 24 are coupled to the first AFE 47A, and the first detection signal Vdet1 is supplied to the first AFE 47A.

During the electromagnetic induction force detection, the switch S13$a$ is turned off, as illustrated in FIG. 14. As a result, the first electrodes TDL are uncoupled from the second AFE 47B. The switches S13$b$ and S14$a$ are turned on, and the switch S14$b$ is turned off. As a result, the first electrodes TDL and the third electrodes 24 are coupled to the first AFE 47A through a differential amplifier 113. One input terminal of the differential amplifier 113 is supplied with the second detection signal Vdet2 of the first electrodes TDL. The other input terminal of the differential amplifier 113 is supplied with the reference signal Vdetr of the third electrodes 24. The differential amplifier 113 amplifies the difference voltage between the second detection signal Vdet2 and the reference signal Vdetr. The amplified voltage signal is supplied from the differential amplifier 113 to the first AFE 47A. This configuration can increase the detection accuracy in the force detection.

During the capacitive touch detection, the switches S13$b$, S14$a$, and S14$b$ are turned off. As a result, the first electrodes TDL and the third electrodes 24 are uncoupled from the first AFE 47A. The switch S13$a$ is turned on. As a result, the first electrodes TDL are electrically coupled to the second AFE 47B, and the third detection signal Vdet3 is supplied from the first electrodes TDL to the second AFE 47B.

Figure 15:
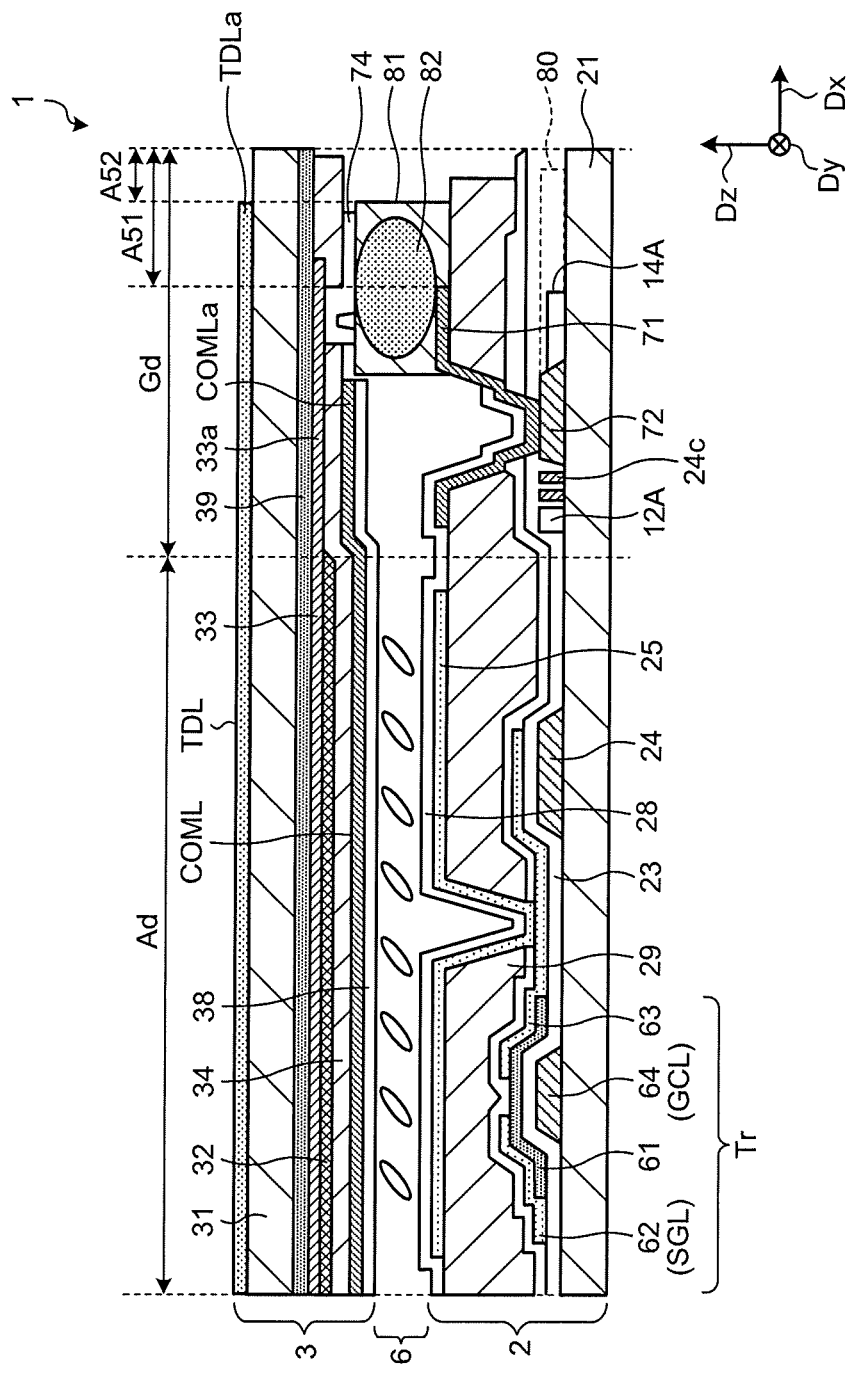
FIG. 15 is a diagram of a sectional structure for explaining a coupling configuration of second electrodes.
Figure 16:
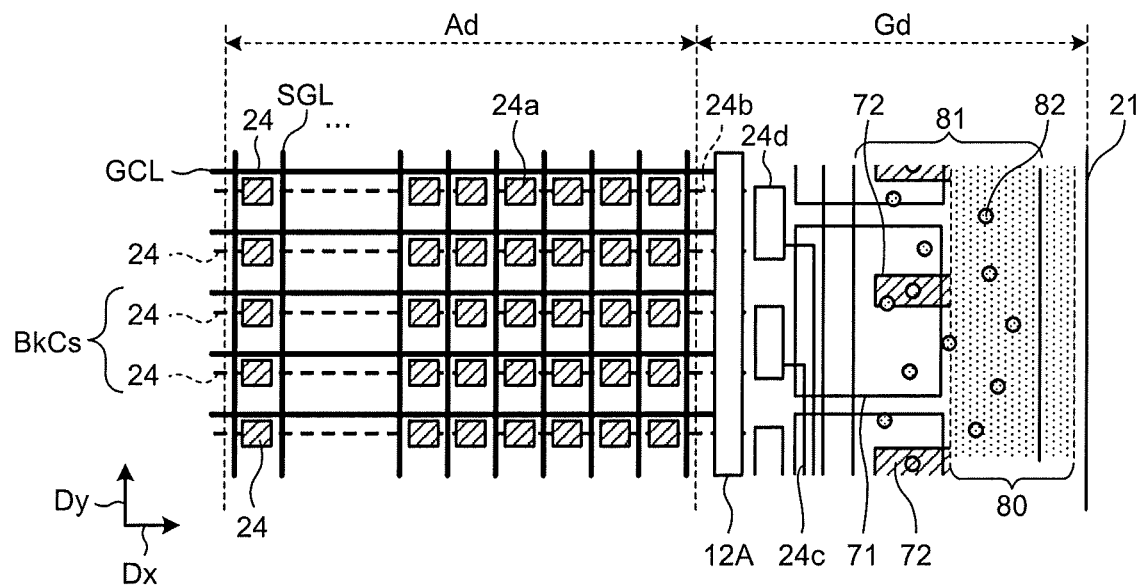
FIG. 16 is a plan view schematically illustrating the third electrodes and a conductive portion.
Figure 17:
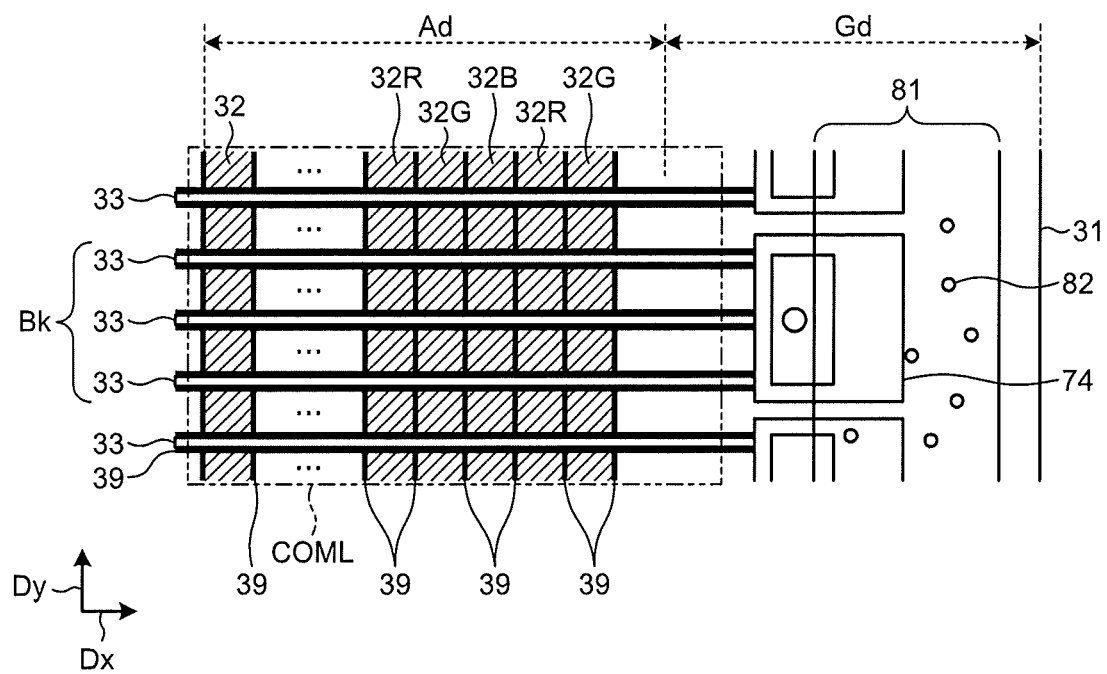
FIG. 17 is a plan view schematically illustrating the second electrodes and the conductive portion.

The following describes a coupling configuration between the second electrodes 33 and the first substrate 21. FIG. 15 is a diagram of a sectional structure for explaining a coupling configuration of the second electrodes. FIG. 16 is a plan view schematically illustrating the third electrodes and a conductive portion. FIG. 17 is a plan view schematically illustrating the second electrodes and the conductive portion.

FIG. 15 illustrates a portion for one pixel at the outermost circumference of the display region Ad and the peripheral region Gd adjacent thereto. As illustrated in FIG. 15, in the pixel substrate 2, for example, the switching elements Tr, the pixel electrodes 25, the third electrodes 24, a coupling wiring 24$c$, coupling electrodes 72, the insulating layer 23, the planarizing film 29, and the orientation film 28 are provided on the first substrate 21. The orientation film 28 is provided so as to cover the pixel electrodes 25 in the display region Ad. The orientation film 28 is provided in a region not overlapping with a conductive portion 81 in the peripheral region Gd, and overlaps with a part of a conductive layer 71. The switching element Tr includes a gate electrode 64, a source electrode 62, a semiconductor layer 61, and a drain electrode 63. The gate electrode 64 is provided in the same layer as that of the gate lines GCL. A part of each of the gate lines GCL may be used as the gate electrode 64. The source electrode 62 is provided in the same layer as that of the signal lines SGL. A part of each of the signal lines SGL may be used as the source electrode 62.

Each of the pixel electrodes 25 is coupled to the drain electrode 63 through a contact hole provided in the planarizing film 29. The third electrodes 24 are provided in the same layer as that of the gate electrode 64 (gate line GCL). Each of the third electrodes 24 is provided so as to overlap with the drain electrode 63 and the pixel electrode 25 when viewed from the direction orthogonal to the surface of the first substrate 21.

As illustrated in FIG. 15, in the counter substrate 3, the light-shielding layer 39, the second electrodes 33, the color filter 32, an overcoat layer 34, the common electrode COML, and the orientation film 38 stacked on one surface of the second substrate 31 in this order. The first electrodes TDL is disposed on the other surface of the second substrate 31. That is, the overcoat layer 34 serving as an insulating layer is provided on the common electrode COML. The second electrodes 33 and the first electrodes TDL opposed to the second electrodes 33 with a space therebetween are provided on the overcoat layer 34.

The second electrodes 33 are continuously provided from the display region Ad to the peripheral region Gd. Portions of the second electrodes 33 provided in the peripheral region Gd serve as coupling portions 33$a$. The overcoat layer 34 is provided so as to cover the color filter 32 and the coupling portions 33$a$. The common electrode COML is provided between the overcoat layer 34 and the liquid crystal layer 6. The common electrode COML is continuously provided from the display region Ad to the peripheral region Gd. A portion of the common electrode COML provided in the peripheral region Gd serves as a coupling portion COMLa. The orientation film 38 is provided so as to cover the common electrode COML in the display region Ad. The orientation film 38 is provided in a region not overlapping with the conductive portion 81 in the peripheral region Gd, and overlaps with the coupling portion COMLa. A conductive layer 74 is coupled to the coupling portions 33$a$ through a contact hole provided in the overcoat layer 34 in the peripheral region Gd. The conductive layer 74 is a light-transmitting conductive material, such as ITO.

In the peripheral region Gd, the conductive portion 81 is provided between the first substrate 21 and the second substrate 31. The conductive portion 81 is a seal portion that seals between the first substrate 21 and the second substrate 31. The conductive portion 81 includes a plurality of conductive particles 82 dispersed in a sealing material. The conductive portion 81 is provided on the peripheral circuit region 80 with the planarizing film 29 interposed therebetween. FIG. 15 is merely a schematic illustration, and illustrates only one of the conductive particles 82 in the conductive portion 81. The present disclosure is, however, not limited to this illustration. The conductive particles 82 are dispersed in the conductive portion 81.

The conductive layer 74 is coupled to the conductive layer 71 through the conductive particles 82 of the conductive portion 81. The conductive layer 71 is a light-transmitting conductive material, such as ITO. Thus, the second electrodes 33 are electrically coupled to the conductive layer 71. The conductive layer 71 is coupled to the coupling electrodes 72. The coupling electrodes 72 are coupled to the second electrode scan circuit 14A provided in the peripheral circuit region 80. With the above-described configuration, the second electrodes 33 are electrically coupled to the second electrode scan circuit 14A provided on the first substrate 21. With this configuration, during the mutual-capacitive touch detection, the second electrode scan circuit 14A sequentially selects the drive electrode block Bk including more than one of the second electrodes 33 (refer to FIG. 17), and supplies the second drive signal TSVcom to the drive electrode block Bk.

Although not illustrated, with the same configuration, the common electrode COML is also coupled to the first substrate 21 side through the conductive portion 81. In this case, the conductive portion 81 coupled to the common electrode COML is electrically isolated from the conductive portion 81 coupled to the second electrodes 33. With this configuration, the supplies 14a to 14d of the driver IC 19 (refer to FIG. 12) can supply different signals to the common electrode COML and the second electrodes 33.

A region A51 denotes a region outside the central portion of the conductive portion 81 up to the outer circumference of the second substrate 31. A region A52 denotes a region outside end portions TDLa of the first electrodes TDL up to the outer circumference of the second substrate 31, the end portions TDLa being provided in the peripheral region Gd. The coupling portion COMLa is preferably provided from the boundary between the display region Ad and the peripheral region Gd to the vicinity of the conductive portion 81. The coupling portions 33a of the second electrodes 33 are preferably provided up to the region A52. With this configuration, the coupling portions 33a are provided between the peripheral circuit region 80 and the first electrodes TDL. This configuration allows the coupling portions 33a to shield noise from the peripheral circuit region 80.

As illustrated in FIG. 16, the third electrodes 24 include capacitive electrodes 24a and wiring 24b. The capacitive electrodes 24a are provided so as to overlap with the drain electrodes 63 and the pixel electrodes 25, and generate retention capacitance between themselves and both the drain electrodes 63 and the pixel electrodes 25. The wiring 24b couples the capacitive electrodes 24a arranged in the first direction Dx to one another. With the above-described configuration, the third electrodes 24 are longer in the first direction Dx as a whole. In other words, the third electrodes 24 are longer in the same direction as that of the second electrodes 33 illustrated in FIG. 17. As illustrated in FIG. 17, the color regions 32R, 32G, and 32B of the color filter 32 are longer in a direction intersecting with the second electrodes 33 in the plan view.

More than one of the third electrodes 24 are coupled to one coupling portion 24d. Such third electrodes 24 constitute a third electrode block BkCs. During the electromagnetic induction touch detection, a plurality of such third electrode blocks BkCs form the receiving coils CRx. The coupling wiring 24c is coupled to the coupling portion 24d, and couples the third electrode block BkCs to the first AFE 47A or the wiring L11 (refer to FIG. 11).

As illustrated in FIG. 17, the light-shielding layer 39 includes portions extending along the gate lines GCL and portions extending along the signal lines SGL. The portions of the light-shielding layer 39 extending along the signal lines SGL are provided so as to overlap with the boundaries between the color regions 32R, 32G, and 32B. The second electrodes 33 are provided so as to overlap with the portions of the light-shielding layer 39 extending along the gate lines GCL. In other words, the second electrodes 33 are provided along the first direction Dx.

More than one of the second electrodes 33 arranged in the second direction Dy are coupled to each of the conductive layers 74. This configuration forms the drive electrode block Bk including such second electrodes 33, and the same signal is supplied to such second electrodes 33 included in the drive electrode block Bk. The second electrodes 33 other than those in the drive electrode block Bk serve as a non-selected electrode block NBk. The drive electrode block Bk serves as the drive electrode E1 in the mutual-capacitive touch detection.

Whereas the common electrode COML is made of ITO, the second electrodes 33, the first electrodes TDL, the third electrodes 24, and the signal lines SGL are made of a metal. Therefore, the second electrodes 33 and the signal lines SGL are significantly lower in resistance than the common electrode COML. As a result, using the second electrodes 33 or the signal lines SGL as the drive electrodes can reduce dulling of the first drive signal VTP and the second drive signal TSVcom each having a square wave (alternating-current rectangular wave). This point will be described with reference to FIG. 18.

Figure 18:
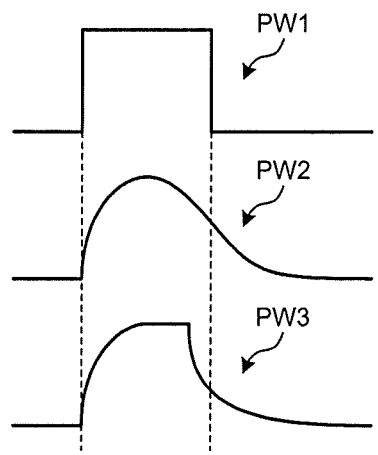
FIG. 18 is an explanatory diagram for explaining a pulse wave applied to drive electrodes.

FIG. 18 is an explanatory diagram for explaining a pulse wave applied to the drive electrodes. Each of a first pulse wave PW1, a second pulse wave PW2, and a third pulse wave PW3 illustrated in FIG. 18 exemplifies one pulse wave of a plurality of pulse waves included in the first drive signal VTP and the second drive signal TSVcom. The first pulse wave PW1 represents an ideal waveform of the pulse wave applied to the drive electrodes. The second pulse wave PW2 represents a waveform when only the common electrode COML made of ITO is used as the drive electrode. Since ITO has a high resistance, the waveform of the square wave applied thereto is made duller than that of the first pulse wave PW1. The waveform is made duller particularly when falling.

In contrast, the third pulse wave PW3 represents a waveform when the second electrodes 33 or the signal lines SGL are used as the drive electrodes. The second electrodes 33 and the signal lines SGL are metallic. Therefore, the second electrodes 33 and the signal lines SGL are significantly lower in resistance than ITO. As a result, overall response of the drive electrodes is improved, and in particular, the falling of the third pulse wave PW3 is made steeper than that of the second pulse wave PW2. As a result, in this embodiment, responses to the drive signals are improved and the detection sensitivity is improved in both cases of the electromagnetic induction method and the mutual-capacitance method.

The common electrode COML and pixel electrodes 25 lie between both the second electrodes 33 and the first electrodes TDL and both the signal lines SGL and the third electrodes 24. Also in this case, the common electrode COML is supplied with a fixed voltage signal (such as the display drive signal Vcomdc or the ground potential GND), and the pixel electrodes 25 are substantially in the floating state. As a result, the common electrode COML and the pixel electrodes 25 can be restrained from hindering the function of the second electrodes 33 and the signal lines SGL as the drive electrodes.

Figure 19:
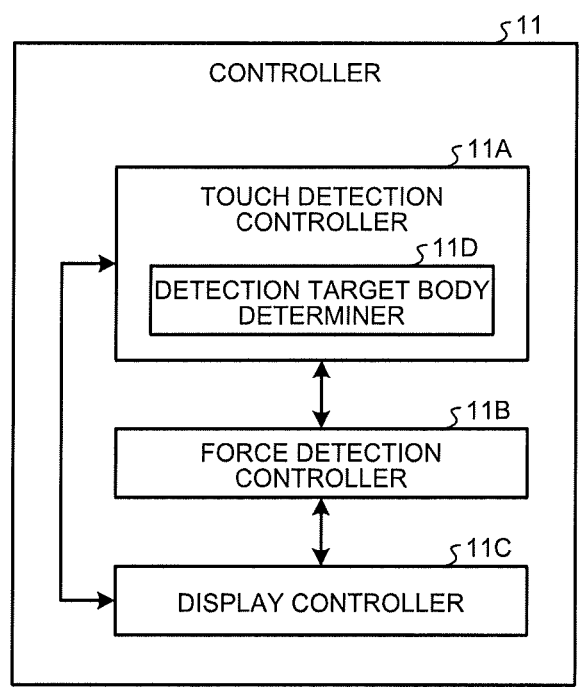
FIG. 19 is a block diagram illustrating a configuration example of a controller according to the first embodiment.
Figure 20:
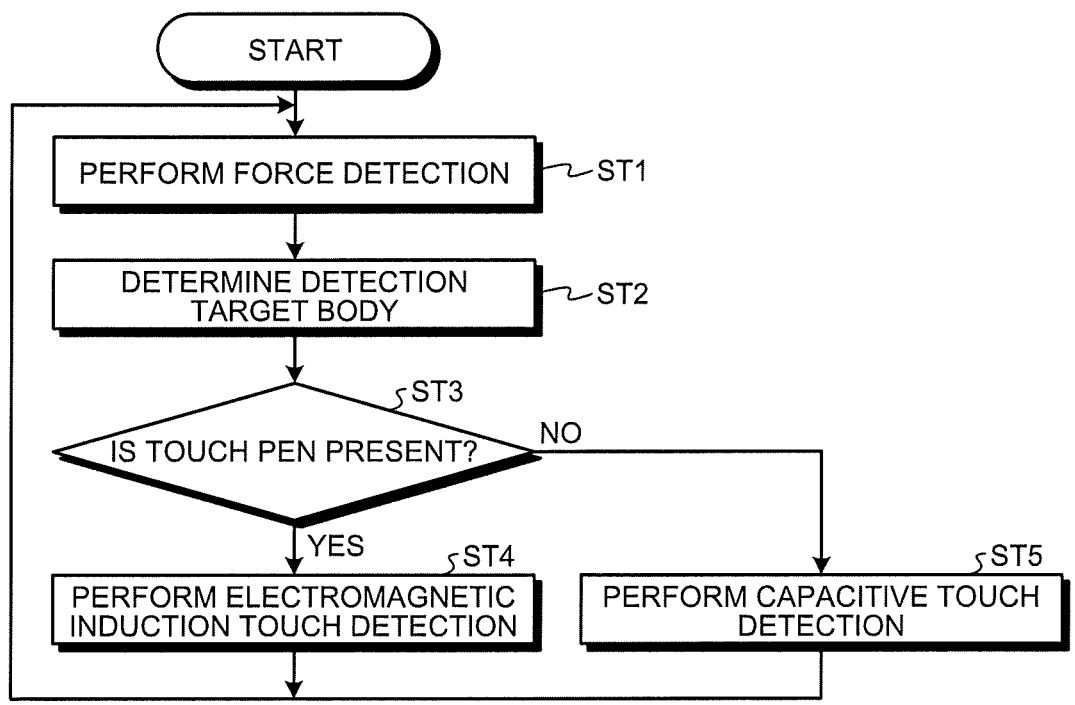
FIG. 20 is a flowchart illustrating an operation example of the display device according to the first embodiment.
Figure 21:
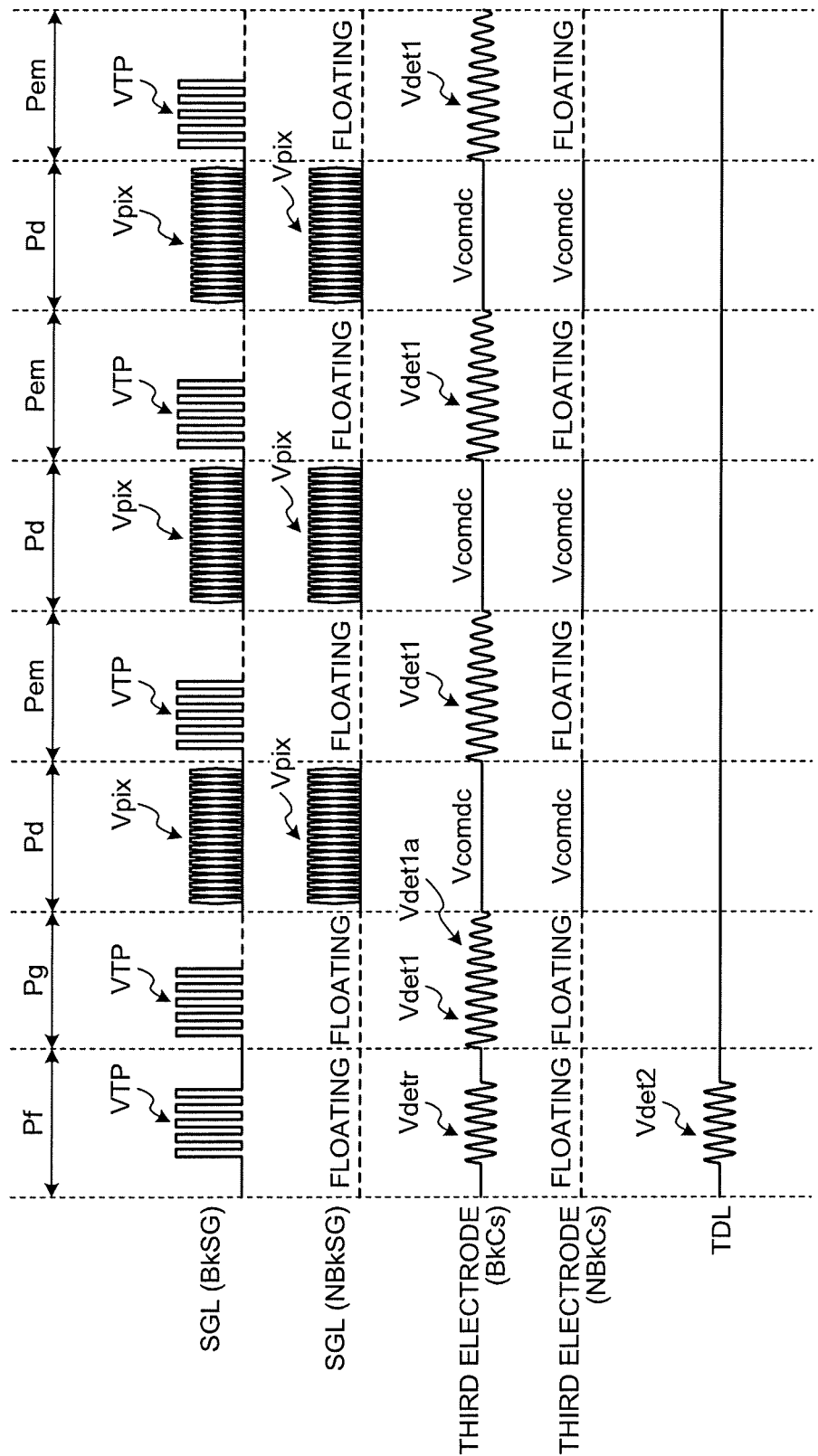
FIG. 21 is a timing waveform diagram illustrating the operation example of the display device according to the first embodiment.
Figure 22:
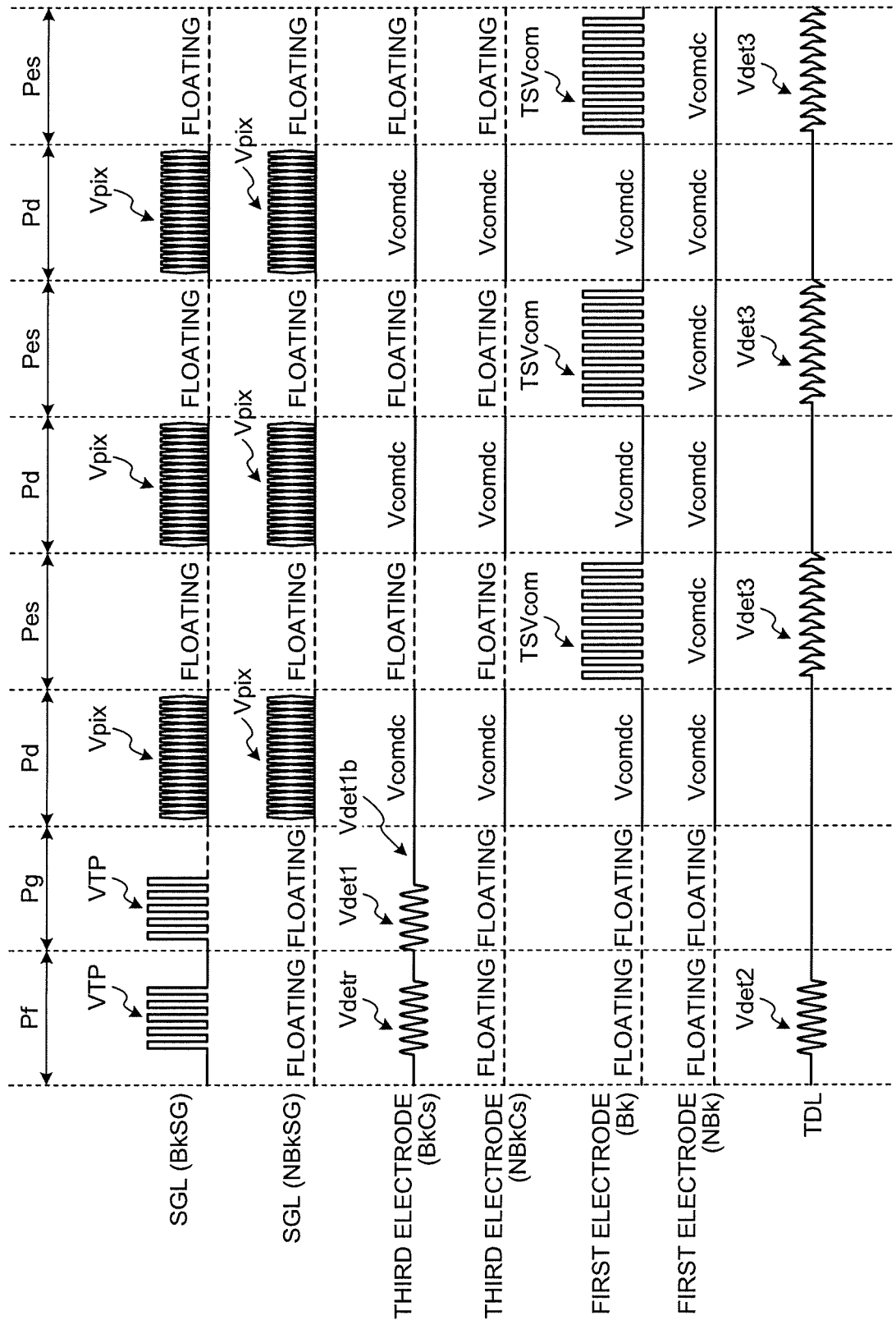
FIG. 22 is a timing waveform diagram illustrating another operation example of the display device according to the first embodiment.

The following describes operation examples of the display device 1 with reference to FIGS. 19 to 22. FIG. 19 is a block diagram illustrating a configuration example of the controller according to the first embodiment. FIG. 20 is a flowchart illustrating an operation example of the display device according to the first embodiment. FIG. 21 is a timing waveform diagram illustrating the operation example of the display device according to the first embodiment. FIG. 22 is a timing waveform diagram illustrating another operation example of the display device according to the first embodiment. FIG. 21 illustrates the operation example of the display device 1 when the touch pen 100 is present. FIG. 22 illustrates the other operation example of the display device 1 when the touch pen 100 is not present.

As illustrated in FIG. 19, the controller 11 includes a touch detection controller 11A, a force detection controller 11B, and a display controller 11C. The touch detection controller 11A is a circuit that controls the electromagnetic induction touch detection and the capacitive touch detection. The force detection controller 11B is a circuit that controls the electromagnetic induction force detection. The display controller 11C is a circuit that controls the display operation. These controllers cooperate with one another to perform the display operation and the detection operations. At least one or some of the controllers may be provided in the external controller 200 (refer to FIG. 9).

The touch detection controller 11A includes a detection target body determiner 11D. The detection target body determiner 11D is a circuit that determines whether the detection target body is the finger or the touch pen 100. The display device 1 of this embodiment can determine the detection target body using the detection target body determiner 11D, and switch between detection modes to perform detection.

As illustrated in FIGS. 21 and 22, the display device 1 performs the touch detection operation (detection period), the force detection operation (force detection period), and the display operation (display period) in a time-division manner. The division into the touch detection operation, the force detection operation, and the display operation may be performed in any way. The following describes, for example, a method in which the touch detection and the display are performed in a time-division manner in one frame period of the display panel 10, that is, in a time required for displaying video information for one screen.

As illustrated in FIG. 20, the display device 1 performs the electromagnetic induction force detection in response to the control signal from the controller 11 (Step ST1).

As illustrated in FIGS. 21 and 22, during the second sensing period Pf, the driver IC 19 alternately supplies the first voltage VTPH and the second voltage VTPL to both ends of the transmitting coil CTx in the same manner as the example illustrated in FIG. 11. This operation supplies the first drive signal VTP to a signal line block BkSG constituting the transmitting coil CTx. A non-selected signal line block NBkSG is not supplied with the first drive signal VTP, and is placed in the floating state.

The supply of the first drive signal VTP causes the electromagnetic induction. The first electrodes TDL output the second detection signal Vdet2 corresponding to the change in the distance between the first electrodes TDL and the signal lines SGL based on the electromagnetic induction. At the same time, the third electrode block BkCs outputs the reference signal Vdetr. The force detection controller 11B calculates the level of the force applied from the detection target body to the display surface based on the second detection signal Vdet2 and the reference signal Vdetr.

Subsequently, as illustrated in FIG. 20, the display device 1 determines whether the detection target body is the finger or the touch pen 100 in response to the control signal from the controller 11 (Step ST2).

As illustrated in FIGS. 21 and 22, during a determination period Pg, the driver IC 19 supplies the first drive signal VTP to the signal line block BkSG. The electromagnetic induction is generated between the signal line block BkSG and the third electrode block BkCs. The third electrode block BkCs outputs the first detection signal Vdet1 based on the electromagnetic induction. The detection target body determiner 11D determines whether the touch pen 100 is present based on the first detection signal Vdet1 (Step ST3 in FIG. 20).

If the touch pen 100 is present, the electromagnetic induction also is generated between the touch pen 100 and the third electrode block BkCs. The electromotive force is generated in the third electrode block BkCs based on the electromagnetic induction. As a result, the first detection signal Vdet1 includes a detection signal Vdet1a, as illustrated in FIG. 21. The detection signal Vdet1a varies at a predetermined amplitude also during periods in which the first drive signal VTP is not supplied to the signal line block BkSG. Accordingly, the detection target body determiner 11D determines that the touch pen 100 is present based on the first detection signal Vdet1 (Yes at Step ST3 in FIG. 20).

Subsequently, as illustrated in FIG. 20, the display device 1 performs the electromagnetic induction touch detection in response to the control signal from the controller 11 (Step ST4).

As illustrated in FIG. 21, if the touch pen 100 is present, the display periods Pd and the first sensing periods Pem are alternately arranged.

The above-described display operation is performed during the display period Pd. As illustrated in FIG. 10, the driver IC 19 supplies the display drive signal Vcomdc to the common electrode COML and the third electrodes 24 through the wiring L11. During the same period, the pixel signals Vpix are supplied to the signal lines SGL (signal line block BkSG) opposed to the common electrode COML.

During the first sensing period Pem, the driver IC 19 supplies the first drive signal VTP to the signal line block BkSG constituting the transmitting coil CTx, as illustrated in FIG. 11. The non-selected signal line block NBkSG is not supplied with the first drive signal VTP, and is placed in the floating state. The electromotive force is generated in the third electrode block BkCs constituting the receiving coil CRx based on the electromagnetic induction between the third electrode block BkCs and the touch pen 100. The third electrode block BkCs outputs the first detection signal Vdet1 corresponding to this electromotive force.

If the touch pen 100 is not present, no electromagnetic induction is generated between the touch pen 100 and the third electrode block BkCs. Therefore, as illustrated in FIG. 22, no electromotive force is generated in the third electrode block BkCs while the first drive signal VTP is not supplied to the signal line block BkSG during the determination period Pg. As a result, the first detection signal Vdet1 includes a detection signal Vdet1b that is a direct-current voltage signal having an unchanging amplitude. The detection signal Vdet1b may alternatively be an alternating-current voltage signal having amplitude equal to or smaller than a predetermined threshold. The detection target body determiner 11D determines that the touch pen 100 is not present based on the first detection signal Vdet1 (No at Step ST3 in FIG. 20).

Subsequently, as illustrated in FIG. 20, the display device 1 performs the capacitive touch detection in response to the control signal from the controller 11 (Step ST5).

As illustrated in FIG. 22, if the touch pen 100 is not present, the display periods Pd and the third sensing periods Pes are alternately arranged.

During the third sensing period Pes, the driver IC 19 supplies the second drive signal TSVcom to the drive electrode block Bk. The first electrodes TDL output the third detection signal Vdet3 corresponding to the change in electrostatic capacitance between the drive electrode block Bk and the first electrodes TDL. The non-selected electrode block NBk is supplied with the display drive signal Vcomdc. The non-selected electrode block NBk only needs to have a fixed potential, and may be supplied with, for example, the second voltage VTPL. The signal line block BkSG and the non-selected electrode block NBk are in the floating state.

As described above, the display device 1 of this embodiment performs the display operation, the electromagnetic induction-based touch detection and force detection, and the capacitive touch detection. The controller 11 determines the type of the detected detection target body, and performs processing of either one of the first sensing period Pem and the third sensing period Pes according to the detection target body. As a result, the touch detection can be improved in detection accuracy. The timing waveform diagrams illustrated in FIGS. 21 and 22 are merely examples, and can be changed as appropriate. For example, the order of the display period Pd, the first sensing period Pem, the second sensing period Pf, and the third sensing period Pes can be changed as appropriate. The lengths of the display period Pd, the first sensing period Pem, the second sensing period Pf, and the third sensing period Pes may also differ from one another.

In this embodiment, the mutual-capacitive touch detection can be performed in synchronization with the display period Pd. In this case, the pixel signal Vpix is supplied to the signal lines SGL (signal line block BkSG) during the display period Pd illustrated in FIG. 22, and the second drive signal TSVcom is supplied to the drive electrode block Bk during the same period. Since the common electrode COML is provided between the second electrodes 33 and both the pixel electrodes 25 and the signal lines SGL, the second drive signal TSVcom can be restrained from hindering the display operation.

Second Embodiment

Figure 23:
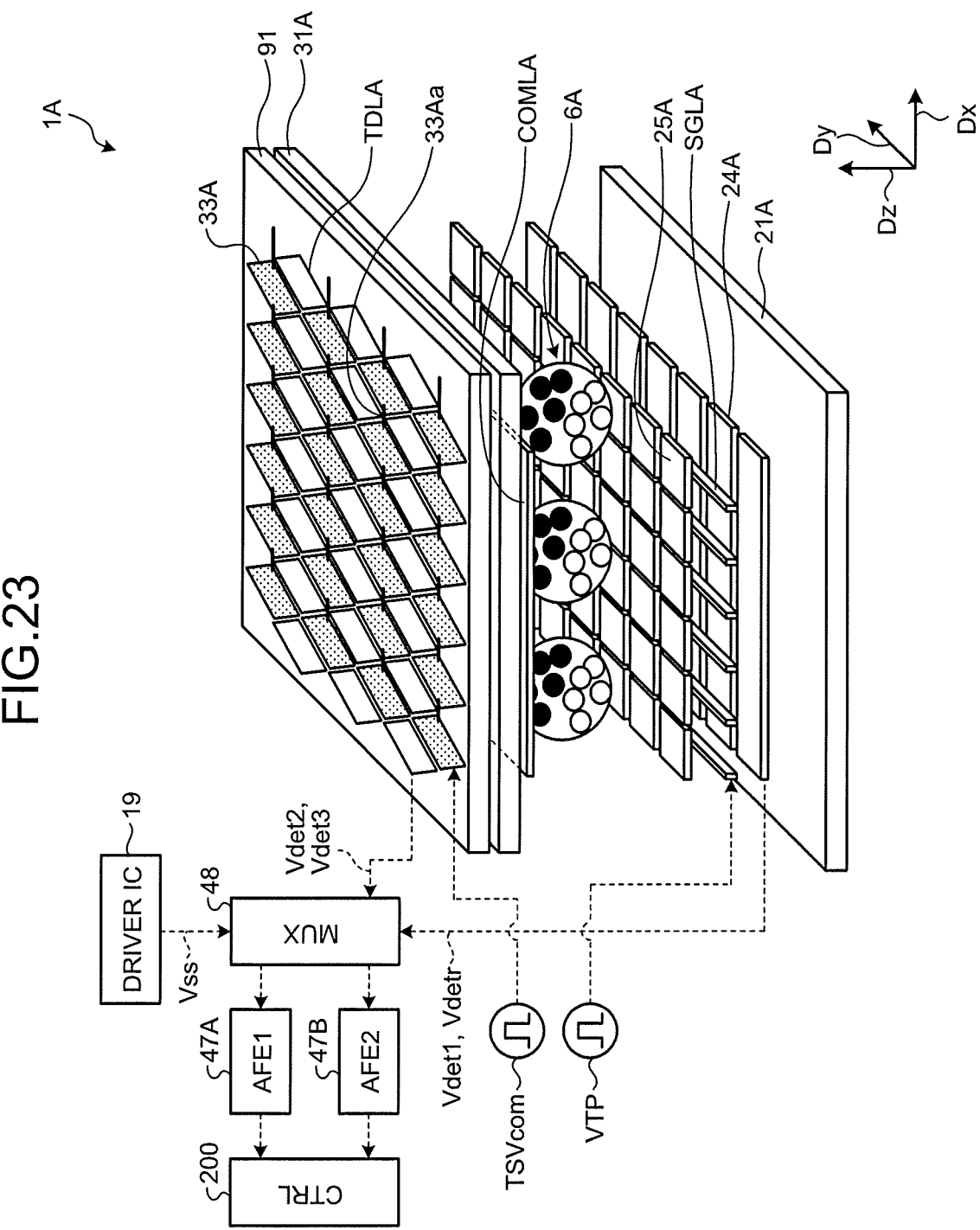
FIG. 23 is an exploded perspective view of a display device according to a second embodiment of the present disclosure.
Figure 24:
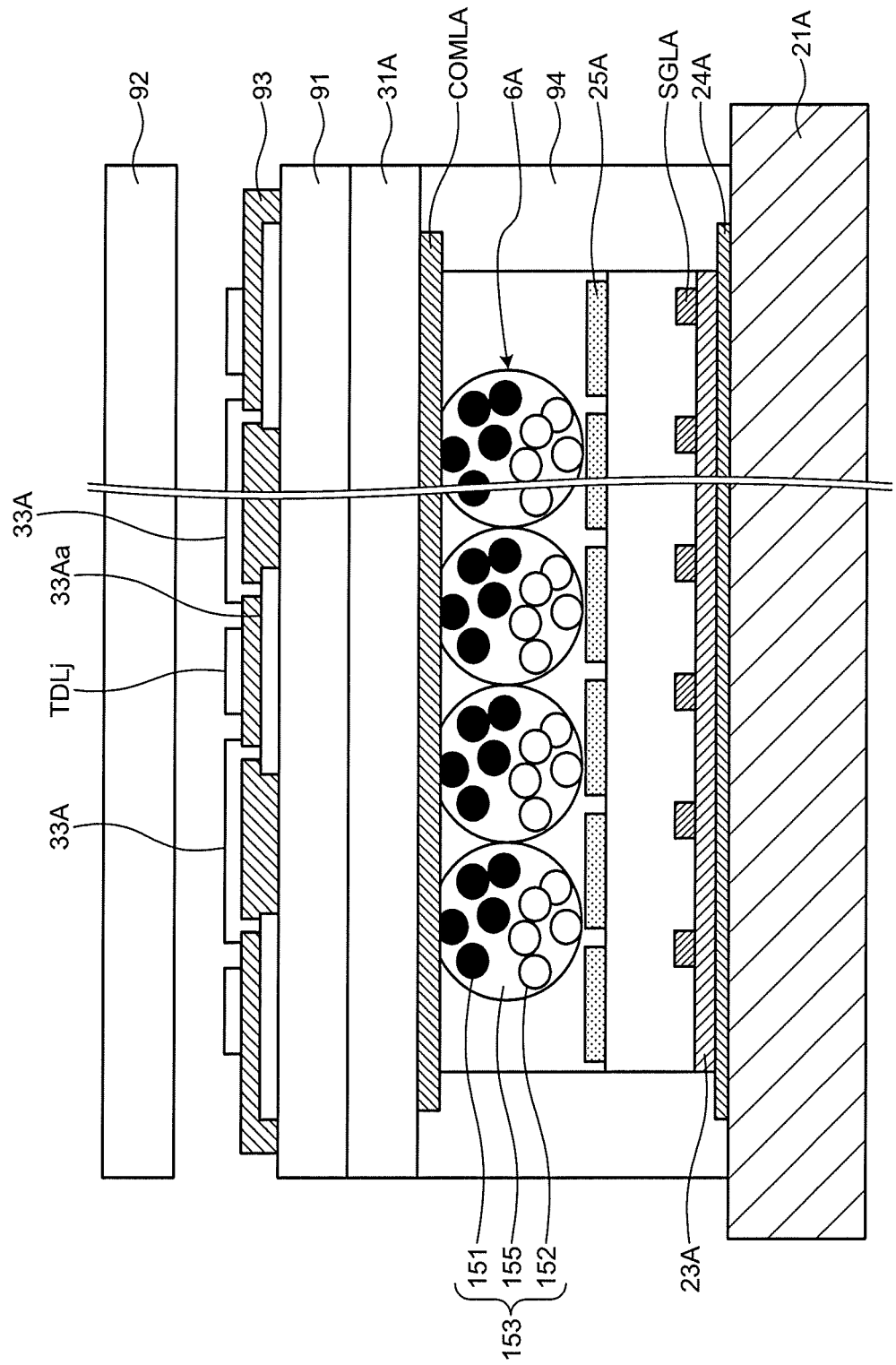
FIG. 24 is a schematic diagram illustrating a sectional structure of the display device according to the second embodiment.
Figure 25:
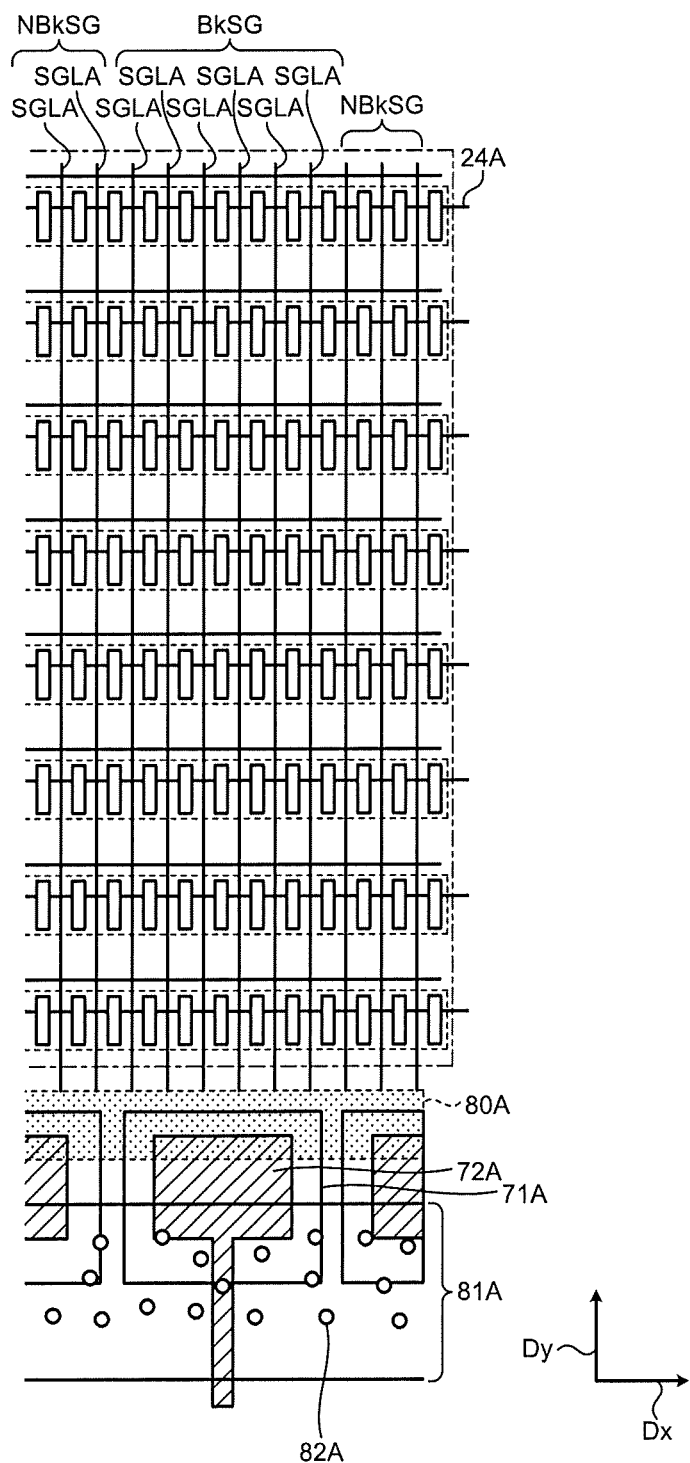
FIG. 25 is a plan view schematically illustrating third electrodes, signal lines, and a conductive portion.
Figure 26:
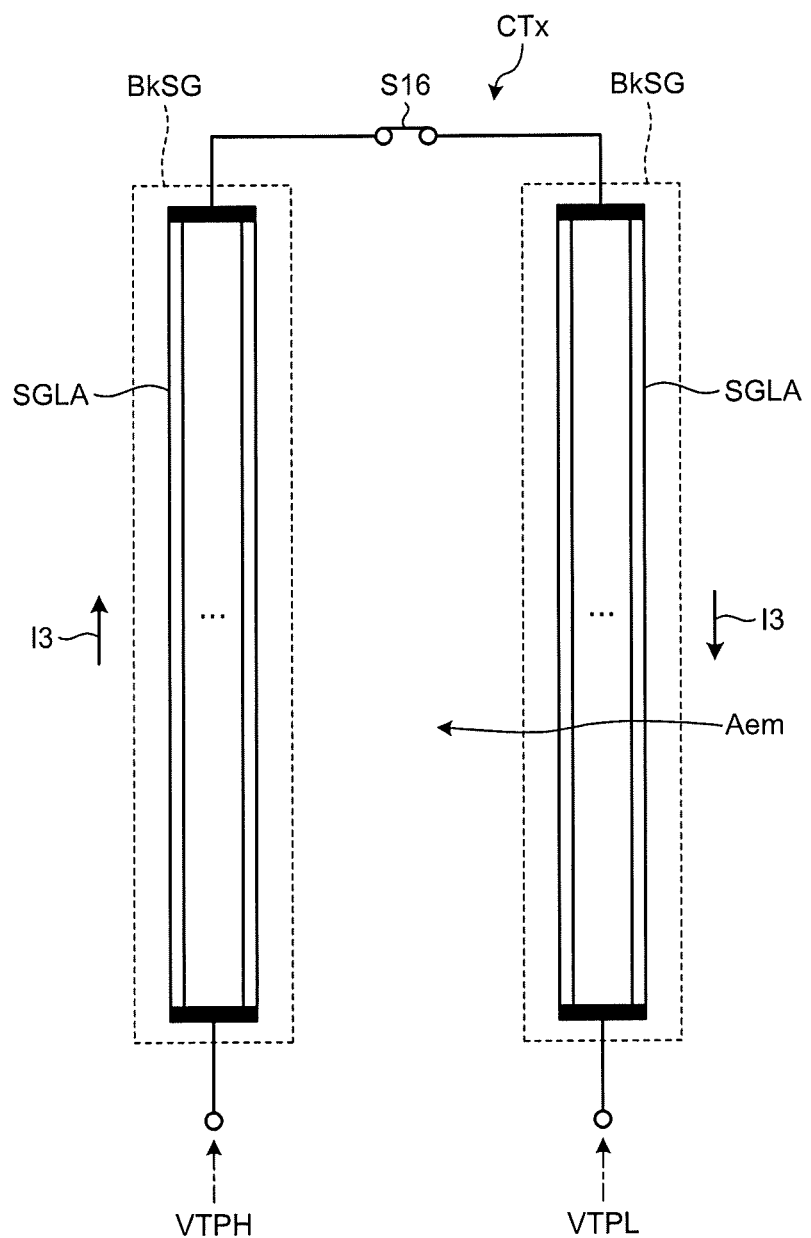
FIG. 26 is a plan view schematically illustrating a coupling configuration of the signal lines according to the second embodiment.
Figure 27:
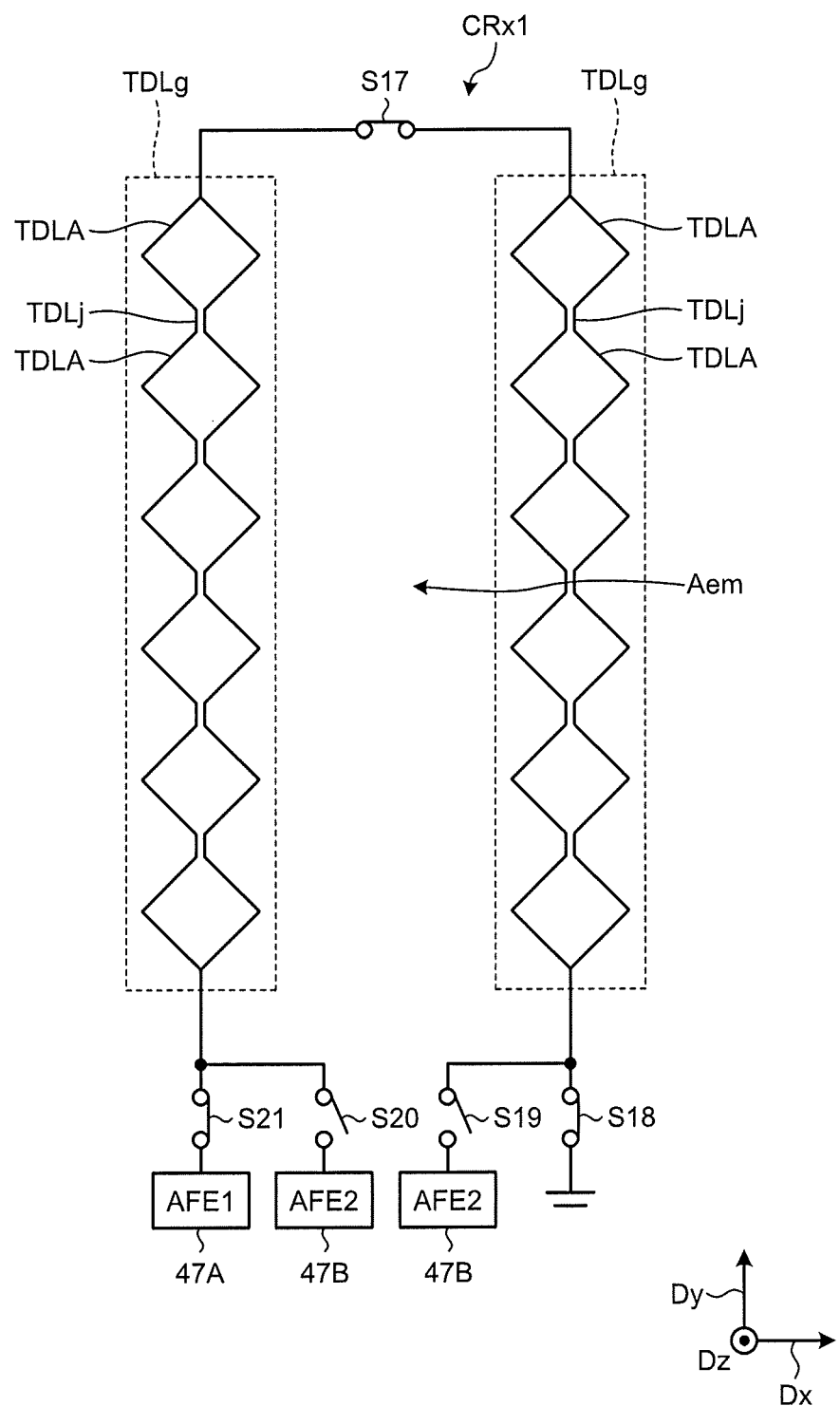
FIG. 27 is a plan view schematically illustrating a coupling configuration of first electrodes according to the second embodiment.

FIG. 23 is an exploded perspective view of a display device according to a second embodiment of the present disclosure. FIG. 24 is a schematic diagram illustrating a sectional structure of the display device according to the second embodiment. FIG. 25 is a plan view schematically illustrating third electrodes, signal lines, and a conductive portion. FIG. 26 is a plan view schematically illustrating a coupling configuration of the signal lines according to the second embodiment. FIG. 27 is a plan view schematically illustrating a coupling configuration of first electrodes according to the second embodiment.

As illustrated in FIGS. 23 and 24, a display device 1A of this embodiment includes a first substrate 21A, a second substrate 31A, and an electrophoretic layer 6A. The display device 1A of this embodiment is an electrophoretic display panel using the electrophoretic layer 6A as a display functional layer. FIG. 24 illustrates an enlarged view of a plurality of pixels.

In this embodiment, as illustrated in FIG. 23, third electrodes 24A, signal lines SGLA, pixel electrodes 25A, the electrophoretic layer 6A, a common electrode COMLA, and the second substrate 31A are stacked in this order above the first substrate 21A. Second electrodes 33A and first electrodes TDLA are provided on the second substrate 31A with a barrier film 91 interposed therebetween.

As illustrated in FIG. 24, the second substrate 31A is disposed so as to be opposed to the first substrate 21A. A seal portion 94 is provided between the second substrate 31A and the first substrate 21A. The electrophoretic layer 6A is sealed in an internal space surrounded by the second substrate 31A, the first substrate 21A, and the seal portion 94. The first substrate 21A is a glass substrate or a resin substrate having a light-transmitting property. A light-transmitting resin film is used as the second substrate 31A.

The barrier film 91 and an optical film 92 are provided on the upper side of the second substrate 31A. The second electrodes 33A and the first electrodes TDLA are provided between the barrier film 91 and the optical film 92. FIG. 24 illustrates coupling wiring TDLj that couples the first electrodes TDLA. A color filter may be provided between the second substrate 31A and the optical film 92, or on the optical film 92. In the case where the color filter is not provided, the display device 1A is a display device for monochrome display.

The common electrode COMLA is provided on a surface of the second substrate 31A opposed to the first substrate 21A. The common electrode COMLA is disposed so as to be opposed to the pixel electrodes 25A. The electrophoretic layer 6A is provided between the common electrode COMLA and the pixel electrodes 25A.

The electrophoretic layer 6A includes a plurality of microcapsules 153. The electrophoretic layer 6A is formed, for example, by applying ink containing the microcapsules 153 to the second substrate 31A provided with the common electrode COMLA. A plurality of black fine particles 151, a plurality of white fine particles 152, and a dispersion liquid 155 are sealed in each of the microcapsules 153. The black fine particles 151 and the white fine particles 152 are dispersed in the dispersion liquid 155.

The dispersion liquid 155 is a light-transmitting liquid, such as a silicone oil. The black fine particles 151 are electrophoretic particles, and are made of, for example, negatively charged graphite. The white fine particles 152 are electrophoretic particles, and are made of, for example, positively charged titanium oxide ($TiO_2$).

The dispersion state of the black fine particles 151 and the white fine particles 152 is changed by an electric field generated between the pixel electrodes 25A and the common electrode COMLA. The transmission state of light transmitted through the electrophoretic layer 6A changes with the dispersion state of the black fine particles 151 and the white fine particles 152. Thus, an image is displayed on the display surface. For example, when a positive potential is applied to the common electrode COMLA and a negative potential is applied to the pixel electrodes 25A, the black fine particles 151 move toward the second substrate 31A, and the white fine particles 152 move toward the first substrate 21A. In this case, black is displayed.

As illustrated in FIG. 25, the third electrodes 24A and the signal lines SGLA are provided so as to intersect with each other in the plan view. The signal lines SGLA are electrically coupled to coupling electrodes 72A through a switching circuit 80A. The switching circuit 80A switches the coupling state of the signal lines SGLA between the display period Pd and the individual sensing periods. The switching circuit 80A includes, for example, the switches S1, S2, S5, S6, and S10 illustrated in FIGS. 10 and 11. The coupling state of the third electrodes 24A is also switched in the same manner as in the configurations illustrated in FIGS. 10 and 11.

As illustrated in FIG. 23, during the electromagnetic induction touch detection, the driver IC 19 supplies the first drive signal VTP to the signal lines SGLA. As illustrated in FIG. 26, the signal line blocks BkSG each including more than one of the signal lines SGLA are arranged with a space therebetween in the first direction Dx. The upper ends of the signal line blocks BkSG are electrically coupled to each other through a switch S16.

In this manner, the switch S16 is provided that couples together the ends on the same side of a pair of the signal line blocks BkSG among the signal lines SGLA. During the first sensing period Pem and the second sensing period Pf, the controller 11 couples together the pair of the signal line blocks BkSG by operating the switch S16. During periods different from the first sensing period Pem and the second sensing period Pf, the controller 11 uncouples the pair of the signal line blocks BkSG from each other by operating the switch S16. The switch S16 is not limited to the example illustrated in FIG. 23, and may couple together the ends on the same side of at least a pair of signal lines SGLA.

With this configuration, the signal lines SGLA serve as the transmitting coils CTx during the electromagnetic induction-based touch detection and force detection. A region between the adjacent signal line blocks BkSG serves as the detection region Aem. During the electromagnetic induction touch detection, the first voltage VTPH is supplied to the lower end of one of the signal line blocks BkSG, and the second voltage VTPL is supplied to the lower end of the other of the signal line blocks BkSG. As a result, a current I3 flows in the signal line blocks BkSG, and a magnetic field is generated. The driver IC 19 can supply the first drive signal VTP to the transmitting coil CTx by switching the supply of the first voltage VTPH and the second voltage VTPL at a predetermined frequency. As a result, the electromagnetic induction is generated among the signal lines SGLA, the touch pen 100, and the third electrodes 24. The electromotive force based on the electromagnetic induction between the third electrodes 24A and the touch pen 100 is generated in the third electrodes 24A. The third electrodes 24A supply the first detection signal Vdet1 to the first AFE 47A.

As illustrated in FIG. 23, the second electrodes 33A and the first electrodes TDLA are provided in the same layer. The second substrate 31A is provided between the common electrode COMLA and both the second electrodes 33A and the first electrodes TDLA. The second electrodes 33A and the first electrodes TDLA are made by forming thin metal wires having a width of several micrometers to several tens micrometers into zigzag lines, wavy lines, or a mesh. In the same manner as the common electrode COMLA, the second electrodes 33A and the first electrodes TDLA may be made of a light-transmitting conductive material, such as ITO.

The second electrodes 33A are arranged in the first direction Dx. As illustrated in FIG. 24, bridge wiring 33Aa is provided in a layer different from that of the second electrodes 33A and the first electrodes TDLA. An insulating layer 93 is interposed between the bridge wiring 33Aa and both the second electrodes 33A and the first electrodes TDLA. The second electrodes 33A adjacent in the first direction Dx are coupled to each other by the bridge wiring 33Aa. The second electrodes 33A coupled in the first direction Dx are arranged in the second direction Dy.

As illustrated in FIG. 27, the first electrodes TDLA are arranged in the second direction Dy. The first electrodes TDLA adjacent in the second direction Dy are coupled to each other by the coupling wiring TDLj. A first electrode group TDLg includes more than one of the first electrodes TDLA coupled in the second direction Dy and the coupling wiring TDLj. A plurality of such first electrode groups TDLg are arranged in the first direction Dx. The upper ends of the first electrode groups TDLg arranged with a space therebetween in the first direction Dx are electrically coupled to each other through a switch S17. One of the adjacent first electrode groups TDLg is coupled to either one of the first AFE 47A and the second AFE 47B through a switch S20 or a switch S21. The other of the adjacent first electrode groups TDLg is coupled to either one of the second AFE 47B and the ground through a switch S18 or a switch S19.

During the electromagnetic induction force detection, the switch S21 is turned on, and the switch S20 is turned off, as illustrated in FIG. 27. As a result, one of the first electrode groups TDLg is coupled to the first AFE 47A. The switch S18 is turned on, and the switch S19 is turned off. As a result, the other of the first electrode groups TDLg is coupled to the ground. The first electrodes TDLA constitute the first receiving coil CRx1. The second electrodes 33A constitute the second receiving coil CRx2.

As illustrated in FIG. 23, the driver IC 19 supplies the first drive signal VTP to the signal lines SGLA. As a result, the electromagnetic induction is generated between the signal lines SGLA and the first electrodes TDLA and between the signal lines SGLA and the third electrodes 24A. Based on the electromagnetic induction, the first electrodes TDLA supply the second detection signal Vdet2 corresponding to the distance between the first electrodes TDLA and the signal lines SGLA to the first AFE 47A. The second electrodes 33A supply the reference signal Vdetr based on the electromagnetic induction to the first AFE 47A.

During the capacitive touch detection, the switch S17 illustrated in FIG. 27 is turned off. As a result, the first electrode groups TDLg are electrically uncoupled from each other. The switches S18 and S21 are turned off, and the switches S19 and S20 are turned on. As a result, each of the first electrode groups TDLg is coupled to the second AFE 47B. With this configuration, the electrostatic capacitance is generated between the second electrodes 33A and the first electrodes TDLA. As illustrated in FIG. 23, during the mutual-capacitive touch detection, the driver IC 19 supplies the second drive signal TSVcom to the second electrodes 33A. The third detection signal Vdet3 corresponding to the change in electrostatic capacitance between the second electrodes 33A and the first electrodes TDLA is supplied from the first electrodes TDLA to the second AFE 47B through the multiplexer 48.

As described above, by being provided with the circuit substrate including the first substrate 21A, the third electrodes 24A, the signal lines SGLA, and the pixel electrodes 25A, the display device 1A including the electrophoretic layer 6A can also satisfactorily perform the electromagnetic induction-based touch detection and force detection.

Figure 28:
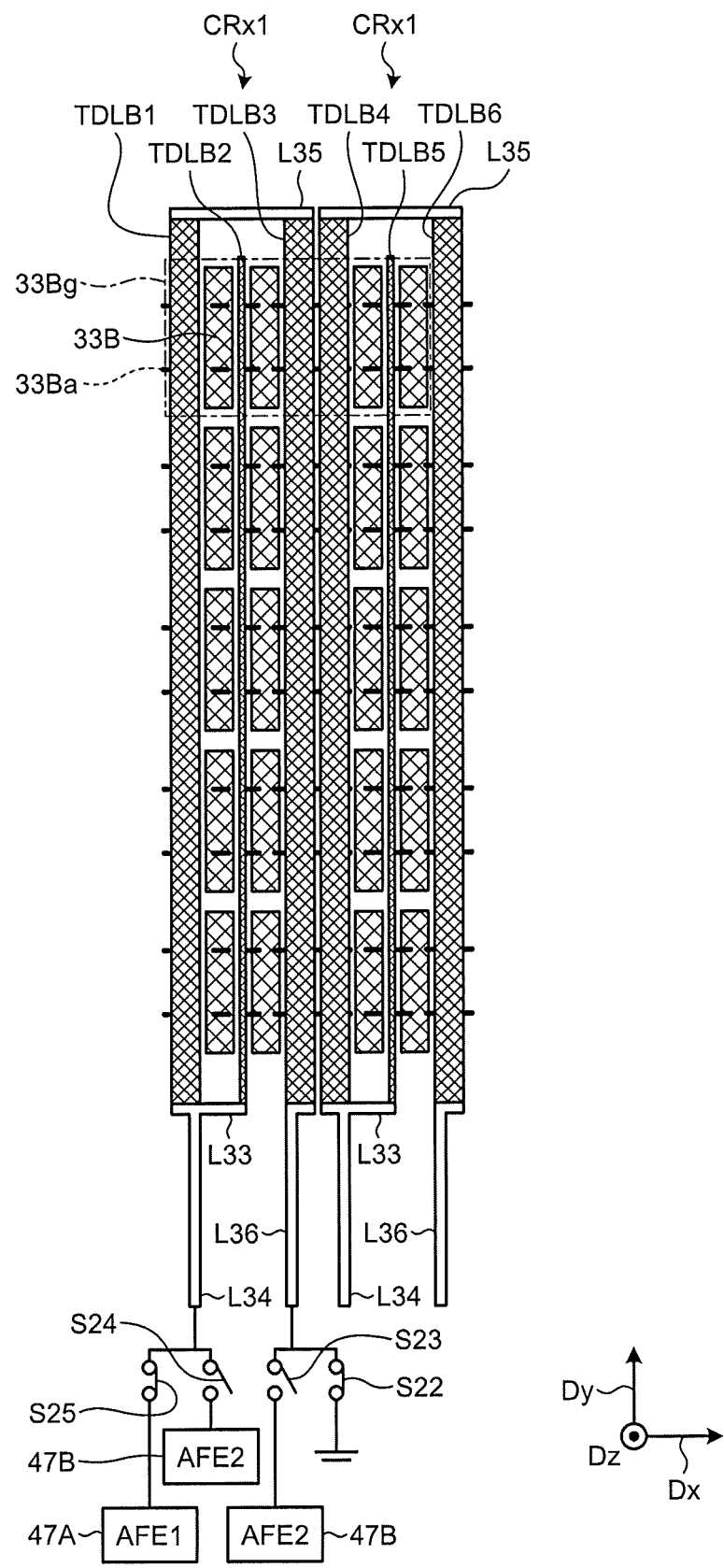
FIG. 28 is a plan view schematically illustrating first electrodes and second electrodes according to a modification of the second embodiment.

The configuration of the first electrodes TDLA and the second electrodes 33A is not limited to the example illustrated in FIGS. 23, 24, and 27. FIG. 28 is a plan view schematically illustrating first electrodes and second electrodes according to a modification of the second embodiment. FIG. 28 illustrates six first electrodes TDLB1, TDLB2, TDLB3, TDLB4, TDLB5, and TDLB6 of a plurality of first electrodes TDLB. In the following description, the six first electrodes TDLB1, TDLB2, TDLB3, TDLB4, TDLB5, and TDLB6 will each be referred to as a first electrode TDLB when they need not be distinguished from one another.

The first electrodes TDLB extend along the second direction Dy, and are arranged in the first direction Dx. Second electrodes 33B are electrically uncoupled from the first electrodes TDLB, and are provided between the first electrodes TDLB adjacent in the first direction Dx. More than one of the second electrodes 33B are arranged in the second direction Dy between the adjacent first electrodes TDLB. More than one of the second electrodes 33B are arranged in the first direction Dx. The second electrodes 33B adjacent in the first direction Dx are coupled to each other by bridge wiring 33Ba. A first electrode group 33Bg includes the second electrodes 33B coupled by the bridge wiring 33Ba.

With this configuration, the first electrode group 33Bg intersects with the first electrodes TDLB in the plan view.

One end of the first electrode TDLB1 is coupled to one end of the first electrode TDLB3 through wiring L35. In the following description, one end of the first electrode TDLB is referred to as the upper end, and the other end thereof is referred to as the lower end, with reference to FIG. 28. The lower end of the first electrode TDLB1 is coupled to the lower end of the first electrode TDLB2 through wiring L33. The wiring L33 is coupled to either one of the first AFE 47A and the second AFE 47B through wiring L34 and either one of switches S24 and S25. Wiring L36 is coupled to the lower end of the first electrode TDLB3. The wiring L36 is coupled to either one of the second AFE 47B and the ground through a switch S22 or a switch S23. The same configuration applies to the first electrodes TDLB4, TDLB5, and TDLB6.

In this manner, the first electrode TDLB1, the wiring L35, and the first electrode TDLB3 are coupled together so as to form a loop surrounding more than one of the second electrodes 33B and the first electrode TDLB2. As a result, the first electrode TDLB1, the wiring L35, and the first electrode TDLB3 constitute the first receiving coil CRx1 in the electromagnetic induction method. Specifically, when the magnetic field M3 from the transmitting coil CTx made up of the signal lines SGLA passes through a region surrounded by the first electrode TDLB1, the wiring L35, and the first electrode TDLB3, an electromotive force corresponding to a change in the magnetic field M3 is generated in the first electrode TDLB1, the wiring L35, and the first electrode TDLB3. During the electromagnetic induction force detection, the operations of the switches S22, S23, S24, and S25 couple the lower end of the first electrode TDLB1 to the first AFE 47A, and couple the lower end of the first electrode TDLB3 to the ground. As a result, a signal corresponding to the electromotive force is supplied to the first AFE 47A.

In the capacitance method, the first electrodes TDLB1, TDLB2, and TDLB3 are electrically coupled to one another, and serve as one detection electrode block. In this case, the operations of the switches S22, S23, S24, and S25 couple both the lower end of the first electrode TDLB1 and the lower end of the first electrode TDLB3 to the second AFE 47B. The first electrodes TDLB1, TDLB2, and TDLB3 supply a signal corresponding to a change in capacitance between themselves and the second electrodes 33B to the second AFE 47B.

The configuration of the second electrodes 33B and the first electrodes TDLB illustrated in FIG. 28 is merely an example, and can be changed as appropriate. For example, the shape of each of the second electrodes 33B and the first electrodes TDLB is not limited to a rectangle or a long shape, and may be another shape. The first electrodes TDLB may be provided in the first direction Dx in the same manner as the second electrodes 33, and may be coupled to one another by coupling wiring.

Third Embodiment

Figure 29:
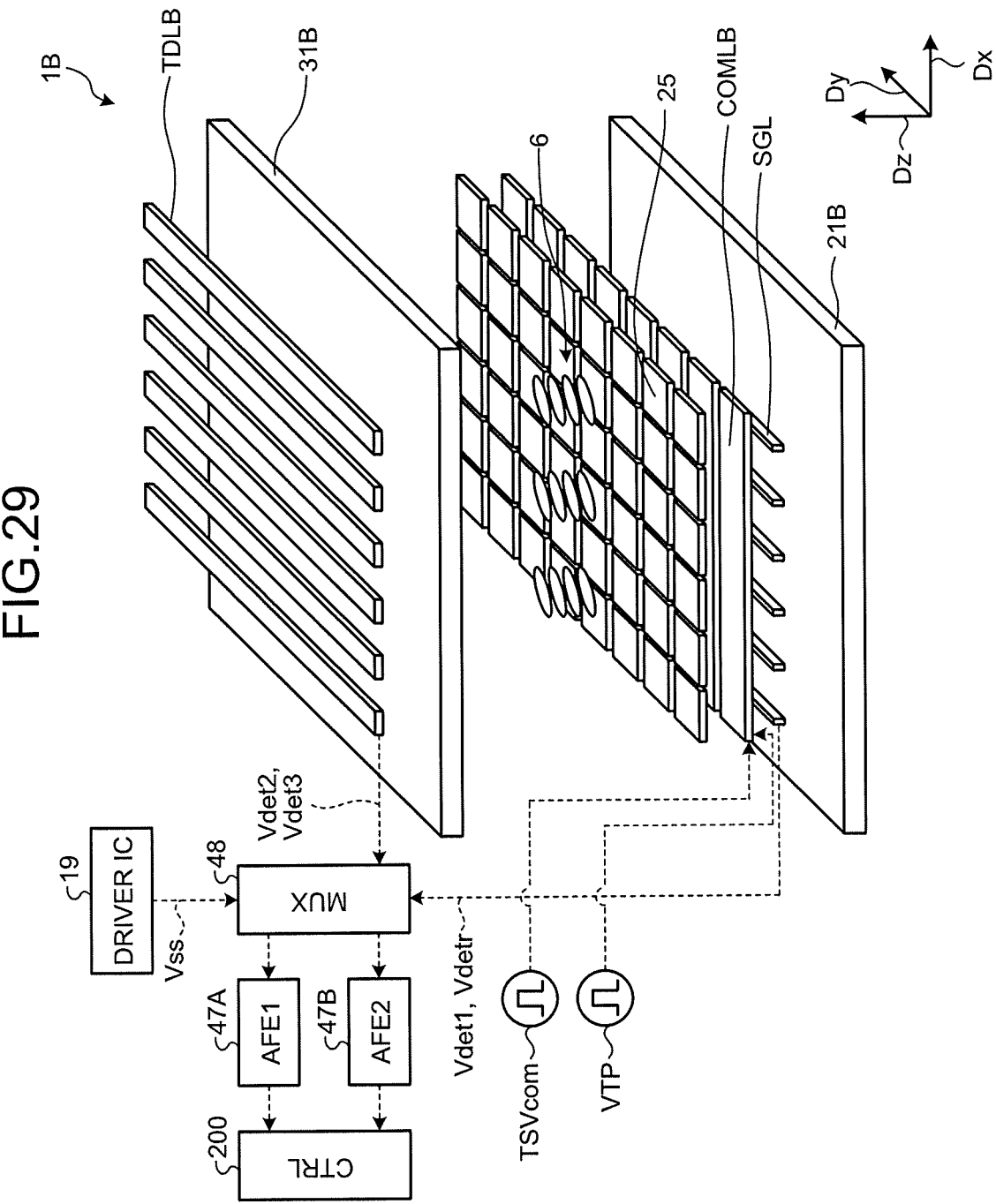
FIG. 29 is an exploded perspective view of a display device according to a third embodiment of the present disclosure.
Figure 30:
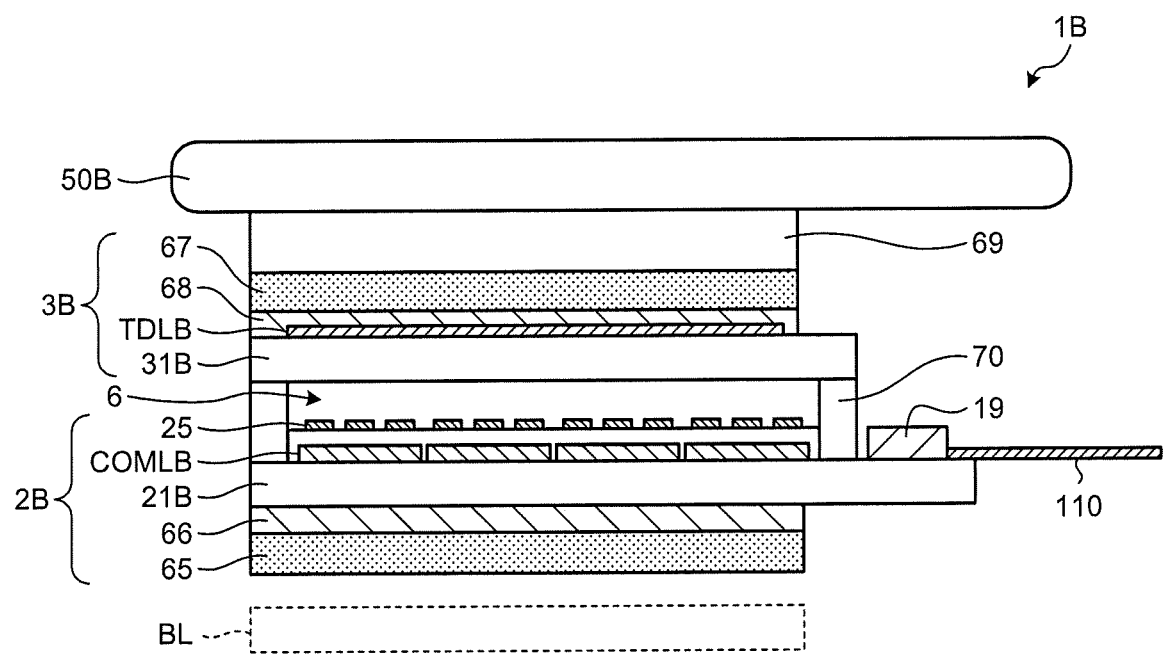
FIG. 30 is a schematic diagram illustrating a sectional structure of the display device according to the third embodiment.

FIG. 29 is an exploded perspective view of a display device according to a third embodiment of the present disclosure. FIG. 30 is a schematic diagram illustrating a sectional structure of the display device according to the third embodiment. A display device 1B of this embodiment is a transmissive liquid crystal display device. As illustrated in FIG. 29, the signal lines SGL, common electrodes COMLB, the pixel electrodes 25, the liquid crystal layer 6, a second substrate 31B, and the first electrodes TDLB are stacked in this order on a first substrate 21B.

The common electrodes COMLB are disposed between the liquid crystal layer 6 and the first substrate 21B. The common electrodes COMLB extend along the first direction Dx, and are arranged in the second direction Dy. The common electrodes COMLB intersect with the signal lines SGL and the first electrodes TDLB in the plan view. The first electrodes TDLB extend along the same direction as that of the signal lines SGL and provided so as to intersect with the common electrodes COMLB in the plan view.

As illustrated in FIG. 30, a pixel substrate 2B includes the first substrate 21B, the common electrodes COMLB, the pixel electrodes 25, an adhesive layer 66, and a polarizing plate 65. The common electrodes COMLB and the pixel electrodes 25 are provided between the first substrate 21B and the liquid crystal layer 6. The polarizing plate 65 is bonded to a first surface of the first substrate 21B with the adhesive layer 66 interposed therebetween, the first surface being opposite to a second surface of the first substrate 21B on which the common electrodes COMLB and the pixel electrodes 25 are provided. A light-transmitting conductive material, such as ITO, is used as the pixel electrodes 25 and the common electrodes COMLB. The first substrate 21B is provided with circuit elements and various types of wiring, such as the gate lines GCL, which are not illustrated, in addition to the signal lines SGL. The circuit elements include switching elements, such as thin-film transistors (TFTs), and capacitive elements. The display device 1B also includes, for example, the color filter 32, the light-shielding layer 39, and the orientation films 28 and 38, which are illustrated in FIG. 6, but not illustrated in FIG. 30.

A counter substrate 3B includes the second substrate 31B, the first electrodes TDLB, an adhesive layer 68, and a polarizing plate 67. The first electrodes TDLB are provided on the second substrate 31B. The polarizing plate 67 is provided on the first electrodes TDLB with the adhesive layer 68 interposed therebetween. A cover member 50B is bonded to the upper side of the polarizing plate 67 with an adhesive layer 69 interposed therebetween. A soft resin material deformable by the force applied from the detection target body is used as the adhesive layer 69.

The liquid crystal layer 6 is sealed in an internal space surrounded by the second substrate 31B, the first substrate 21B, and a seal portion 70. The liquid crystal layer 6 includes, for example, liquid crystals of a horizontal electric field mode, such as an in-plane switching (IPS) mode including a fringe field switching (FFS) mode. The orientation film 28 (refer to FIG. 6) is provided between the liquid crystal layer 6 and the pixel substrate 2B. The orientation film 38 (refer to FIG. 6) is provided between the liquid crystal layer 6 and the counter substrate 3B. In this embodiment, the horizontal electric field generated between the pixel electrodes 25 and the common electrodes COMLB drives the liquid crystal layer 6.

A backlight BL is provided on the lower side of the first substrate 21B. The backlight BL includes a light source of, for example, light-emitting diodes (LEDs), and emits light from the light source toward the first substrate 21B. The light from the backlight BL passes through the pixel substrate 2B, and is modulated according to the state of liquid crystals at a location of the passing light. Thus, the state of the light transmitted to the display surface is varied with location. In this manner, an image is displayed on the display surface.

As illustrated in FIG. 29, during the electromagnetic induction touch detection, the driver IC 19 supplies the first drive signal VTP to the common electrodes COMLB. The common electrodes COMLB serve as the transmitting coils CTx during the electromagnetic induction touch detection. As a result, the electromagnetic induction is generated among the common electrodes COMLB, the touch pen 100, and the signal lines SGL. The electromotive force is generated in the signal lines SGL by the mutual induction with the touch pen 100. The first detection signal Vdet1 corresponding to the electromotive is supplied from the signal lines SGL to the first AFE 47A through the multiplexer 48.

During the electromagnetic induction force detection, the driver IC 19 supplies the first drive signal VTP to the common electrodes COMLB. The common electrodes COMLB also serve as the transmitting coils CTx during the electromagnetic induction force detection. As a result, the electromagnetic induction is generated between the common electrodes COMLB and the first electrodes TDLB and between the common electrodes COMLB and the signal lines SGL. The electromotive force is generated in the first electrodes TDLB and the signal lines SGL by the mutual induction with the common electrodes COMLB. The electromotive force changes with the distance between the common electrodes COMLB and the first electrodes TDLB, and the second detection signal Vdet2 corresponding to the electromotive force is supplied from the first electrodes TDLB to the first AFE 47A through the multiplexer 48. The reference signal Vdetr is supplied from the signal lines SGL to the first AFE 47A through the multiplexer 48.

During the mutual-capacitive touch detection, the driver IC 19 supplies the second drive signal TSVcom to the common electrodes COMLB. During the mutual-capacitive touch detection, each of the common electrodes COMLB serves as the drive electrode E1. The third detection signal Vdet3 corresponding to the change in electrostatic capacitance between the common electrodes COMLB and the first electrodes TDLB is supplied from the first electrodes TDLB to the common electrodes COMLB through the multiplexer 48.

As described above, in this embodiment, the common electrodes COMLB serve as common electrodes for the pixel electrodes 25 during the display operation. In addition, the common electrodes COMLB serve as the transmitting coils CTx during the electromagnetic induction-based touch detection and force detection, and serve as the drive electrodes E1 during the capacitive touch detection. The signal lines SGL serve as the receiving coils CRx during the electromagnetic induction touch detection, and serve as the second receiving coils CRx2 during the force detection. The first electrodes TDLB serve as the first receiving coils CRx1 during the electromagnetic induction force detection, and serve as the detection electrodes E2 during the capacitive touch detection. Therefore, the coupling state of the common electrodes COMLB, the first electrodes TDLB, and the signal lines SGL needs to be changed according to each of the operations.

Figure 31:
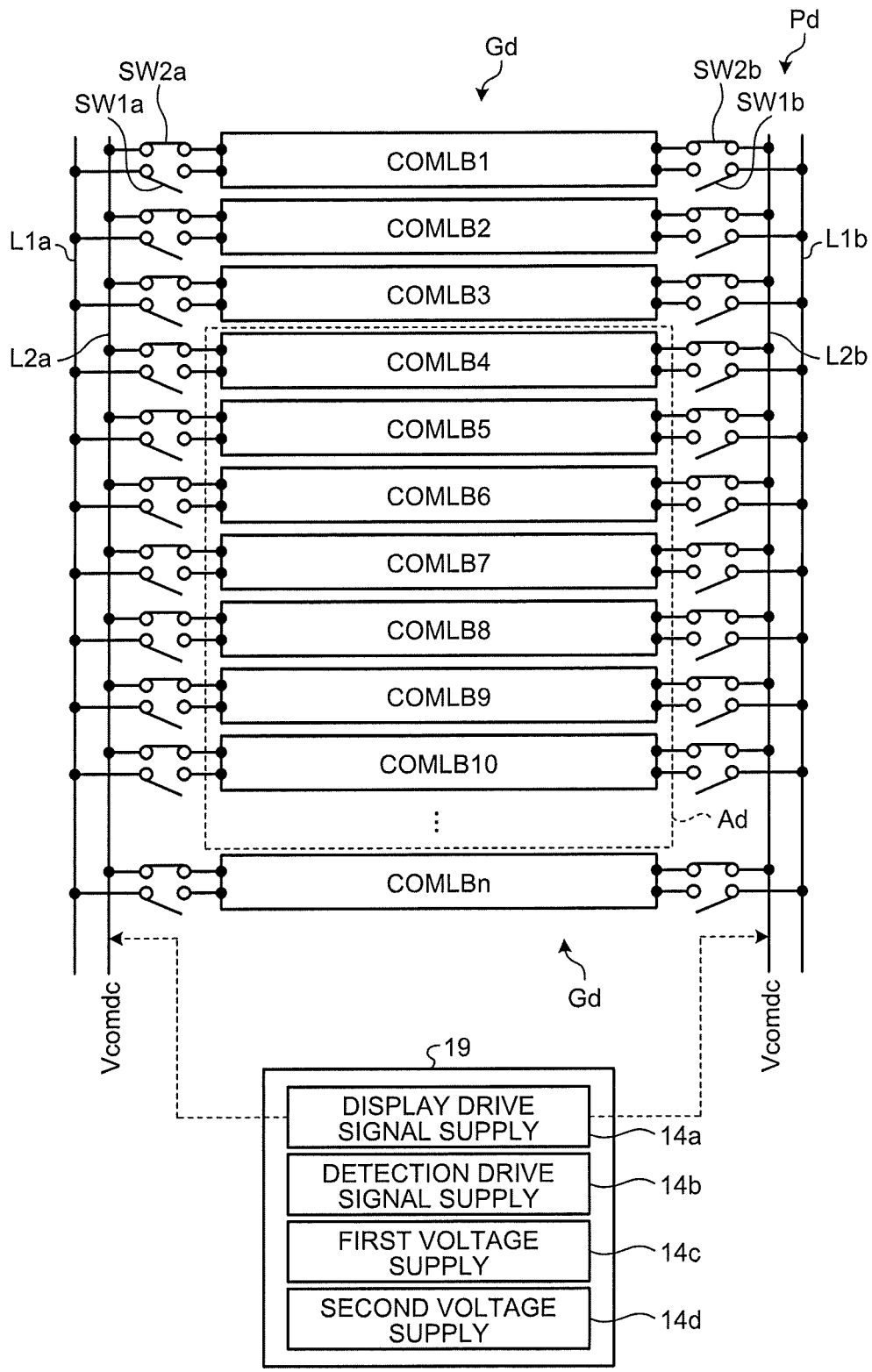
FIG. 31 is a circuit diagram for explaining a coupling configuration of common electrodes during the display period according to the third embodiment.
Figure 32:
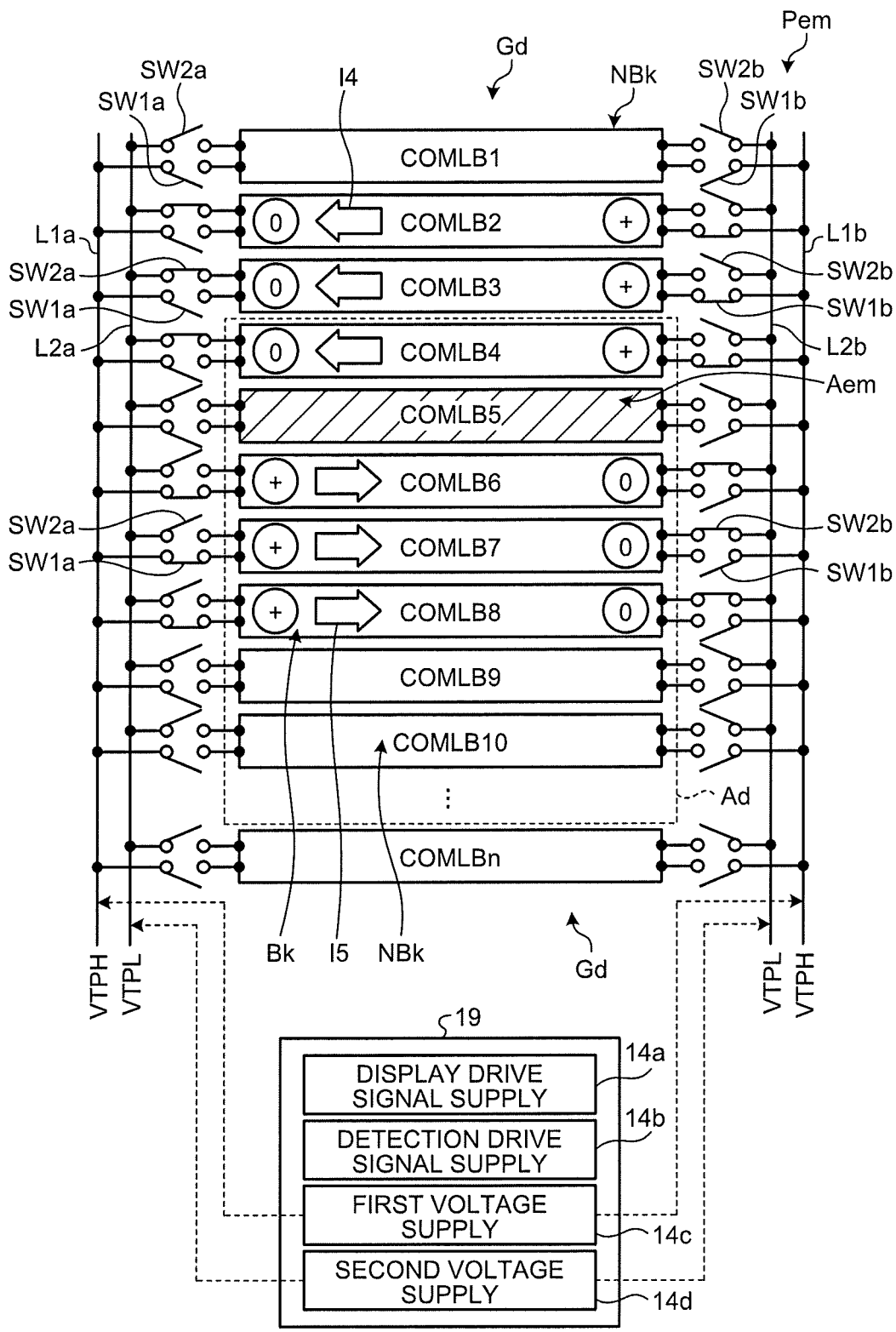
FIG. 32 is a circuit diagram illustrating a coupling configuration of the common electrodes during the first sensing period according to the third embodiment.
Figure 33:
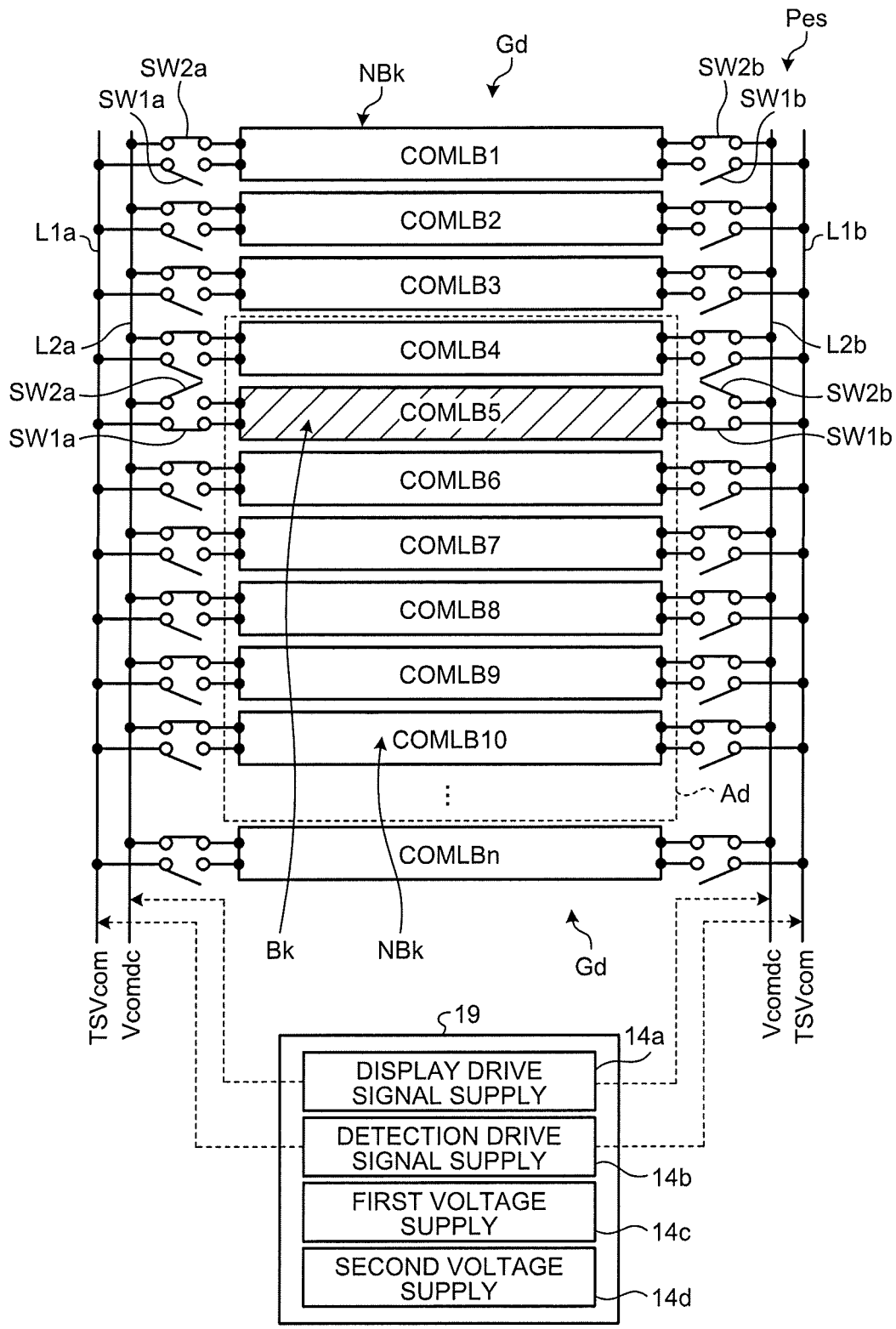
FIG. 33 is a circuit diagram illustrating a coupling configuration of the common electrodes during a third sensing period according to the third embodiment.

The following describes coupling configurations of the common electrodes COMLB in the display device 1B of this embodiment. FIG. 31 is a circuit diagram for explaining a coupling configuration of the common electrodes during the display period according to the third embodiment. FIG. 32 is a circuit diagram illustrating a coupling configuration of the common electrodes during the first sensing period according to the third embodiment. FIG. 33 is a circuit diagram illustrating a coupling configuration of the common electrodes during the third sensing period according to the third embodiment.

As illustrated in FIGS. 31 to 33, a plurality of common electrodes COMLB1, COMLB2, . . . , COMLBn are arranged. In the following description, the common electrodes COMLB1, COMLB2, . . . , COMLBn will each be referred to as a common electrode COMLB when they need not be distinguished from one another.

A first wiring L1a and a second wiring L2a are provided on the left end side of the common electrodes COMLB, and a first wiring L1b and a second wiring L2b are provided on the right end side of the common electrodes COMLB. A switch SW1a is provided between the left end of the common electrode COMLB and the first wiring L1a. A switch SW2a is provided between the left end of the common electrode COMLB and the second wiring L2a. The switch SW1a and the switch SW2a are coupled in parallel to the left end of each of the common electrodes COMLB. A switch SW1b is provided between the right end of the common electrode COMLB and the first wiring L1b. A switch SW2b is provided between the right end of the common electrode COMLB and the second wiring L2b. The switch SW1b and the switch SW2b are coupled in parallel to the right end of the common electrode COMLB.

As illustrated in FIG. 31, during the display period Pd, all the switches SW1a and SW1b are turned off, and all the switches SW2a and SW2b are turned on, in response to the control signal from the controller 11. All the common electrodes COMLB are uncoupled from the first wiring L1a and L1b. The second wiring L2a is coupled to the left ends of all the common electrodes COMLB, and the second wiring L2b is coupled to the right ends of all the common electrodes COMLB.

As a result, during the display period Pd, the display drive signal supply 14a supplies the display drive signal Vcomdc to all the common electrodes COMLB through the second wiring L2a and L2b. The display drive signal supply 14a is not limited to this operation, and may supply the display drive signal Vcomdc in a time-division manner to a common electrode COMLB overlapping one horizontal line serving as a target of the display driving.

As illustrated in FIG. 32, during a first sensing period Pem, the switches SW1a and SW1b and the switches SW2a and SW2b operate in response to the control signal from the controller 11, and the drive electrode block Bk is selected. Specifically, the common electrodes COMLB2, COMLB3, and COMLB4 and the common electrodes COMLB6, COMLB7, and COMLB8 are selected as the drive electrode block Bk. The other of the common electrodes COMLB serve as a non-selected electrode block NBk. A region between the common electrode COMLB4 and the common electrode COMLB6 is a detection region Aem that detects the detection target body.

The switches SW1a and SW1b and the switches SW2a and SW2b for the common electrodes COMLB in the non-selected electrode block NBk are turned off in response to the control signal from the controller 11. This operation brings the non-selected electrode block NBk into a floating state.

On the left side of the common electrodes COMLB2, COMLB3, and COMLB4, the switches SW1a are turned off, and the switches SW2a are turned on. As a result, the left ends of the common electrodes COMLB2, COMLB3, and COMLB4 are electrically coupled to the second wiring L2a. On the right side of the common electrodes COMLB2, COMLB3, and COMLB4, the switches SW1b are turned on, and the switches SW2b are turned off. As a result, the right ends of the common electrodes COMLB2, COMLB3, and COMLB4 are electrically coupled to the first wiring L1b.

On the left side of the common electrodes COMLB6, COMLB7, and COMLB8, the switches SW1a are turned on, and the switches SW2a are turned off. As a result, the left ends of the common electrodes COMLB6, COMLB7, and COMLB8 are electrically coupled to the first wiring L1a. On the right side of the common electrodes COMLB6, COMLB7, and COMLB8, the switches SW1b are turned off, and the switches SW2b are turned on. As a result, the right ends of the common electrodes COMLB6, COMLB7, and COMLB8 are electrically coupled to the second wiring L2b.

As a result, during the first sensing period Pem, in response to the control signal from the controller 11, the first voltage supply 14c is coupled to the left end of at least one common electrode COMLB (common electrodes COMLB6, COMLB7, and COMLB8), and the second voltage supply 14d is coupled to the right end thereof. In addition, the second voltage supply 14d is coupled to the left ends of the common electrodes COMLB (common electrodes COMLB2, COMLB3, and COMLB4) other than the at least one common electrode COMLB, and the first voltage supply 14c is coupled to the right ends thereof.

The second voltage supply 14d supplies the second voltage VTPL to the left ends of the common electrodes COMLB2, COMLB3, and COMLB4 through the second wiring L2a. The first voltage supply 14c supplies the first voltage VTPH to the right ends of the common electrodes COMLB2, COMLB3, and COMLB4 through the first wiring L1b. As a result, potential differences between the left ends and the right ends of the common electrodes COMLB2, COMLB3, and COMLB4 are generated, and currents I4 thus flow in a direction from the right ends toward the left ends thereof.

The first voltage supply 14c supplies the first voltage VTPH to the left ends of the common electrodes COMLB6, COMLB7, and COMLB8 through the first wiring L1a. The second voltage supply 14d supplies the second voltage VTPL to the right ends of the common electrodes COMLB6, COMLB7, and COMLB8 through the second wiring L2b. As a result, potential differences between the left ends and the right ends of the common electrodes COMLB6, COMLB7, and COMLB8 are generated, and currents I5 thus flow in a direction from the left ends toward the right ends thereof.

The first voltage VTPH and the second voltage VTPL supplied to both ends of the common electrodes COMLB are changed over to each other at the predetermined frequency by switching the operations of the switches SW1a, SW2a, SW1b, and SW2b. As a result, the common electrodes COMLB are supplied with the first drive signal VTP serving as the alternating-current voltage signal.

The currents I4 and I5 flowing in the common electrodes COMLB generate magnetic fields, and the electromagnetic induction is generated. The currents I4 and the currents I5 flow in directions opposite to each other. As a result, the magnetic field generated by the currents I4 overlaps with the magnetic field generated by the currents I5 in the detection region Aem. This overlap can increase the strength of the magnetic field passing through the detection region Aem. The magnetic field generated by the currents I4 and the currents I5 corresponds to the magnetic field M1 generated during the magnetic field generation period of the electromagnetic induction method illustrated in FIG. 3. The magnetic field generated by the currents I4 and the currents I5 also corresponds to the magnetic field M3 during the electromagnetic induction force detection illustrated in FIG. 5. The common electrodes COMLB2, COMLB3, and COMLB4 and the common electrodes COMLB6, COMLB7, and COMLB8 included in the drive electrode block Bk correspond to the transmitting coil CTx.

The controller 11 sequentially selects the common electrodes COMLB1 to COMLBn. As a result, the touch detection is performed over the entire display region Ad using the electromagnetic induction method. As illustrated in FIG. 32, the common electrodes COMLB1, COMLB2, COMLB3, . . . COMLBn are also provided in the peripheral region Gd. This configuration can also generate magnetic fields in the peripheral portion of the display region Ad. In this case, the common electrodes COMLB1, COMLB2, COMLB3, . . . COMLBn are provided in positions not overlapping with the detection region Aem.

In FIG. 32, a transmitting coil CTx is formed by six of the common electrodes COMLB. However, the transmitting coil CTx is not limited to this example, but may be formed by one or two of the common electrodes COMLB disposed on one side of the detection region Aem and one or two of the common electrodes COMLB disposed on the other side of the detection region Aem. The transmitting coil CTx may be formed by four or more of the common electrodes COMLB disposed on one side of the detection region Aem and four or more of the common electrodes COMLB disposed on the other side of the detection region Aem. The numbers of the common electrodes COMLB on both sides of the detection region Aem need not be the same as each other. A configuration can be employed in which the number of the common electrodes COMLB on one side differs from that of the common electrodes COMLB on the other side.

The coupling configuration of the common electrodes COMLB during the first sensing period Pem has been described with reference to FIG. 32. The common electrodes COMLB are also coupled in the same manner during the second sensing period Pf, that is, during the electromagnetic induction force detection. The example illustrated in FIG. 32 is merely an example. The coupling configuration of the common electrodes COMLB can be variously changed.

For example, the ground potential GND may be supplied to the right ends of the common electrodes COMLB2, COMLB3, and COMLB4 and the right ends of the common electrodes COMLB6, COMLB7, and COMLB8. Also in this case, the potential difference between the first voltage VTPH and the ground potential GND causes the currents I5 to flow from the left ends toward the right ends of the common electrodes COMLB6, COMLB7, and COMLB8. The potential difference between the second voltage VTPL and the ground potential GND causes the currents I4 to flow from the right ends toward the left ends of the common electrodes COMLB2, COMLB3, and COMLB4. The currents I4 and the currents I5 generate the magnetic field passing through the detection region Aem. Also with the configuration described above, the common electrodes COMLB constitute the transmitting coil CTx during the first sensing period Pem.

Alternatively, the right ends of the common electrodes COMLB2, COMLB3, and COMLB4 may be electrically coupled to the right ends of the common electrodes COMLB6, COMLB7, and COMLB8 through the switches SW1b and the first wiring L1b, or through the switches SW2b and the second wiring L2b. As a result, the common electrodes COMLB2, COMLB3, and COMLB4 and the common electrodes COMLB6, COMLB7, and COMLB8 are formed as the transmitting coil CTx. In this case, the first voltage supply 14c supplies the first voltage VTPH to the left ends of the common electrodes COMLB6, COMLB7, and COMLB8, and the second voltage supply 14d supplies the second voltage VTPL to the left ends of the common electrodes COMLB2, COMLB3, and COMLB4.

The potential difference between the first voltage VTPH and the second voltage VTPL causes currents to flow from the left ends of the common electrodes COMLB6, COMLB7, and COMLB8 to the left ends of the common electrodes COMLB2, COMLB3, and COMLB4 through the first wiring L1$b$, or the second wiring L2$b$. These currents generate the magnetic field passing through the detection region Aem. In this manner, the operations of the switches SW1$b$ or the switches SW2$b$ couple together a pair of groups of the common electrodes (the common electrodes COMLB2, COMLB3, and COMLB4 and the common electrodes COMLB6, COMLB7, and COMLB8) during the first sensing period Pem and the second sensing period Pf. During periods different from the first sensing period Pem and the second sensing period Pf, the pair of groups of the common electrodes are uncoupled from each other.

As illustrated in FIG. 33, during a third sensing period Pes in which the mutual-capacitive touch detection is performed, the switches SW1$a$ and SW1$b$ coupled to both ends of the common electrode COMLB in the drive electrode block Bk are turned on in response to the control signal from the controller 11. In addition, the switches SW2$a$ and SW2$b$ are turns off. As a result, the drive electrode block Bk is selected. In the non-selected electrode block NBk, the switches SW2$a$ and SW2$b$ coupled to both ends of the common electrodes COMLB are turned on, and the switches SW1$a$ and SW1$b$ are turned off.

The detection drive signal supply 14$b$ supplies the second drive signal TSVcom serving as an alternating-current voltage signal to the common electrodes COMLB in the drive electrode block Bk through the first wiring L1$a$ and L1$b$. The display drive signal supply 14$a$ supplies the display drive signal Vcomdc serving as a direct-current voltage signal to the common electrodes COMLB in the non-selected electrode block NBk through the second wiring L2$a$ and L2$b$. The first electrodes TDLB (refer to FIG. 29) supply the third detection signal Vdet3 corresponding to a change in capacitance between the first electrodes TDLB and the drive electrode block Bk to the second AFE 47B. The controller 11 sequentially selects the common electrodes COMLB in the display region Ad. A configuration can also be employed in which the second voltage supply 14$d$ supplies the second voltage VTPL serving as a direct-current voltage signal to the non-selected electrode block NBk during the third sensing period Pes.

Figure 34:
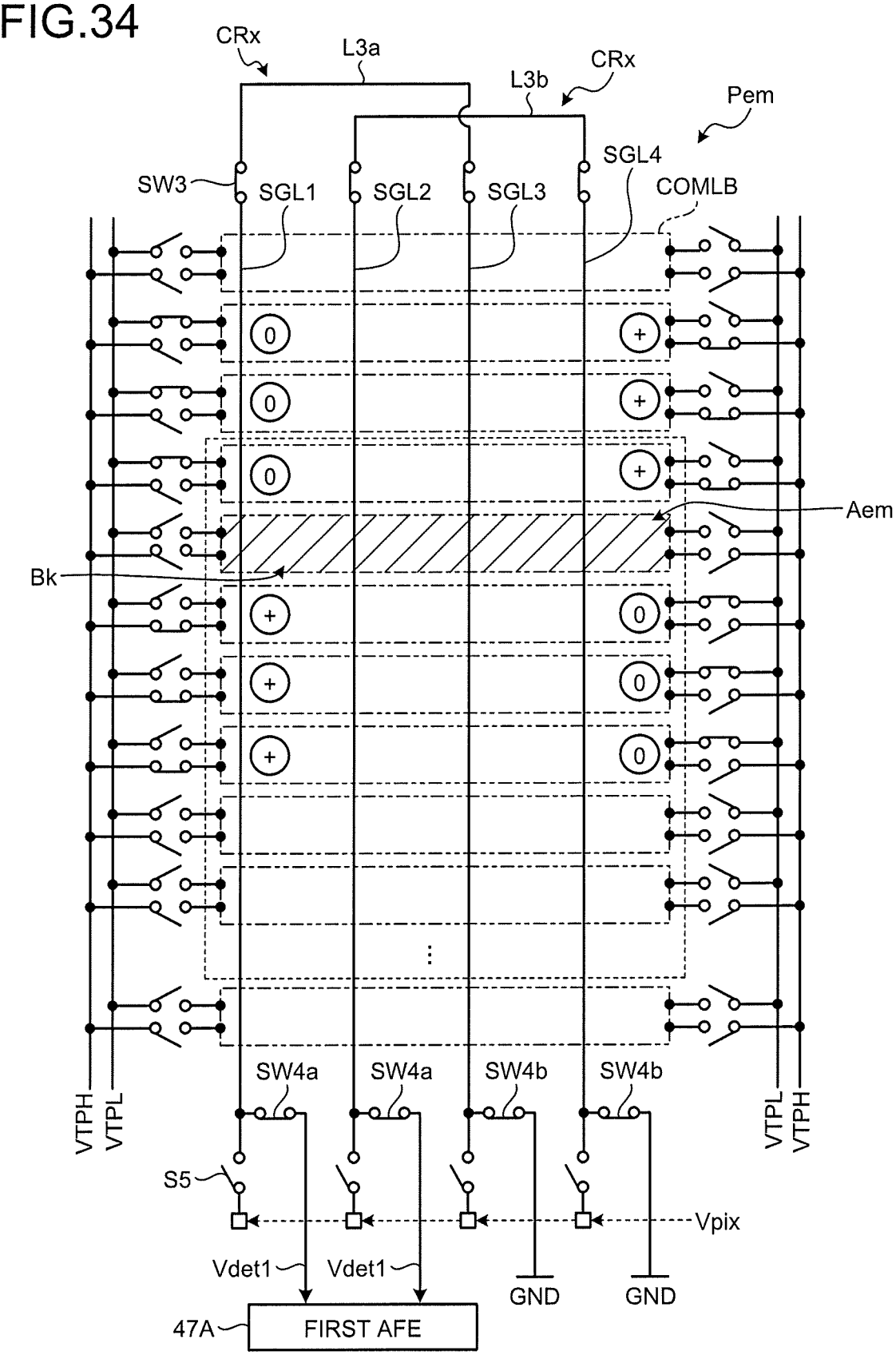
FIG. 34 is a circuit diagram for explaining a coupling configuration of the signal lines according to the third embodiment.

The following describes coupling configurations of the signal lines SGL in the display device 1B of this embodiment. FIG. 34 is a circuit diagram for explaining a coupling configuration of the signal lines according to the third embodiment. FIG. 34 illustrates a coupling configuration of the signal lines SGL during the first sensing period Pem.

FIG. 34 illustrates four signal lines SGL1, SGL2, SGL3, and SGL4 among the signal lines SGL. In the following description, the signal lines SGL1, SGL2, SGL3, and SGL4 will each be referred to as the signal line SGL when they need not be distinguished from one another. In FIG. 34, the common electrodes COMLB are each indicated by a long dashed double-short dashed line.

As illustrated in FIG. 34, the signal lines SGL are provided so as to intersect with the common electrodes COMLB in the plan view. The upper end sides of the signal lines SGL1, SGL2, SGL3, and SGL4 are provided with switches SW3 and wiring L3$a$ and L3$b$. Two of the switches SW3 and the wiring L3$a$ couple the upper ends of a pair of the signal lines SGL1 and SGL3 to each other. The other two of the switches SW3 and the wiring L3$b$ couple the upper ends of a pair of the signal lines SGL2 and SGL4 to each other. The lower end sides of the signal lines SGL1, SGL2, SGL3, and SGL4 are coupled to switches SW4$a$, SW4$b$, and S5.

During the display period Pd, the switches SW3 are turned off in response to the control signal from the controller 11. As a result, the upper ends of the signal lines SGL1, SGL2, SGL3, and SGL4 are uncoupled from one another. The switches SW4$a$ and SW4$b$ are turned off, and the switches S5 are turned on. As a result, the lower ends of the signal lines SGL1, SGL2, SGL3, and SGL4 are uncoupled from the first AFE 47A and the ground potential GND. The pixel signals Vpix are supplied to the signal lines SGL through the switches S5.

As illustrated in FIG. 34, during the first sensing period Pem, the switches SW3 are turned on in response to the control signal from the controller 11. As a result, the upper ends of the pair of the signal lines SGL1 and SGL3 are coupled to each other through the wiring L3$a$. The upper ends of the pair of the signal lines SGL2 and SGL4 are coupled to each other through the wiring L3$b$. On the lower end sides of the signal lines SGL, the switches S5 are turned off, and the switches SW4$a$ and SW4$b$ are turned on. As a result, each of the lower ends of the signal lines SGL1 and SGL2 are coupled to the first AFE 47A. Each of the lower ends of the signal lines SGL3 and SGL4 is coupled to the ground potential GND.

With the above-described configuration, the signal lines SGL1 and SGL3 are coupled together so as to form a loop, and the pair of the signal lines SGL1 and SGL3 is provided as a receiving coil CRx. In addition, the signal lines SGL2 and SGL4 are coupled together, and the pair of the signal lines SGL2 and SGL4 is formed as another receiving coil CRx. The receiving coils CRx are provided so as to overlap with the detection region Aem provided by the common electrodes COMLB.

When the magnetic field M2 from the touch pen 100 (refer to FIG. 4) passes through a region surrounded by the pair of the signal lines SGL1 and SGL3 and the wiring L1$a$ or a region surrounded by the pair of the signal lines SGL2 and SGL4 and the wiring L3$b$, an electromotive force corresponding to a variation in the magnetic field M2 is generated in a corresponding one of the receiving coils CRx. The first detection signal Vdet1 corresponding to the electromotive force is supplied to the first AFE 47A. Thus, the touch pen 100 can be detected.

Also in this embodiment, the adjacent receiving coils CRx are arranged so as to partially overlap with each other. Specifically, the region surrounded by the pair of the signal lines SGL1 and SGL3 and the wiring L1$a$ constituting one of the receiving coils CRx contains the signal line SGL2 of the other of the receiving coils CRx. In addition, the region surrounded by the pair of the signal lines SGL2 and SGL4 and the wiring L3$b$ constituting the other of the receiving coils CRx contains the signal line SGL3 of one of the receiving coils CRx. This configuration can reduce the generation of the region in which the detection sensitivity of the magnetic field is reduced, or the insensitive region in which the magnetic field cannot be detected, in the display region Ad.

As described above, in this embodiment, the switches SW3 are provided that couple together the ends on the same side of a pair of the signal lines SGL (such as the signal lines SGL1 and SGL3) among the signal lines SGL. The controller 11 couples together a pair of the signal lines SGL by operating the switches SW3 during the first sensing period Pem, and uncouples the pair of the signal lines SGL from each other by operating the switches SW3 during the periods (display period Pd and third sensing period Pes) different from the first sensing period Pem. In this manner, the signal lines SGL are formed as the receiving coils CRx, and generate the electromotive force based on the electromagnetic induction.

Also during the second sensing period Pf, the signal lines SGL are coupled in the same manner, and serve as the second receiving coils CRx2. When the magnetic field M3 from the common electrodes COMLB passes through the second receiving coils CRx2, an electromotive force corresponding to a change in the magnetic field M3 is generated in each of the second receiving coils CRx2. The reference signal Vdetr corresponding to this electromotive force is supplied to the first AFE 47A.

Figure 35:
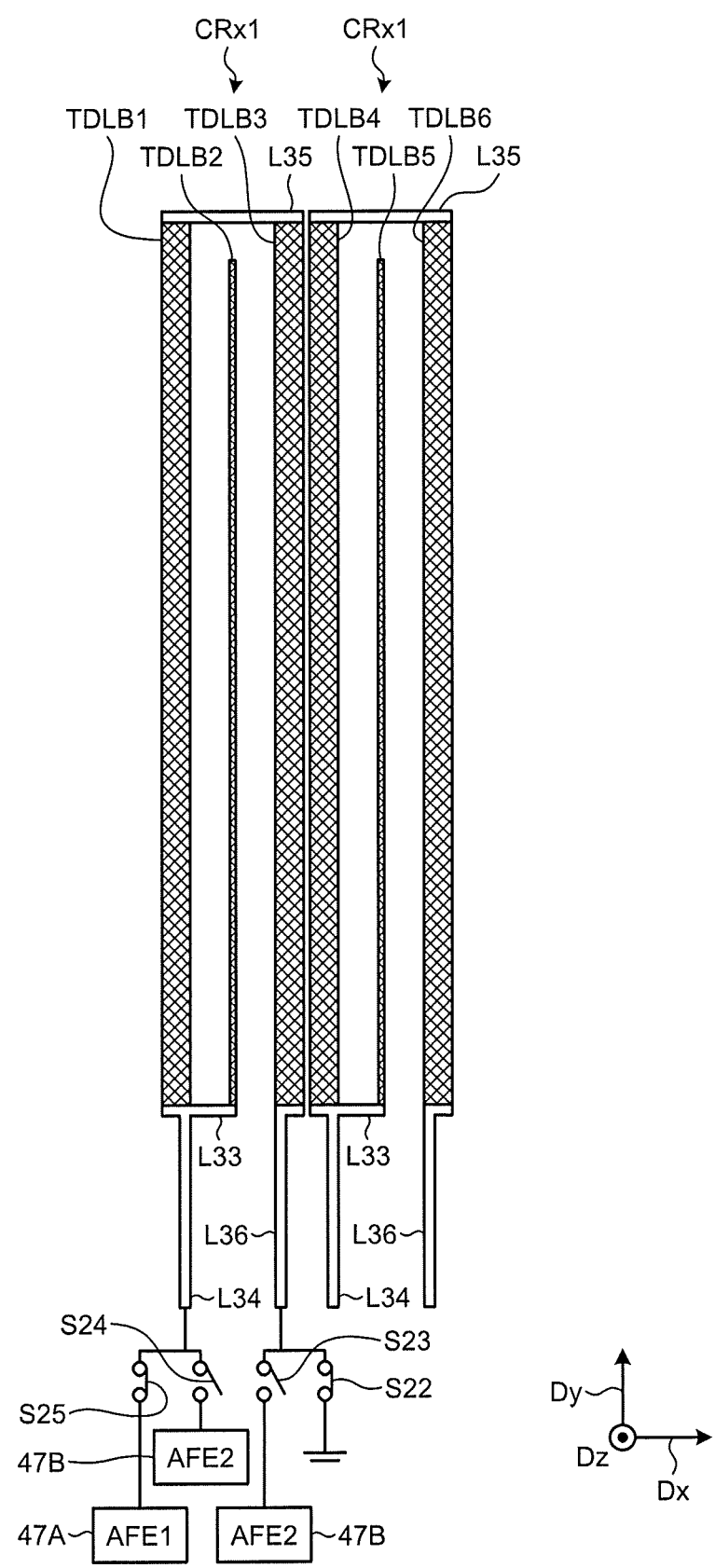
FIG. 35 is a plan view schematically illustrating first electrodes according to the third embodiment.

FIG. 35 is a plan view schematically illustrating the first electrodes according to the third embodiment. The first electrodes TDLB of this embodiment can have the same configuration as that of FIG. 28. In this embodiment, the second electrodes 33B (refer to FIG. 28) are not provided between the adjacent first electrodes TDLB. The coupling configuration of the first electrodes TDLB to the first AFE 47A and the second AFE 47B is also the same as that of FIG. 28. The dummy electrodes TDLd (refer to FIG. 13) may be provided between the adjacent first electrodes TDLB.

As illustrated in FIG. 35, the first electrodes TDLB extend along the second direction Dy, and are arranged in the first direction Dx. The first electrodes TDLB1 and TDLB3 form one of the first receiving coils CRx1, and the first electrodes TDLB4 and TDLB6 form another of the first receiving coils CRx1. When the magnetic field M3 from the common electrodes COMLB passes through the first receiving coils CRx1, an electromotive force corresponding to a change in the magnetic field M3 is generated in each of the second receiving coils CRx2. The electromotive force changes with the distance between the common electrodes COMLB and the first electrodes TDLB, and the second detection signal Vdet2 corresponding to the electromotive force is supplied to the first AFE 47A.

During the third sensing period Pes, the switches SW3, SW4a, SW4b, and S5 illustrated in FIG. 34 are turned off, and the signal lines SGL are brought into the floating state. With this configuration, when the second drive signal TSVcom is supplied to the common electrodes COMLB, each of the signal lines SGL is made to have the same potential as that of the common electrodes COMLB. As a result, parasitic capacitance between the common electrodes COMLB and the signal lines SGL can be reduced.

Figure 36:
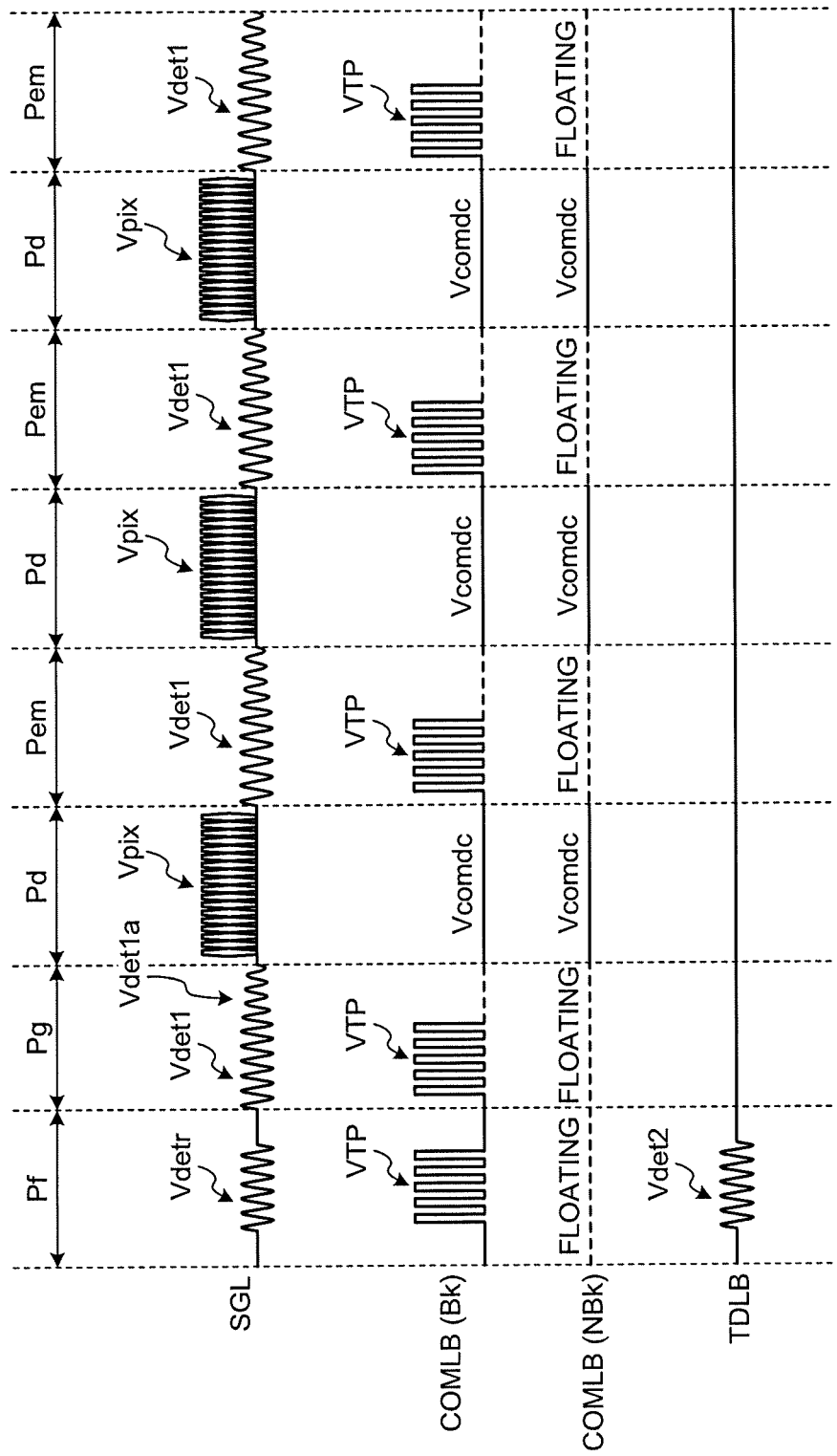
FIG. 36 is a timing waveform diagram illustrating an operation example of the display device according to the third embodiment.
Figure 37:
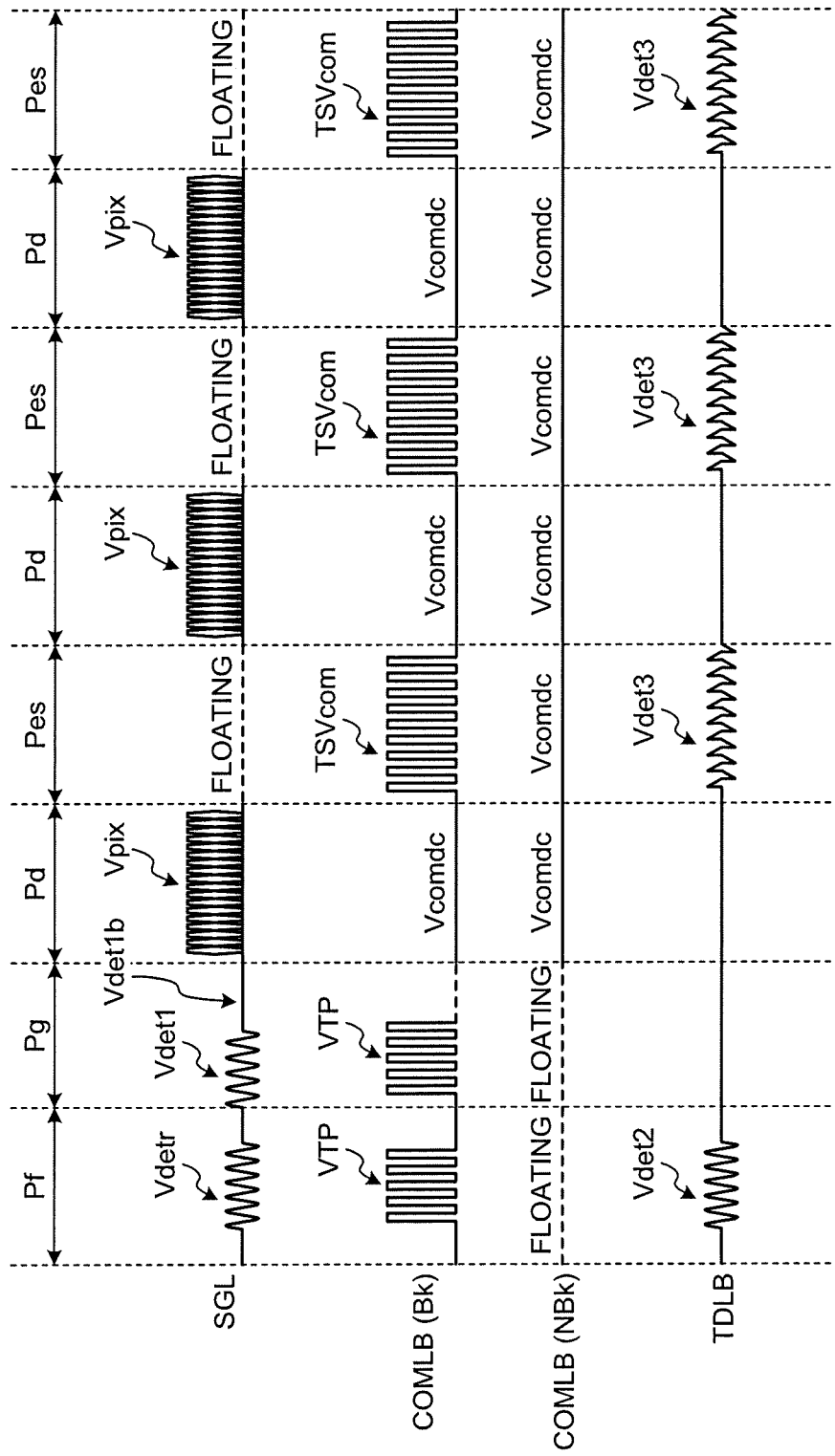
FIG. 37 is a timing waveform diagram illustrating another operation example of the display device according to the third embodiment.

FIG. 36 is a timing waveform diagram illustrating an operation example of the display device according to the third embodiment. FIG. 37 is a timing waveform diagram illustrating another operation example of the display device according to the third embodiment. FIG. 36 illustrates the operation example of the display device 1B when the touch pen 100 is present. FIG. 37 illustrates the operation example of the display device 1B when the touch pen 100 is not present. Also in this embodiment, the display device 1B can determine the detection target body, and switch between the detection modes according to the detection target body to perform detection.

As illustrated in FIGS. 36 and 37, during the second sensing period Pf, the first drive signal VTP is supplied to the drive electrode block Bk constituting the transmitting coil CTx. The non-selected electrode block NBk is not supplied with the first drive signal VTP, and is placed in the floating state.

The supply of the first drive signal VTP causes the electromagnetic induction. The first electrodes TDLB output the second detection signal Vdet2 corresponding to the change in the distance between the common electrodes COMLB and the first electrodes TDLB based on the electromagnetic induction. At the same time, the signal lines SGL output the reference signal Vdetr. The force detection controller 11B calculates the level of the force applied from the detection target body to the display surface based on the second detection signal Vdet2 and the reference signal Vdetr.

As illustrated in FIGS. 36 and 37, during the determination period Pg, the driver IC 19 supplies the first drive signal VTP to the drive electrode block Bk. The signal lines SGL output the first detection signal Vdet1 based on the electromagnetic induction. The detection target body determiner 11D determines whether the touch pen 100 is present based on the first detection signal Vdet1.

If the touch pen 100 is present, the display periods Pd and the first sensing periods Pem are alternately arranged, as illustrated in FIG. 36. During the first sensing period Pem, the driver IC 19 supplies the first drive signal VTP to the drive electrode block Bk constituting the transmitting coil CTx, as illustrated in FIG. 29. The non-selected electrode block NBk is placed in the floating state. The electromotive force is generated in the signal lines SGL constituting the receiving coil CRx according to the electromagnetic induction between the signal lines SGL and the touch pen 100. The signal lines SGL output the first detection signal Vdet1 corresponding to this electromotive force.

If the touch pen 100 is not present, the display periods Pd and the third sensing periods Pes are alternately arranged, as illustrated in FIG. 37. During the third sensing period Pes, the driver IC 19 supplies the second drive signal TSVcom to the drive electrode block Bk. The first electrodes TDLB output the third detection signal Vdet3 corresponding to the change in electrostatic capacitance between the drive electrode block Bk and the first electrodes TDLB. The non-selected electrode block NBk is supplied with the display drive signal Vcomdc.

In this embodiment, the electromagnetic induction-based touch detection and force detection and the capacitive touch detection can be performed using the common electrodes COMLB, the first electrodes TDLB, and the signal lines SGL. As a result, the number of layers of, for example, the electrodes provided on the second substrate 31B can be reduced. Since the common electrodes COMLB are provided on the first substrate 21B, the conductive portion 81 illustrated, for example, in FIG. 15 can be eliminated.

Fourth Embodiment

Figure 38:
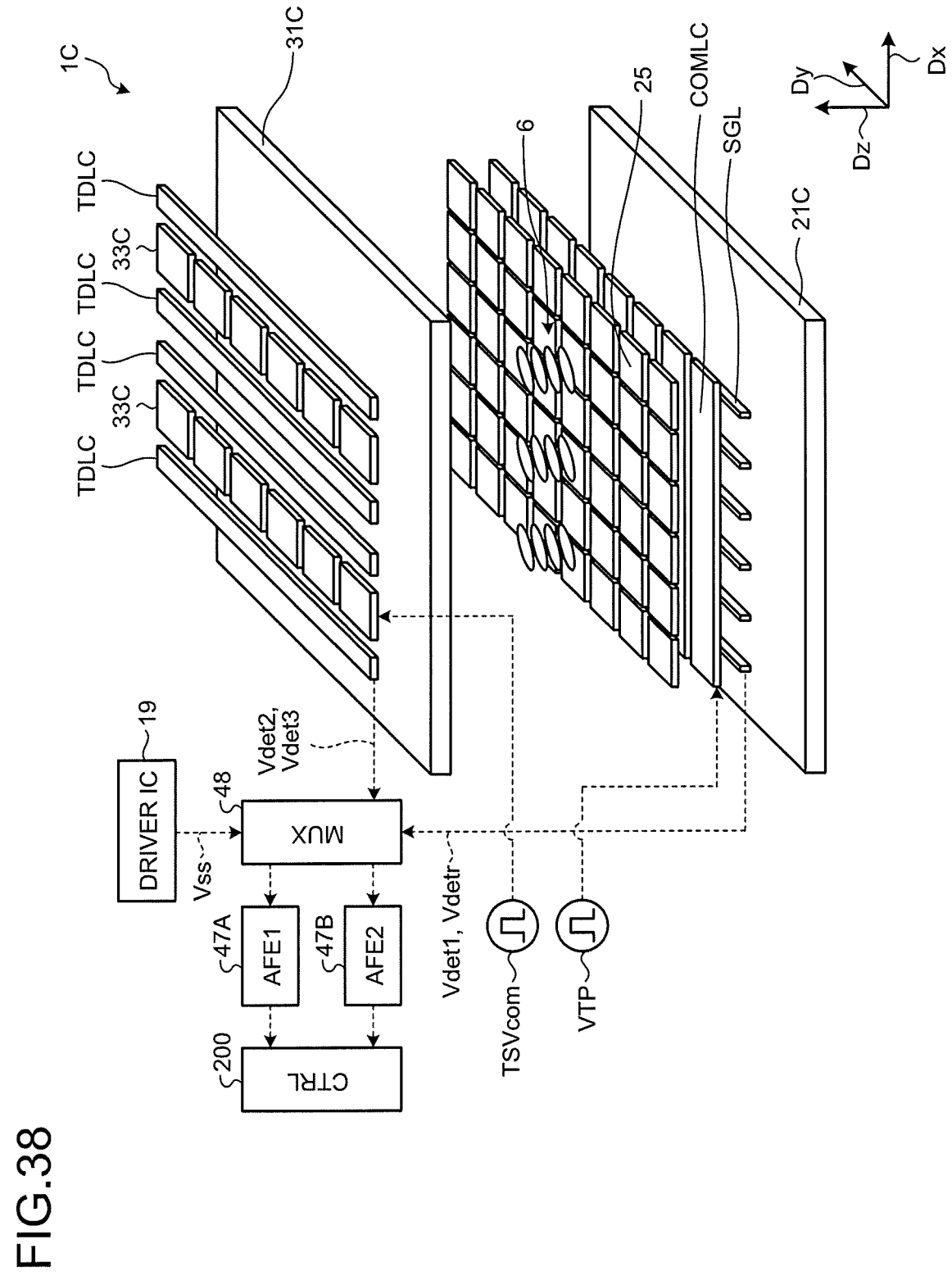
FIG. 38 is an exploded perspective view of a display device according to a fourth embodiment of the present disclosure.
Figure 39:
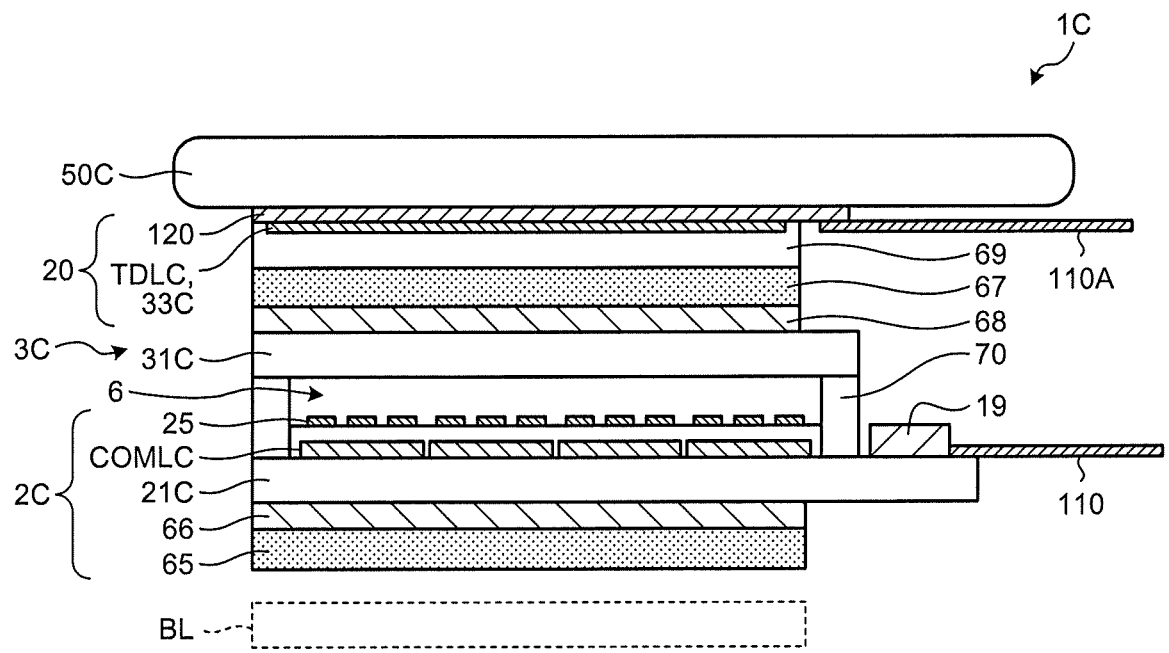
FIG. 39 is a schematic diagram illustrating a sectional structure of the display device according to the fourth embodiment.

FIG. 38 is an exploded perspective view of a display device according to a fourth embodiment of the present disclosure. FIG. 39 is a schematic diagram illustrating a sectional structure of the display device according to the fourth embodiment. In a display device 1C of this embodiment, the signal lines SGL, a plurality of common electrodes COMLC, the pixel electrodes 25, the liquid crystal layer 6, and a second substrate 31C are stacked in this order on a first substrate 21C. A plurality of first electrodes TDLC and a plurality of second electrodes 33C are provided on the second substrate 31C.

As illustrated in FIG. 39, a pixel substrate 2C has the same configuration as that of FIG. 30. In a counter substrate 3C, the polarizing plate 67 is bonded to the upper side of the second substrate 31C with the adhesive layer 68 interposed therebetween. That is, the first electrodes TDLC are not provided between the second substrate 31C and the polarizing plate 67. In this embodiment, a touchscreen panel 20 is provided between the polarizing plate 67 and a cover member 50C, and is bonded to the upper side of the polarizing plate 67 with the adhesive layer 69 interposed therebetween. The touchscreen panel 20 includes a base material 120, the first electrodes TDLC, and the second electrodes 33C. For example, a light-transmitting resin film can be used as the base material 120. The first electrodes TDLC and the second electrodes 33C are provided on a surface of the base material 120 opposed to the second substrate 31C. In other words, the second electrodes 33C are provided at a distance from the first electrodes TDLC on a side of the liquid crystal layer 6 opposite to the common electrodes COMLC.

A flexible substrate 110A is coupled to the base material 120. The flexible substrate 110A is coupled to the flexible substrate 110 on the first substrate 21C side, or to the external control board 111 (refer to FIG. 8). With this configuration, the second drive signal TSVcom is supplied to the second electrodes 33C through the flexible substrate 110A. In addition, various detection signals can be externally taken out from the first electrodes TDLC through the flexible substrate 110A.

The first electrodes TDLC and the second electrodes 33C can have the same configuration as that of FIG. 28. Alternatively, the first electrodes TDLC and the second electrodes 33C can have the same configuration as that of FIGS. 23 and 24. The first electrodes TDLC and the second electrodes 33C may be provided in the same layer or different layers.

In this embodiment, the common electrodes COMLC serve as common electrodes corresponding to the pixel electrodes 25 during the display operation. In addition, the common electrodes COMLC serve as the transmitting coils CTx during the electromagnetic induction-based touch detection and force detection. The second electrodes 33C serve as the drive electrodes E1 for the capacitive touch detection. In the same manner as in the third embodiment, the signal lines SGL and the first electrodes TDLC serve as the respective receiving coils in the electromagnetic induction method.

The coupling configurations of the common electrodes COMLC and the signal lines SGL are the same as those of the third embodiment. In other words, the electromagnetic induction-based touch detection and force detection are the same as those of the third embodiment. As illustrated in FIG. 39, the adhesive layer 69 is provided between the common electrodes COMLC and the touchscreen panel 20. The force detection can be improved in detection accuracy by using a soft material, which is deformable by the force applied from the detection target body, as the adhesive layer 69.

Figure 40:
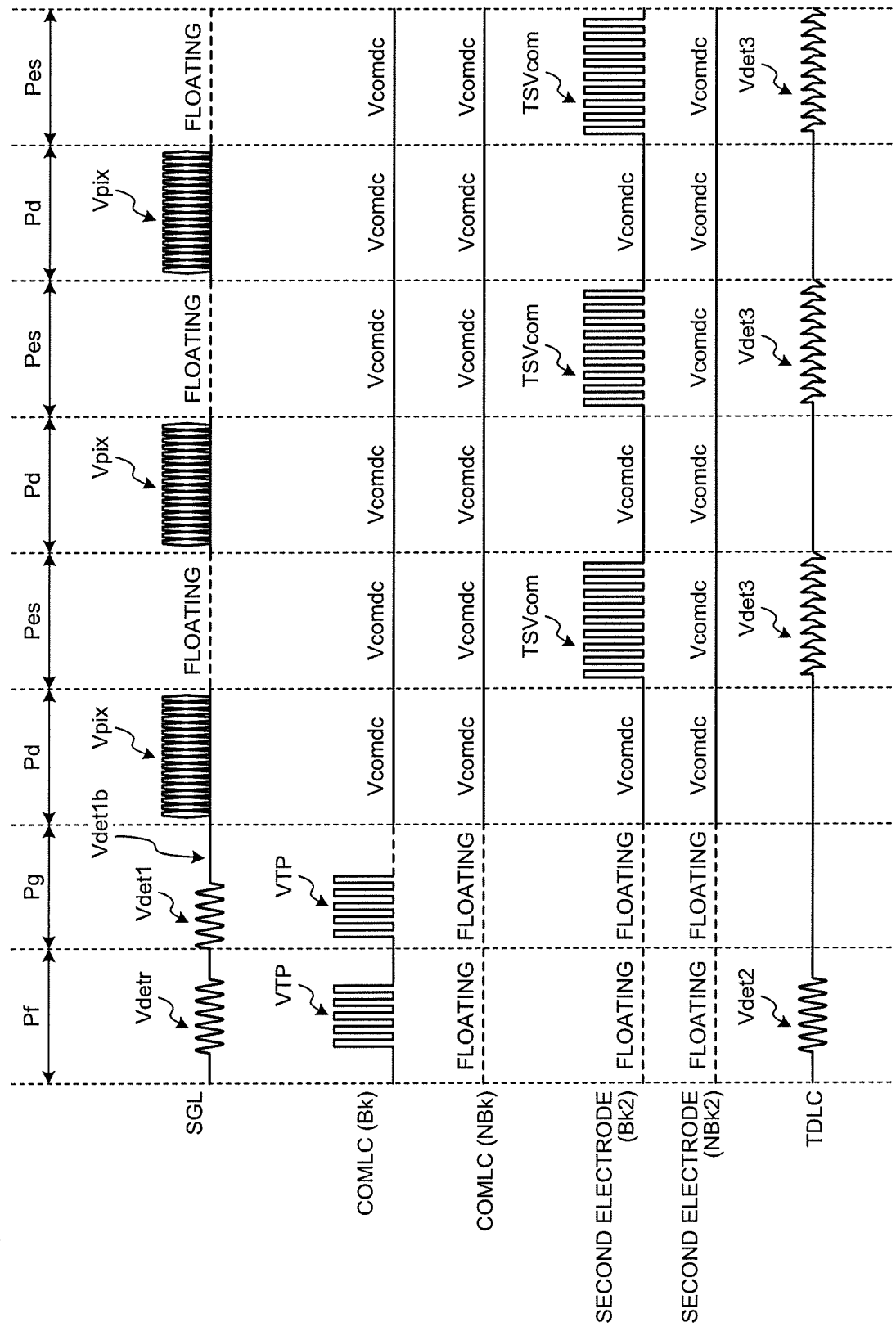
FIG. 40 is a timing waveform diagram illustrating an operation example of the display device according to the fourth embodiment.

FIG. 40 is a timing waveform diagram illustrating an operation example of the display device according to the fourth embodiment. FIG. 40 illustrates the operation example of the display device 1C when the touch pen 100 is not present. When the touch pen 100 is present, the same operation example as that of FIG. 36 can be used as an operation example in this embodiment. When the touch pen 100 is not present, the display periods Pd and the third sensing periods Pes are alternately arranged, as illustrated in FIG. 40. During the third sensing period Pes, the driver IC 19 supplies the second drive signal TSVcom to a second electrode block Bk2 made up of more than one of the second electrodes 33C. The first electrodes TDLC output the third detection signal Vdet3 corresponding to the change in electrostatic capacitance between the second electrode block Bk2 and the first electrodes TDLC. A non-selected electrode block NBk2 is supplied with the display drive signal Vcomdc.

In FIG. 40, the display operation and the capacitive touch detection are performed in a time-division manner, but are not limited to the time-division manner. In this embodiment, since the touchscreen panel 20 is provided, the capacitive touch detection can be performed synchronously or asynchronously with the display period Pd.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure naturally belong to the technical scope of the present disclosure.

What is claimed is:

1. A display device comprising:
   a substrate;
   a plurality of lines;
   a plurality of pixel electrodes;
   a display functional layer;
   a common electrode opposed to the pixel electrodes;
   a plurality of first electrodes;
   a plurality of second electrodes;
   a switch configured to couple together ends on the same side of a pair of the lines; and
   a controller,
   wherein the substrate, the pixel electrodes, the display functional layer, and the common electrode are stacked in this order,
   wherein the first electrodes are opposed to the second electrodes with a space therebetween, and an insulating layer is provided between the common electrode and the first and second electrodes,
   wherein the controller is configured to
      perform processing during a plurality of periods including a display period to display an image, a first sensing period, and a second sensing period in a time-division manner, and
      control the pixel electrodes, the common electrode, the lines, the first electrodes, and the second electrodes according to the periods,
   wherein, during the display period, in response to a control signal from the controller, the pixel electrodes are supplied with a pixel signal through the lines, and the common electrode is supplied with a common signal,
   wherein, during the first sensing period, the lines are supplied with a first drive signal to generate a magnetic field,
   wherein, during the second sensing period, the lines are supplied with the first drive signal to generate the magnetic field, and an electromotive force corresponding to a distance between the lines and the first electrodes is generated in the first electrodes by the magnetic field, and
   wherein the controller is configured to
      couple the pair of the lines to each other by operating the switch during the first sensing period and the second sensing period, and
      uncouple the pair of the lines from each other by operating the switch during a period different from the first sensing period and the second sensing period.

2. The display device according to claim 1,
wherein the controller is configured to perform processing during a third sensing period synchronously or asynchronously with the display period,
wherein the third sensing period is a period different from the first sensing period and the second sensing period, and
wherein a second drive signal is supplied to the second electrodes to generate electrostatic capacitance between the first electrodes and the second electrodes during the third sensing period.

3. The display device according to claim 2,
wherein the controller is configured to perform either one of the processing during the first sensing period and the processing during the third sensing period according to a detected detection target body.

4. The display device according to claim 1, further comprising
an analog front-end circuit coupled to the first electrodes.

5. A display device comprising:
a substrate;
a plurality of lines;
a plurality of pixel electrodes;
a display functional layer;
a common electrode opposed to the pixel electrodes;
a plurality of first electrodes;
a plurality of second electrodes;
an analog front-end circuit coupled to the first electrodes; and
a controller,
wherein the substrate, the pixel electrodes, the display functional layer, and the common electrode are stacked in this order,
wherein the first electrodes are opposed to the second electrodes with a space therebetween, and an insulating layer is provided between the common electrode and the first and second electrodes,
wherein the controller is configured to
perform processing during a plurality of periods including a display period to display an image, a first sensing period, and a second sensing period in a time-division manner, and
control the pixel electrodes, the common electrode, the lines, the first electrodes, and the second electrodes according to the periods,
wherein, during the display period, in response to a control signal from the controller, the pixel electrodes are supplied with a pixel signal through the lines, and the common electrode is supplied with a common signal,
wherein, during the first sensing period, the lines are supplied with a first drive signal to generate a magnetic field, and
wherein, during the second sensing period, the lines are supplied with the first drive signal to generate the magnetic field, and an electromotive force corresponding to a distance between the lines and the first electrodes is generated in the first electrodes by the magnetic field,
wherein a plurality of third electrodes are provided between the substrate and the pixel electrodes, and
wherein an electromotive force caused by the magnetic field is generated in the third electrodes during the first sensing period.

6. The display device according to claim 5,
wherein a switching circuit provided between the analog front-end circuit and the first and third electrodes, and configured to switch a coupling state between the first electrodes and the analog front-end circuit and a coupling state between the third electrodes and the analog front-end circuit,
wherein the switching circuit is configured to
couple the third electrodes to the analog front-end circuit during the first sensing period,
couple the first and third electrodes to the analog front-end circuit during the second sensing period, and
couple the first electrodes to the analog front-end circuit during a period different from the first sensing period and the second sensing period.

7. The display device according to claim 5,
wherein an insulating substrate is provided between the first electrodes and the second electrodes,
wherein the first electrodes extend along the same direction as that of the lines in a plan view,
wherein the second electrodes are provided so as to intersect with the first electrodes in the plan view, and
the third electrodes are provided so as to intersect with the lines in the plan view.

8. The display device according to claim 5,
wherein the first electrodes and the second electrodes are provided in the same layer, and an insulating substrate is provided between the common electrode and both the first electrodes and the second electrodes, and
wherein the first electrodes are coupled in a first direction through a coupling line, and the second electrodes are coupled in a second direction intersecting with the first direction through bridge wiring provided in a layer different from that of the second electrodes and the first electrodes.

9. A display device comprising:
a substrate;
a plurality of lines;
a plurality of pixel electrodes;
a display functional layer;
a plurality of common electrodes opposed to the pixel electrodes;
a plurality of first electrodes;
a switch configured to couple together ends on the same side of a pair of the common electrodes; and
a controller,
wherein the substrate, the lines, the pixel electrodes, the display functional layer, and the first electrodes are stacked in this order,
wherein the common electrodes are provided between the substrate and the display functional layer,
wherein the controller is configured to
perform processing during a plurality of periods including a display period to display an image, a first sensing period, and a second sensing period in a time-division manner, and
control the pixel electrodes, the common electrodes, the lines, and the first electrodes according to the periods,
wherein, during the display period, in response to a control signal from the controller, the pixel electrodes are supplied with a pixel signal through the lines, and the common electrodes are supplied with a common signal,
wherein, during the first sensing period, the common electrodes are supplied with a first drive signal to generate a magnetic field, and an electromotive force is generated in the lines by the magnetic field, wherein, during the second sensing period, the common electrodes are supplied with the first drive signal to generate the magnetic field, and an electromotive force corresponding to a distance between the common electrodes and the first electrodes is generated in the first electrodes by the magnetic field, and wherein the controller is configured to couple the pair of the common electrodes to each other by operating the switch during the first sensing period and the second sensing period, and uncouple the pair of the common electrodes from each other by operating the switch during a period different from the first sensing period and the second sensing period.

10. The display device according to claim 9, wherein the controller is configured to perform processing during a third sensing period different from the display period, the first sensing period, and the second sensing period, and wherein a second drive signal is supplied to the common electrodes to generate electrostatic capacitance between the first electrodes and the common electrodes during the third sensing period.

11. The display device according to claim 9, further comprising:

a second electrode provided at a distance from the first electrodes on a side of the display functional layer opposite to the common electrodes, wherein the controller is configured to perform processing during a third sensing period different from the display period, the first sensing period, and the second sensing period, and wherein a second drive signal is supplied to the second electrode to generate electrostatic capacitance between the first electrodes and the second electrode during the third sensing period.

12. A display device comprising:

a substrate;

a plurality of lines;

a plurality of pixel electrodes;

a display functional layer;

a plurality of common electrodes opposed to the pixel electrodes;

a plurality of first electrodes; and a controller, wherein the substrate, the lines, the pixel electrodes, the display functional layer, and the first electrodes are stacked in this order, wherein the common electrodes are provided between the substrate and the display functional layer, wherein the controller is configured to perform processing during a plurality of periods including a display period to display an image, a first sensing period, and a second sensing period in a time-division manner, and control the pixel electrodes, the common electrodes, the lines, and the first electrodes according to the periods, wherein, during the display period, in response to a control signal from the controller, the pixel electrodes are supplied with a pixel signal through the lines, and the common electrodes are supplied with a common signal, wherein, during the first sensing period, the common electrodes are supplied with a first drive signal to generate a magnetic field, and an electromotive force is generated in the lines by the magnetic field, wherein, during the second sensing period, the common electrodes are supplied with the first drive signal to generate the magnetic field, and an electromotive force corresponding to a distance between the common electrodes and the first electrodes is generated in the first electrodes by the magnetic field, and wherein an electromotive force caused by the magnetic field is also generated in the lines during the second period.

13. The display device according to claim 9, further comprising:

an analog front-end circuit configured to be coupled to the first electrodes.

14. The display device according to claim 13, wherein a switching circuit provided between the analog front-end circuit and both the first electrodes and the lines, and configured to switch a coupling state between the first electrodes and the analog front-end circuit and a coupling state between the lines and the analog front-end circuit, wherein the switching circuit is configured to couple the lines to the analog front-end circuit during the first sensing period, couple the first electrodes and the lines to the analog front-end circuit during the second sensing period, and couple the first electrodes to the analog front-end circuit during a period different from the first sensing period and the second sensing period.

15. The display device according to claim 9, wherein the common electrodes are provided so as to intersect with the lines in a plan view.

16. The display device according to claim 9, wherein an insulating substrate is provided between the first electrodes and the display functional layer, and wherein the first electrodes extend along the same direction as that of the lines and provided so as to intersect with the common electrodes in the plan view.

* * * * *